United States Patent
Papasakellariou

(10) Patent No.: US 12,250,036 B2
(45) Date of Patent: Mar. 11, 2025

(54) TRANSMISSION STRUCTURES AND FORMATS FOR DL CONTROL CHANNELS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/497,953

(22) Filed: Oct. 30, 2023

(65) Prior Publication Data

US 2024/0072855 A1   Feb. 29, 2024

Related U.S. Application Data

(63) Continuation of application No. 17/809,887, filed on Jun. 29, 2022, which is a continuation of application
(Continued)

(51) Int. Cl.
*H04B 7/0456* (2017.01)
*H04B 7/12* (2006.01)
(Continued)

(52) U.S. Cl.
CPC ............ *H04B 7/0456* (2013.01); *H04B 7/12* (2013.01); *H04L 5/0048* (2013.01);
(Continued)

(58) Field of Classification Search
None
See application file for complete search history.

(56) References Cited

U.S. PATENT DOCUMENTS 8,843,168 B2   9/2014   Wang
8,923,201 B2   12/2014   Papasakellariou
(Continued)

FOREIGN PATENT DOCUMENTS

CN   102422584 A   4/2012
EP   2922225 B1   1/2020
(Continued)

OTHER PUBLICATIONS

Canadian Intellectual Property Office, Office Action issued Nov. 10, 2023 regarding Application No. 3,052,762, 4 pages.
(Continued)

*Primary Examiner* — Otis L Thompson, Jr.

(57) ABSTRACT

A method for a user equipment (UE) to receive physical downlink control channels (PDCCHs) is provided. The UE receives configuration information for a first control resource set that includes a number of symbols in a time domain and a number of resource blocks (RBs) in a frequency domain, configuration information indicating a first number of $N_{bundle,1}$ frequency-contiguous RB s, and a PDCCH in the first control resource set in a number of frequency distributed blocks of $N_{bundle,1}$ RBs. The UE assumes that a demodulation reference signal associated with the reception of the PDCCH has a same precoding over the $N_{bundle,1}$ RBs. A method for constructing a search space to reduce a number of channel estimations that the UE performs for decoding PDCCHs, relative to conventional search spaces, is also provided.

20 Claims, 27 Drawing Sheets

Related U.S. Application Data

No. 17/247,326, filed on Dec. 7, 2020, now Pat. No. 11,411,793, which is a continuation of application No. 16/584,631, filed on Sep. 26, 2019, now Pat. No. 10,862,724, which is a continuation of application No. 15/886,621, filed on Feb. 1, 2018, now Pat. No. 10,432,441.

(60) Provisional application No. 62/580,494, filed on Nov. 2, 2017, provisional application No. 62/509,233, filed on May 22, 2017, provisional application No. 62/479,604, filed on Mar. 31, 2017, provisional application No. 62/471,528, filed on Mar. 15, 2017, provisional application No. 62/469,616, filed on Mar. 10, 2017, provisional application No. 62/455,155, filed on Feb. 6, 2017.

(51) Int. Cl.
*H04L 5/00* (2006.01)
*H04L 25/02* (2006.01)
*H04L 27/26* (2006.01)
*H04W 72/0453* (2023.01)
*H04W 72/23* (2023.01)
*H04W 74/00* (2009.01)
*H04W 72/0446* (2023.01)

(52) U.S. Cl.
CPC .......... *H04L 5/0053* (2013.01); *H04L 5/0092* (2013.01); *H04L 25/023* (2013.01); *H04L 27/2613* (2013.01); *H04W 72/0453* (2013.01); *H04W 72/23* (2023.01); *H04W 74/006* (2013.01); *H04W 72/0446* (2013.01)

(56) References Cited

U.S. PATENT DOCUMENTS

| | | | |
|---|---|---|---|
| 9,391,737 | B2 | 7/2016 | Papasakellariou |
| 10,103,854 | B2 | 10/2018 | Nakashima |
| 11,171,746 | B2 | 11/2021 | Xiong |
| 2009/0241004 | A1 | 9/2009 | Ahn |
| 2010/0177700 | A1 | 7/2010 | Luo |
| 2010/0177810 | A1 | 7/2010 | Luo |
| 2010/0279628 | A1 | 11/2010 | Love et al. |
| 2012/0034945 | A1 | 2/2012 | Wang |
| 2013/0010685 | A1 | 1/2013 | Kim et al. |
| 2013/0034070 | A1 | 2/2013 | Seo |
| 2013/0034073 | A1 | 2/2013 | Aiba et al. |
| 2013/0044727 | A1 | 2/2013 | Nory |
| 2013/0064099 | A1 | 3/2013 | Kim |
| 2013/0121276 | A1 | 5/2013 | Kim |
| 2013/0194931 | A1 | 8/2013 | Lee |
| 2013/0250880 | A1 | 9/2013 | Liao |
| 2014/0328260 | A1 | 11/2014 | Papasakellariou et al. |
| 2015/0280876 | A1 | 10/2015 | You |
| 2015/0327226 | A1 | 11/2015 | Cheng |
| 2016/0254900 | A1 | 9/2016 | Ahn |
| 2016/0278054 | A1 | 9/2016 | You |
| 2017/0238312 | A1 | 8/2017 | Chen |
| 2017/0290017 | A1 | 10/2017 | Takeda et al. |
| 2017/0374661 | A1 | 12/2017 | Aiba |
| 2017/0374675 | A1 | 12/2017 | Hwang |
| 2018/0007585 | A1 | 1/2018 | Takeda et al. |
| 2018/0007668 | A1 | 1/2018 | Yum |
| 2018/0083758 | A1* | 3/2018 | Islam .................. H04L 27/2602 |
| 2018/0184410 | A1* | 6/2018 | John Wilson ......... H04W 72/20 |
| 2018/0213477 | A1* | 7/2018 | John Wilson ..... H04W 72/1273 |
| 2018/0227777 | A1 | 8/2018 | Sun |
| 2018/0234277 | A1 | 8/2018 | Akkarakaran |
| 2018/0249458 | A1 | 8/2018 | He |
| 2018/0249487 | A1 | 8/2018 | Takeda |
| 2018/0375636 | A1 | 12/2018 | You |
| 2019/0028252 | A1 | 1/2019 | Akkarakaran |
| 2019/0037540 | A1 | 1/2019 | Seo |
| 2019/0103941 | A1 | 4/2019 | Seo |
| 2019/0123881 | A1 | 4/2019 | Lee |
| 2019/0140776 | A1* | 5/2019 | Seo ..................... H04B 7/0456 |
| 2019/0173622 | A1 | 6/2019 | Xiong |
| 2019/0230685 | A1* | 7/2019 | Park ..................... H04L 5/0094 |
| 2019/0268208 | A1* | 8/2019 | Seo ..................... H04L 27/2657 |
| 2019/0306840 | A1* | 10/2019 | Taherzadeh Boroujeni ............... H04W 72/23 |
| 2019/0306847 | A1* | 10/2019 | Seo ..................... H04W 72/046 |
| 2019/0335478 | A1 | 10/2019 | Xiong |
| 2019/0349904 | A1* | 11/2019 | Kwak ................. H04L 69/324 |
| 2019/0349907 | A1* | 11/2019 | Seo ..................... H04L 5/0053 |
| 2019/0356524 | A1* | 11/2019 | Yi ........................ H04W 48/16 |
| 2020/0008231 | A1* | 1/2020 | Vilaipornsawai ..... H04W 72/21 |
| 2020/0021419 | A1* | 1/2020 | Taherzadeh Boroujeni ............... H04L 5/0091 |
| 2020/0028646 | A1* | 1/2020 | Seo ..................... H04W 72/0453 |
| 2020/0059967 | A1 | 2/2020 | Kim |
| 2020/0068591 | A1* | 2/2020 | Xu ....................... H04L 5/0053 |
| 2020/0128525 | A1 | 4/2020 | Aiba |

FOREIGN PATENT DOCUMENTS

| | | |
|---|---|---|
| JP | 2010521942 A | 6/2010 |
| JP | 2013534072 A | 8/2013 |
| JP | 2014533909 A | 12/2014 |
| JP | 2015508956 A | 3/2015 |
| JP | 2015518305 A | 6/2015 |
| WO | 2016047729 A1 | 7/2017 |
| WO | 2016121776 A1 | 11/2017 |

OTHER PUBLICATIONS

Chinese National Intellectual Property Administration, Office Action issued Jan. 6, 2024 regarding Application No. 202210722789.6, 12 pages.
China National Intellectual Property Administration, Office Action issued Aug. 1, 2023 regarding Application No. 202210722789.6, 14 pages.
China National Intellectual Property Administration, Office Action issued Aug. 14, 2023 regarding Application No. 202210704552.5, 16 pages.
Japanese Patent Office, Office Action issued Sep. 19, 2023 regarding Application No. 2022-150445, 13 pages.
NTT Docomo, Inc., "Search space configuration", 3GPP TSG RAN WG1 Meeting #88bis, R1-1705737, Apr. 2017, 4 pages.
Nokia et al., "On the PDCCH search space configuration for NR", 3GPP TSG RAN WG1#89, R1-1708502, May 2017, 4 pages.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.1.0, Dec. 2016, 98 pages.
"3rd Generation Partnership Project; Technical Specification Group Radio Access Network; Evolved Universal Terrestrial Radio Access (E-UTRA); Multiplexing and channel coding (Release 14)", 3GPP TS 36.212 V14.1.0, Dec. 2016, 176 pages.
"3rd Generation Partnership Project; Technical Specification Group Radio Access Network; Evolved Universal Terrestrial Radio Access (E-UTRA); Physical channels and modulation (Release 14)", 3GPP TS 36.211 V14.1.0, Dec. 2016, 175 pages.
"3rd Generation Partnership Project; Technical Specification Group Radio Access Network; Evolved Universal Terrestrial Radio Access (E-UTRA); Physical layer procedures (Release 14)", 3GPP TS 36.213 V14.1.0, Dec. 2016, 414 pages.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.321 V14.1.0, Dec. 2016, 654 pages.
International Search Report regarding International Application No. PCT/KR2018/001608, dated May 10, 2018, 4 pages.
Supplementary European Search Report dated Dec. 5, 2019 in connection with European Patent Application No. 18 74 8655, 7 pages.

(56) References Cited

OTHER PUBLICATIONS

Examination report dated Nov. 11, 2021, in connection with Australian Application No. 2018216588, 3 pages.
Japan Patent Office, Notice of Reasons for Refusal dated Dec. 24, 2021 regarding Application No. 2019-542531, 10 pages.
Summons to attend oral proceedings dated Oct. 26, 2021, in connection with European Application No. 18748655.0, Oct. 26, 2021, 7 pgs.
The First Office Action dated Sep. 27, 2021, in connection with Chinese Application No. 201880010486.3, 15 pages.
Japanese Patent Office, Notice of Allowance issued Aug. 22, 2022 regarding Application No. 2019-542531, 6 pages.
Extended European Search Report issued Aug. 26, 2022 regarding Application No. 22177655.2, 8 pages.
Korean Intellectual Property Office, Office Action issued Apr. 3, 2023 regarding Application No. 10-2019-7023007, 7 pages.
Ericsson, "Summary of e-mail discussions on downlink control signaling", TSG-RAN WG1 NR AdHoc, R1-1701036, Jan. 2017, 18 pages.
Zte et al., "Aspects of DL MIMO Transmission", 3GPP TSG RAN WG1 NR Ad-Hoc Meeting. R1-1700117, Jan. 2017, 5 pages.
Chinese National Intellectual Property Administration, Rejection Decision issued Jun. 7, 2024 regarding Application No. 202210722789.6, 11 pages.
Chinese National Intellectual Property Administration, Decision to Grant issued Nov. 4, 2024 regarding Application No. 202210704552.5, 7 pages.
Korean Intellectual Property Office, Office Action issued Dec. 12, 2024 regarding Application No. 10-2024-7002311, 9 pages.
Huawei et al. "Remaining details of NB-PDCCH design", 3GPP TSG RAN WG1 NB-IoT Ad-Hoc Meeting #2, R1-161802, Mar. 2016, 5 pages.

\* cited by examiner

TRANSMISSION STRUCTURES AND FORMATS FOR DL CONTROL CHANNELS

CROSS-REFERENCE TO RELATED APPLICATIONS AND CLAIM OF PRIORITY

This application is a continuation of U.S. patent application Ser. No. 17/809,887, filed Jun. 29, 2022, which is a continuation of U.S. patent application Ser. No. 17/247,326, filed Dec. 7, 2020, now issued as U.S. Pat. No. 11,411,793, which is a continuation of U.S. patent application Ser. No. 16/584,631, filed Sep. 26, 2019, now issued as U.S. Pat. No. 10,862,724, which is a continuation of U.S. patent application Ser. No. 15/886,621, filed Feb. 1, 2018, now issued as U.S. Pat. No. 10,432,441, which claims priority to U.S. Provisional Patent Application No. 62/455,155, filed Feb. 6, 2017; U.S. Provisional Patent Application No. 62/469,616, filed Mar. 10, 2017; U.S. Provisional Patent Application No. 62/471,528, filed Mar. 15, 2017; U.S. Provisional Patent Application No. 62/479,604, filed Mar. 31, 2017; U.S. Provisional Patent Application No. 62/509,233, filed May 22, 2017; and U.S. Provisional Patent Application No. 62/580,494, filed Nov. 2, 2017. The content of the above-identified patent document is incorporated herein by reference.

TECHNICAL FIELD

The present application relates generally to control channels operation in wireless communication systems. More specifically, this disclosure relates to transmission structures and formats in wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide transmission structures and format in advanced communication systems.

In one embodiment, a method for a user equipment (UE) to receive a physical downlink control channel (PDCCH) is provided. The method comprises receiving configuration information for a first control resource set that includes a number of symbols in a time domain and a number of resource blocks (RBs) in a frequency domain. The method also comprises receiving a configuration indicating a first number $N_{bundle,1}$ of frequency-contiguous RBs. The method additionally comprises receiving a first PDCCH in the control resource set in a number of frequency distributed blocks of $N_{bundle,1}$ RBs. The UE assumes that a demodulation reference signal associated with the reception of the first PDCCH has a same precoding over the $N_{bundle,1}$ RBs.

In another embodiment, a user equipment (UE) comprises a receiver configured to receive configuration information for a first control resource set that includes a number of symbols in a time domain and a number of resource blocks (RBs) in a frequency domain. The receiver is also configured to receive configuration information indicating a first number $N_{bundle,1}$ of frequency-contiguous RBs. The receiver is additionally configured to receive a physical downlink control channel (PDCCH) in the control resource set in a number of frequency distributed blocks of $N_{bundle,1}$ RBs. The receiver assumes that a demodulation reference signal associated with the reception of the PDCCH has a same precoding over the $N_{bundle,1}$ RBs.

In yet another embodiment, a base station comprises a transmitter configured to transmit configuration information for a first control resource set that includes a number of symbols in a time domain and a number of resource blocks (RBs) in a frequency domain. The transmitter is also configured to transmit configuration information indicating a first number $N_{bundle,1}$ of frequency-contiguous RBs. The transmitter is additionally configured to transmit a physical downlink control channel (PDCCH) in the control resource set in a number of frequency distributed blocks of $N_{bundle,1}$ RBs. A demodulation reference signal associated with the transmission of the PDCCH has a same precoding over the $N_{bundle,1}$ RBs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through FIG. 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v14.1.0, "E-UTRA, Physical channels and modulation;" 3GPP TS 36.212 v14.1.0, "E-UTRA, Multiplexing and Channel coding;" 3GPP TS 36.213 v14.1.0, "E-UTRA, Physical Layer Procedures;" 3GPP TS 36.321 v14.1.0, "E-UTRA, Medium Access Control (MAC) protocol specification;" and 3GPP TS 36.331 v14.1.0, "E-UTRA, Radio Resource Control (RRC) Protocol Specification."

Figure 1:
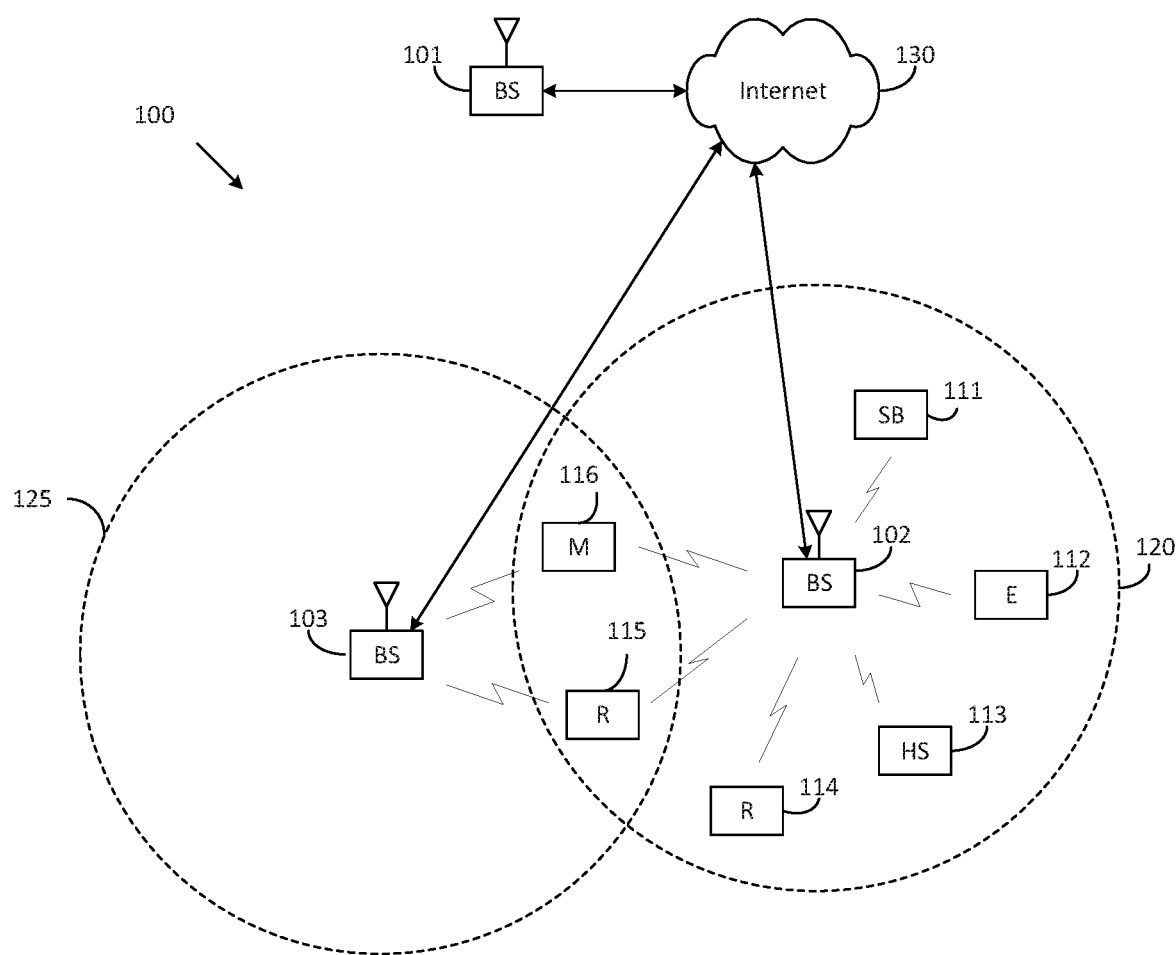
FIG. 1 illustrates an example wireless network according to embodiments of the present disclosure.
Figure 2:
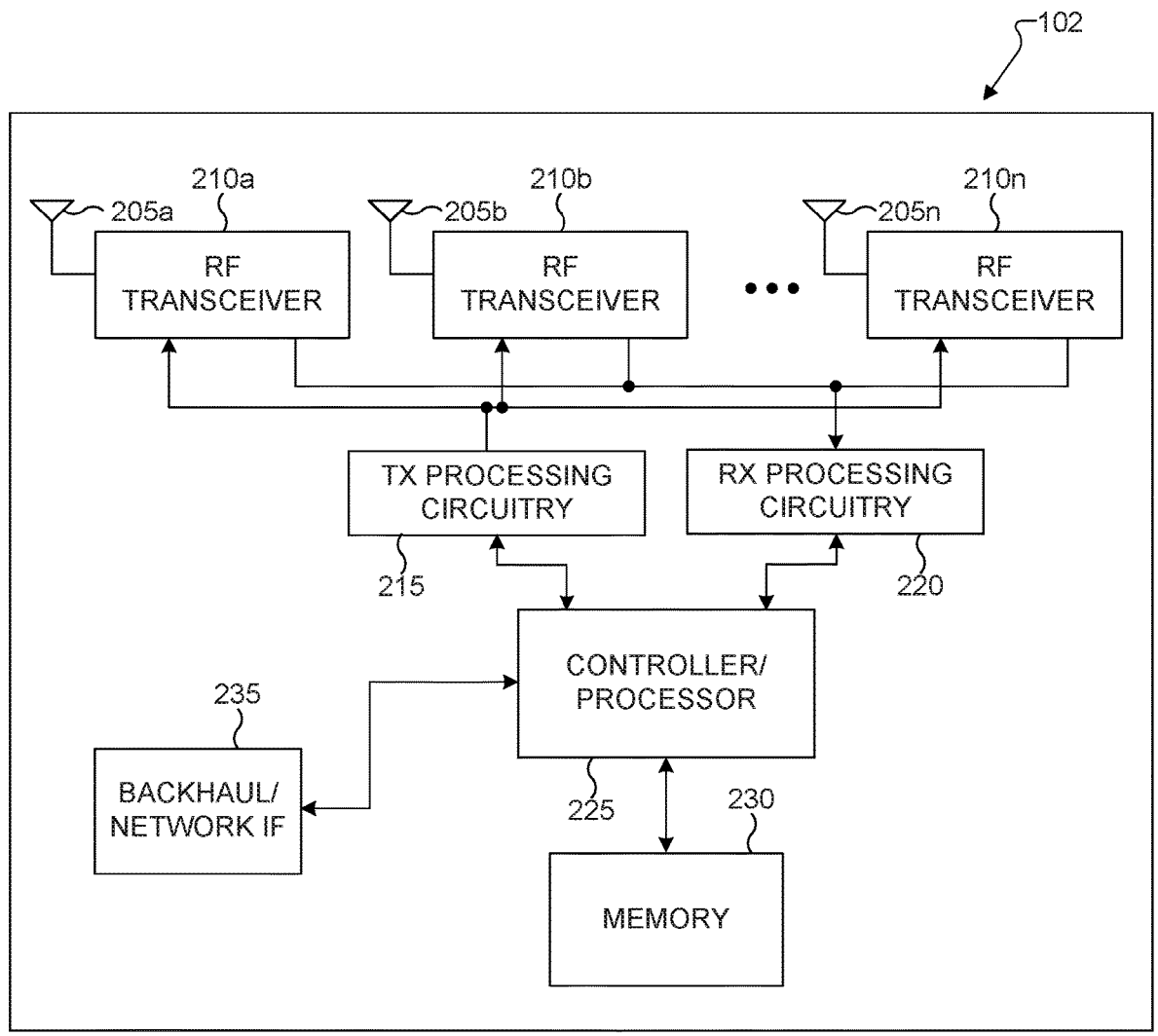
FIG. 2 illustrates an example eNB according to embodiments of the present disclosure.
Figure 3:
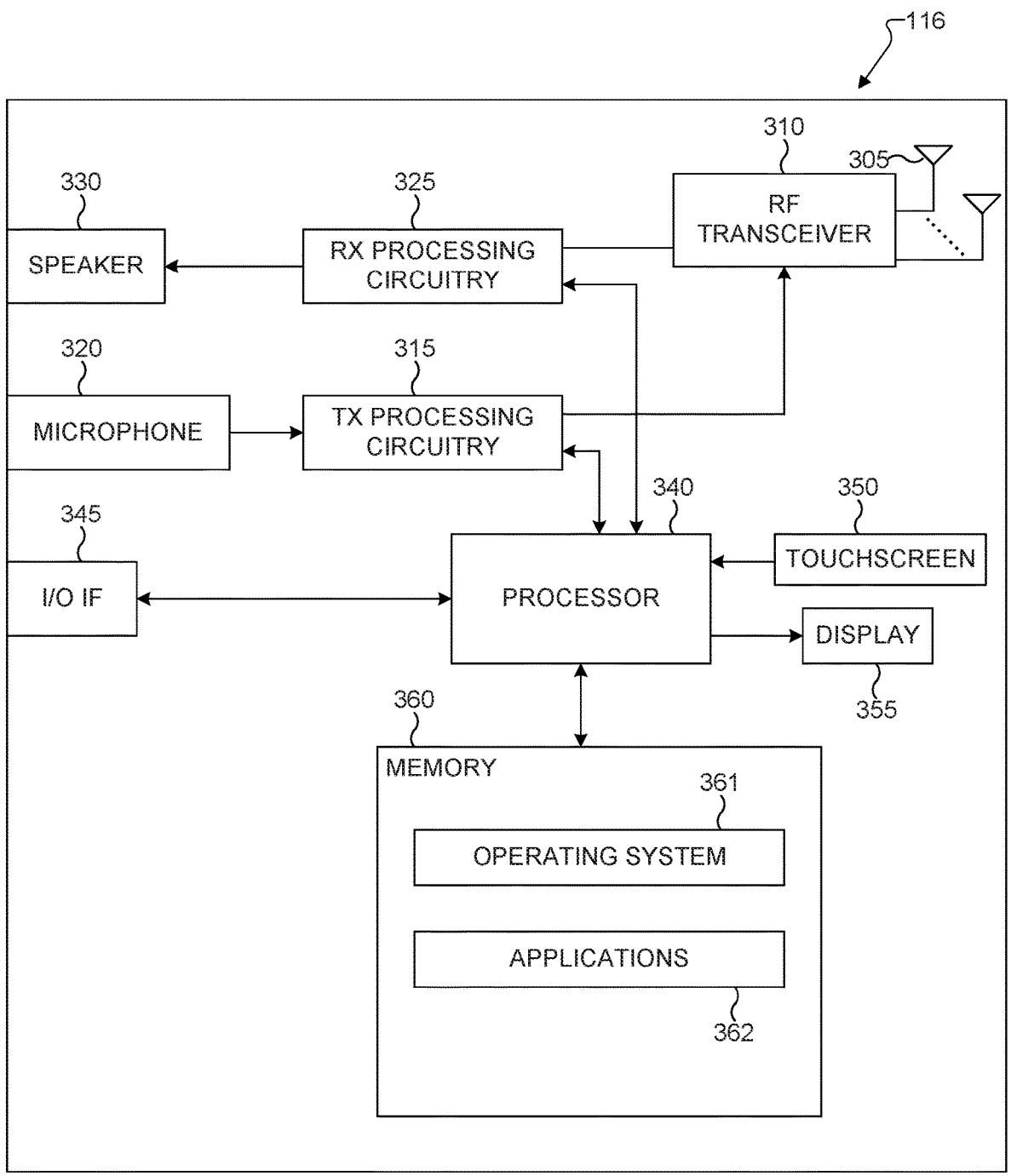
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient transmission structures and formats for DL control channels in an advanced wireless communication system. In certain embodiments, and one or more of the eNBs 101-103 includes circuitry, programming, or a combination thereof, for efficient transmission structures and formats for DL control channels in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to improving a PDCCH reception reliability and reducing an associated signaling overhead. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A time unit for DL signaling or for UL signaling on a cell is referred to as a slot and can include one or more slot symbols. A slot symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 7 symbols or 14 symbols, respectively, and an RB can have a BW of 180 KHZ and include 12 SCs with inter-SC spacing of 15 KHz or 60 KHz.

DL signals include data signals conveying information content, control signals conveying DL control information (DCI), and reference signals (RS) that are also known as pilot signals. A gNB can transmit data information or DCI through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI). A DMRS is transmitted only in the BW of a respective PDCCH or PDSCH and a UE can use the DMRS to demodulate data or control information.

Figure 4:
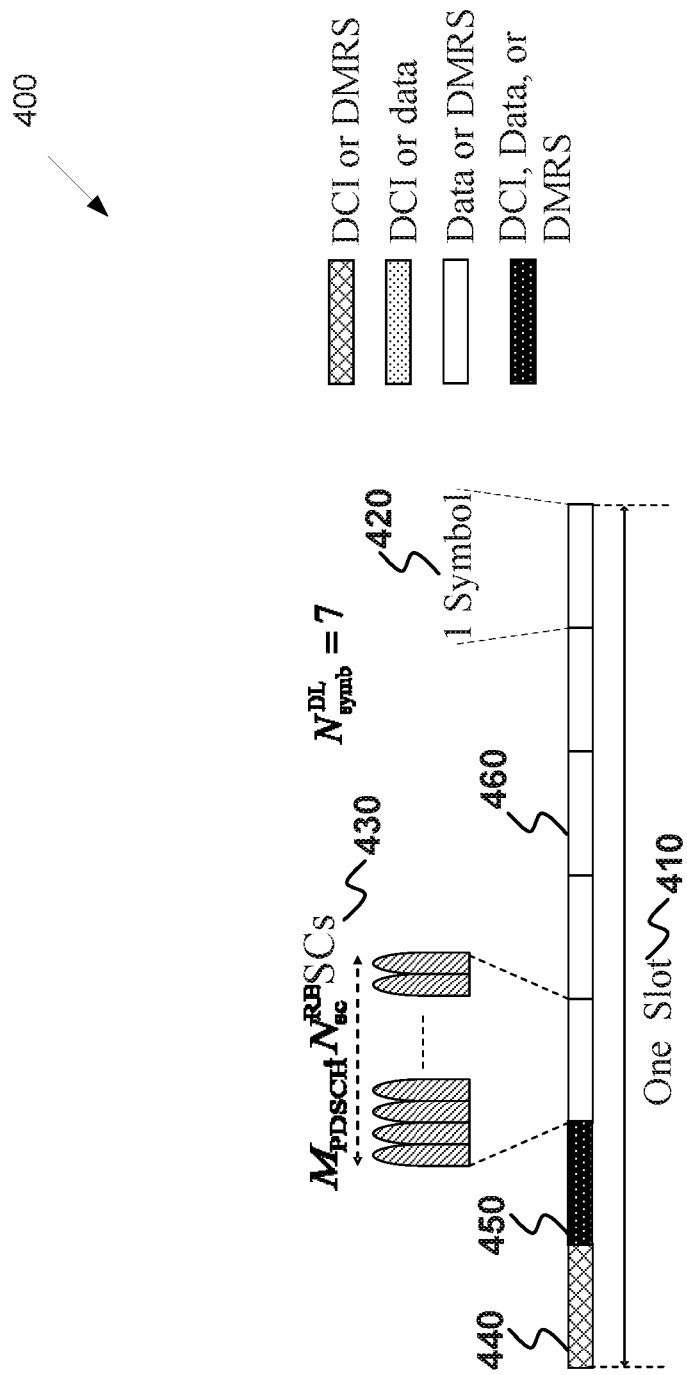
FIG. 4 illustrates an example DL slot structure for PDSCH transmission or PDCCH transmission according to embodiments of the present disclosure.

FIG. 4 illustrates an example DL slot structure 400 for PDSCH transmission or PDCCH transmission according to embodiments of the present disclosure. An embodiment of the DL slot structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

As shown in FIG. 4, a slot 410 includes $ND_{symb}^{DL}=7$ symbols 420 where a gNB transmits data information, DCI, or DMRS. A DL system BW includes $N_{RB}^{DL}$ RBs. Each RB includes $N_{sc}^{RB}$ SCs. For example $N_{sc}^{RB}=12$. A UE is assigned $M_{PDSCH}$ RBs for a total of $M_{sc}^{PDSCH}=M_{PDSCH} \cdot N_{sc}^{RB}$ SCs 430 for a PDSCH transmission BW. A PDCCH conveying DCI is transmitted over control channel elements (CCEs) that are substantially spread across the DL system BW. For example, a first slot symbol 440 can be used by the gNB to transmit DCI and DMRS. A second slot symbol 450 can be used by the gNB to transmit DCI or data or DMRS. Remaining slot symbols 460 can be used by the gNB to transmit PDSCH, DMRS associated with each PDSCH, and CSI-RS. In some slots, the gNB can also transmit synchronization signals and system information.

UL signals also include data signals conveying information content, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters for PDSCH or PDCCH transmissions to a UE.

A CSI report from a UE can include a channel quality indicator (CQI) informing a gNB of a maximum modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD or a flexible duplex system, to also provide a PMI for DL transmissions. An UL DMRS or SRS transmission can be based on a transmission of a Zadoff-Chu (ZC) sequence or, in general, of a CAZAC sequence.

Figure 5:
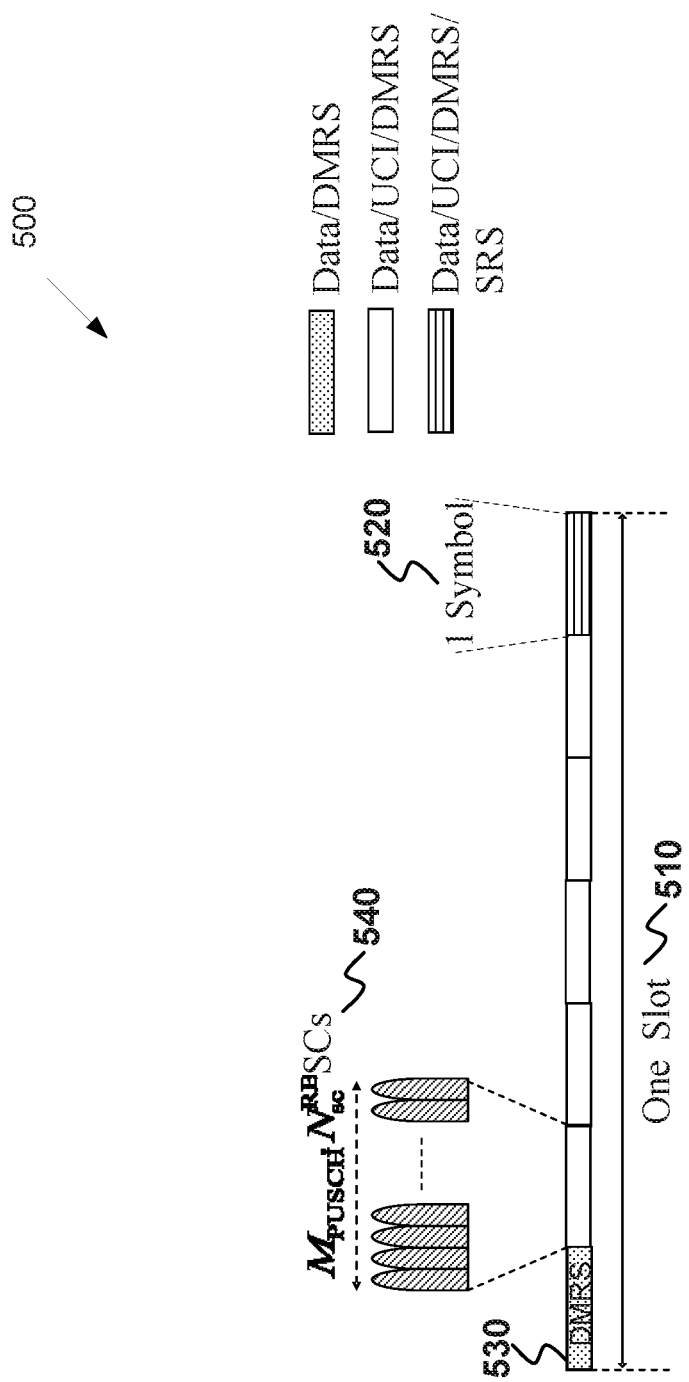
FIG. 5 illustrates an example UL slot structure for PUSCH transmission or PUCCH transmission according to embodiments of the present disclosure.

FIG. 5 illustrates an example UL slot structure 500 for PUSCH transmission or PUCCH transmission according to embodiments of the present disclosure. An embodiment of the UL slot structure 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, a slot 510 includes $N_{symb}^{UL}=7$ symbols 520 where UE transmits data information, UCI, or RS including one symbol where the UE transmits DMRS 530. An UL system BW includes $N_{RB}^{UL}$ RBs. Each RB includes $N_{sc}^{RB}$ SCs. A UE is assigned $M_{PUXCH}$ RBs for a total of $M_{sc}^{PUXCH}=M_{PUXCH}N_{sc}^{RB}$ SCs 540 for a PUSCH transmission BW ("X"="S") or for a PUCCH transmission BW ("X"="C"). A last one or more slot symbols can be used to multiplex PUCCH transmissions or SRS transmissions from one or more UEs.

A hybrid slot includes symbols for DL transmissions, one or more symbols for a guard period (GP), and symbols for UL transmissions, similar to a special SF. For example, symbols for DL transmissions can convey PDCCH and PDSCH transmissions and symbols for UL transmissions can convey PUCCH transmissions. For example, symbols for DL transmissions can convey PDCCH transmissions and symbols for an UL transmission can convey PUSCH and PUCCH transmissions.

Figure 6:
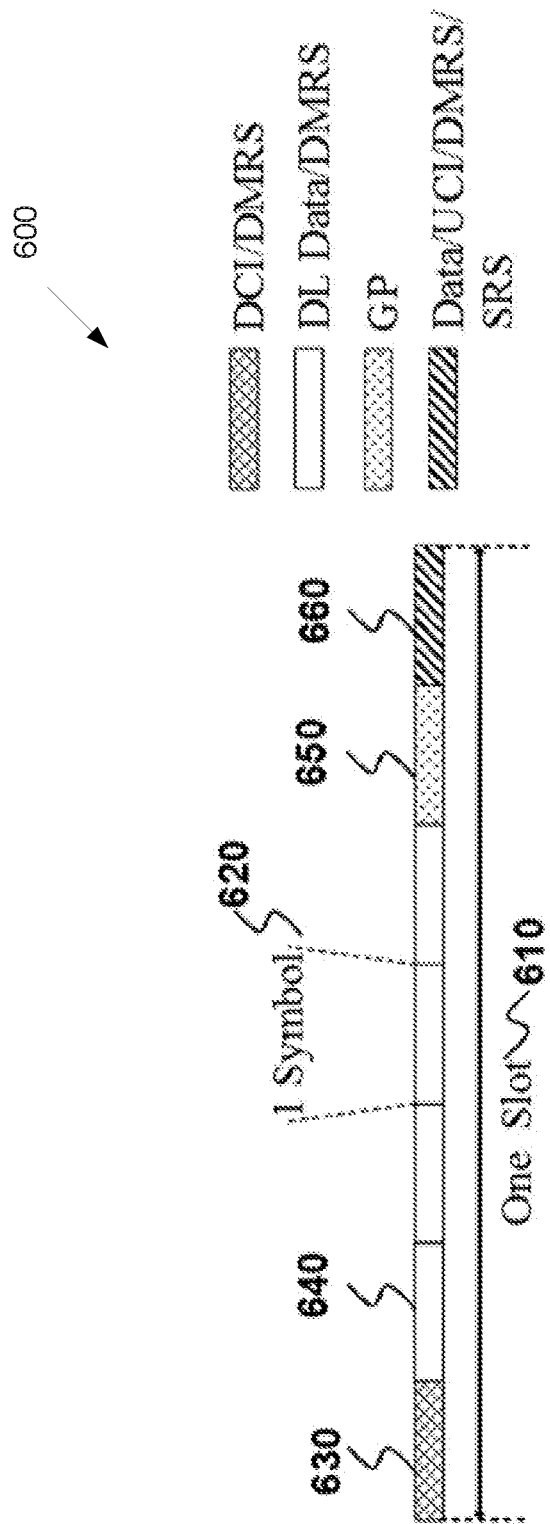
FIG. 6 illustrates an example hybrid slot structure for DL transmissions and UL transmissions according to embodiments of the present disclosure.

FIG. 6 illustrates an example hybrid slot structure 600 for DL transmissions and UL transmissions according to embodiments of the present disclosure. An embodiment of the hybrid slot structure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

As shown in FIG. 6, a slot 610 consists of a number of symbols 620 that include a symbol for DCI transmissions and DMRS in respective PDCCHs 630, four symbols for data transmissions in respective PDSCHs 640, a GP symbol 650 to provide a guard time for the UE to switch from DL reception to UL transmission, and an UL symbol for transmitting UCI on a PUCCH 660. In general, any partitioning between DL symbols and UL symbols of a hybrid slot is possible by sliding the location of the GP symbol from the second symbol of a slot to the second to last symbol of a slot.

The GP can also be shorter than one slot symbol and the additional time duration can be used for DL transmissions or for UL transmissions with shorter symbol duration. GP symbols do not need to be explicitly included in a slot structure and can be provided in practice from the gNB scheduler by not scheduling transmissions to UEs or transmissions from UEs in such symbols.

DL transmissions and UL transmissions can be based on an orthogonal frequency division multiplexing (OFDM) waveform including a variant using DFT precoding that is known as DFT-spread-OFDM.

Figure 7:
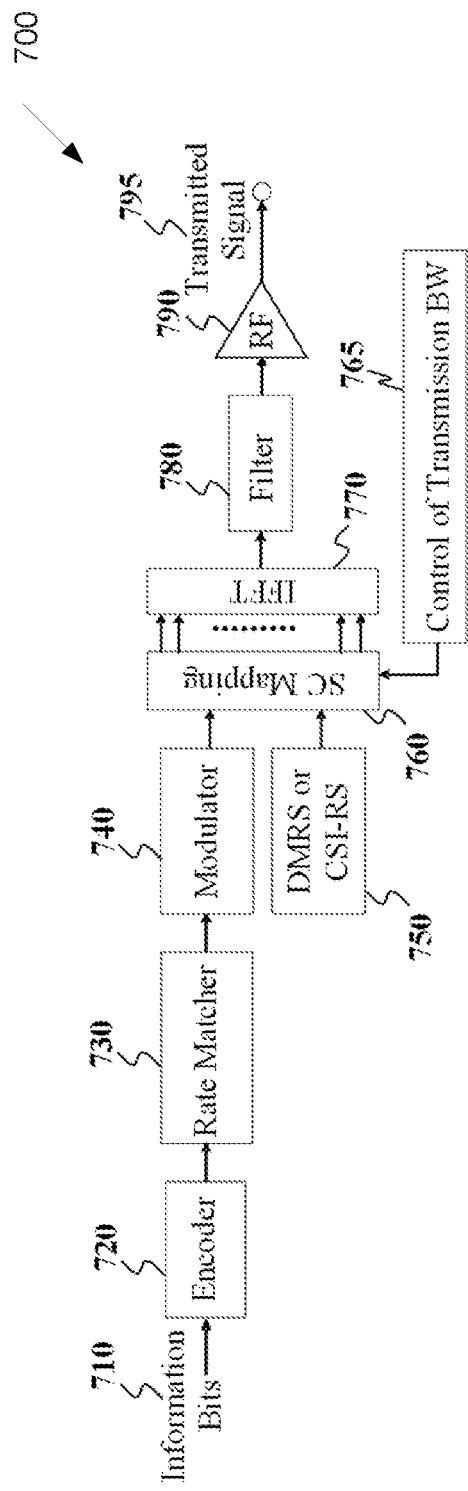
FIG. 7 illustrates an example transmitter structure using OFDM according to embodiments of the present disclosure.

FIG. 7 illustrates an example transmitter structure 700 using OFDM according to embodiments of the present disclosure. An embodiment of the transmitter structure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

As shown in FIG. 7, information bits, such as DCI bits or data bits 710, are encoded by encoder 720, rate matched to assigned time/frequency resources by rate matcher 730, and modulated by modulator 740. Subsequently, modulated encoded symbols and DMRS or CSI-RS 750 are mapped to SCs 760 by SC mapping unit 765, an inverse fast Fourier transform (IFFT) is performed by filter 770, a cyclic prefix (CP) is added by CP insertion unit 780, and a resulting signal is filtered by filter 790 and transmitted by an radio frequency (RF) unit 795.

Figure 8:
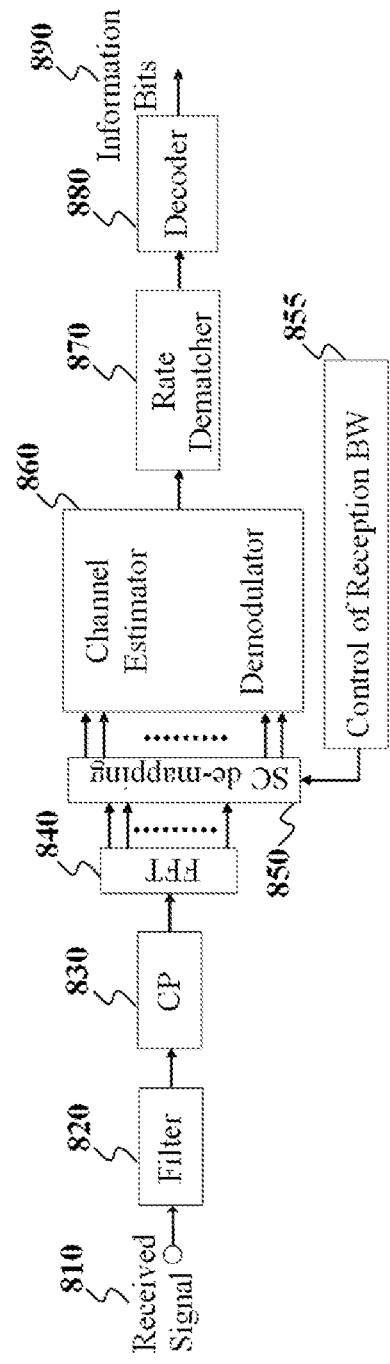
FIG. 8 illustrates an example receiver structure using OFDM according to embodiments of the present disclosure.

FIG. 8 illustrates an example receiver structure 800 using OFDM according to embodiments of the present disclosure. An embodiment of the receiver structure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

As shown in FIG. 8, a received signal 810 is filtered by filter 820, a CP removal unit removes a CP 830, a filter 840 applies a fast Fourier transform (FFT), SCs de-mapping unit 850 de-maps SCs selected by BW selector unit 855, received symbols are demodulated by a channel estimator and a demodulator unit 860, a rate de-matcher 870 restores a rate matching, and a decoder 880 decodes the resulting bits to provide information bits 890.

A UE typically monitors multiple candidate locations for respective potential PDCCH transmissions to decode multiple DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

Figure 9:
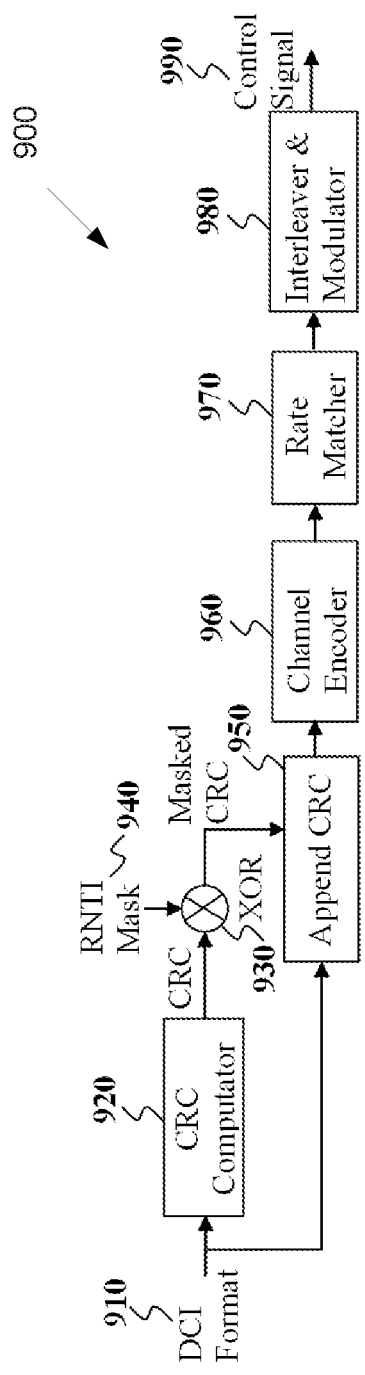
FIG. 9 illustrates an example encoding process for a DCI format according to embodiments of the present disclosure.

FIG. 9 illustrates an example encoding process 900 for a DCI format according to embodiments of the present disclosure. An embodiment of the encoding process 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

As shown in FIG. 9, a gNB separately encodes and transmits each DCI format in a respective PDCCH. When applicable, an RNTI for a UE that a DCI format is intended for masks a CRC of the DCI format codeword in order to enable the UE to identify the DCI format. For example, the CRC and the RNTI can include 16 bits. Otherwise, when an RNTI is not included in a DCI format, a DCI format type indicator field can be included in the DCI format. The CRC of (non-coded) DCI format bit 910 is determined using a CRC computation unit 920, and the CRC is masked using an exclusive OR (XOR) operation unit 930 between CRC bits and RNTI bits 940. The XOR operation is defined as XOR(0,0)=0, XOR(0.1)=1, XOR(1.0)=1, XOR(1,1)=0. The masked CRC bits are appended to DCI format information bits using a CRC append unit 950. An encoder 960 performs channel coding (such as tail-biting convolutional coding or polar coding), followed by rate matching to allocated resources by rate matcher 970. Interleaving and modulation units 980 apply interleaving and modulation, such as QPSK, and the output control signal 990 is transmitted.

Figure 10:
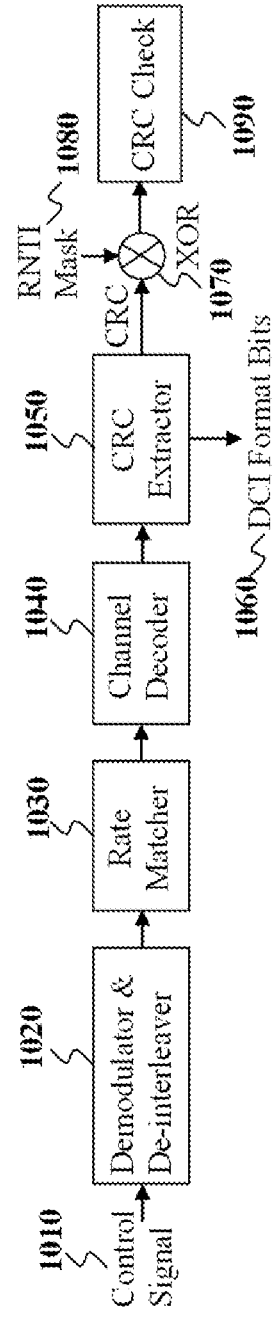
FIG. 10 illustrates an example decoding process for a DCI format for use with a UE according to embodiments of the present disclosure.

FIG. 10 illustrates an example decoding process 1000 for a DCI format for use with a UE according to embodiments of the present disclosure. An embodiment of the decoding process 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

As shown in FIG. 10, a received control signal 1010 is demodulated and de-interleaved by a demodulator and a de-interleaver 1020. A rate matching applied at a gNB transmitter is restored by rate matcher 1030, and resulting bits are decoded by decoder 1040. After decoding, a CRC extractor 1050 extracts CRC bits and provides DCI format information bits 1060. The DCI format information bits are de-masked 1070 by an XOR operation with an RNTI 1080 (when applicable) and a CRC check is performed by unit 1090. When the CRC check succeeds (check-sum is zero), the DCI format information bits are considered to be valid. When the CRC check does not succeed, the DCI format information bits are considered to be invalid.

A PDCCH transmission is in RBs and symbols of a control resource set. A UE can be configured RBs and symbols for one or multiple control resource sets. A PDCCH is transmitted using an aggregation of one or several control channel elements (CCEs). A block of encoded and modulated symbols of a DCI format are mapped in sequence to resource elements (k,l), across SC index k and slot symbol l, on an associated antenna port that are part of the CCEs assigned for the PDCCH transmission. A PDCCH transmission can be distributed in frequency, and is then also referred to as interleaved PDCCH transmission, or localized in frequency and is then also referred to as non-interleaved PDCCH transmission.

For example, $l \in \{0, 1\}$. A PDCCH search space can be common to UEs or can be UE-specific when a UE is configured a C-RNTI equal to nRNTI. For example, for the common search space $Y_k$ is set to 0 for two CCE aggregation levels L=4 and L=8, while for the UE-specific search space $S_k^{(L)}$ at CCE aggregation level L, the variable $Y_k$ is defined by $Y_k = (A \cdot Y_{k-1}) \mod D$ where $Y_{-1} = n_{RNTI} \neq 0$, A=39827, D=65537 and k is a slot number. For example, for an aggregation level of L CCEs, the location of CCEs for PDCCH candidate m in a subframe k that includes $N_{CCE,K}$ CCEs can be determined as $L\{(Y_k + m') \mod \lfloor N_{CCE,k}/L \rfloor\} + i$, i=0, . . . L−1. When a UE is not configured with a C-RNTI, a search space is common to all UEs.

An important objective in the design of PDCCH transmissions is to improve a respective reliability. This can be achieved through several mechanisms including support of frequency diversity or beam-forming, enabling accurate channel estimation, improved coverage, and minimization of DCI format sizes. Improved reliability for PDCCH transmissions can offer improved throughput, as decoding of a PDCCH conveying a DCI format scheduling data transmission to one or UEs or data transmission from one or more UEs is less likely to be incorrect, and reduced overhead for PDCCH transmissions as fewer resources need to be used thereby allowing more resources to be used for data transmissions. Further, a DCI format may enable dynamic switching of a transmission mode while minimizing an associated payload.

PDCCH transmissions need to also be able to schedule PDSCH transmissions with reduced latency and improved reception reliability. This typically implies that PDCCH and PDSCH transmissions are over a small number of symbols, PDSCH transmissions convey small transport block sizes, and PDCCH can represent a material overhead. In such cases, it is important to minimize an overhead associated with PDCCH transmission by enabling re-use for PDSCH demodulation of a DMRS used for PDCCH demodulation.

UEs communicating with a gNB need to be able to perform time tracking and frequency tracking in order to be able to maintain reliable communication with the gNB. Typically, this is achieved by the gNB transmitting an RS that UEs can use for time tracking and frequency tracking. To minimize an overhead associated with a transmission of such RS, it is desirable that the RS is not continuously transmitted, even periodically, and that the RS can be an RS also used for other functionalities such as a DMRS used for PDCCH demodulation.

Therefore, there is a need to design a PDCCH transmission enabling frequency diversity with enhanced channel estimation. There is a need to design a PDCCH transmission enabling beam-forming and enhanced channel estimation. There is a need to enable DMRS re-use for demodulation of PDCCH transmissions and of PDSCH transmissions. There is another need to enable configurable CCE aggregation levels for PDCCH transmissions in a common search space. Finally, there is another need to enable DMRS re-use for time tracking and frequency tracking and for demodulation of PDCCH transmissions.

In some embodiments, a CCE structure for distributed PDCCH transmissions that depends on a respective aggregation level is considered in order to enable frequency diversity and enhanced channel estimation. Use of a small CCE aggregation level is typically associated with UEs experiencing a relatively high SINR while use of a large CCE aggregation level is typically associated with UEs experiencing a relatively low SINR. Channel estimation accuracy has a strong dependence on the SINR and the lower the SINR, the worse the channel estimation accuracy, and the larger the degradation in PDCCH reception reliability due to inaccurate channel estimation. Conversely, frequency diversity is a property of a PDCCH transmission structure and does not depend on the SINR. Therefore, a design objective is to enable sufficient frequency diversity while also enabling an accuracy of a channel estimate to increase as a CCE aggregation level for an associated PDCCH transmission increases. Typically, a frequency diversity of an order of about two or four is sufficient to capture nearly all frequency diversity gains offered by a channel medium.

The following descriptions assume that one CCE includes four RBs but any other number of RBs, such as six RBs, can also apply. For a frequency distributed PDCCH transmission that includes one CCE or four RBs, respective RBs can be distributed in frequency and are not adjacent in frequency. This enables the PDCCH transmission to capture nearly all frequency diversity gains that a channel medium can provide but a DMRS used for channel estimation needs to be confined within each RB and it is not generally beneficial for a UE to filter channel estimates obtained across frequency distributed RBs. An RB is equivalent to a resource element group (REG).

For a frequency distributed PDCCH transmission that includes two CCEs or eight RBs, channel estimation can improve by distributing four pairs of RBs in frequency. Then, for demodulating a PDCCH candidate that includes two CCEs, a UE can filter a DMRS in pairs of RBs, assuming a same DMRS precoding in each pair of RBs, to improve a respective reliability of a channel estimate. Similar, for a frequency distributed PDCCH transmission that includes four CCEs or eight CCEs, corresponding to or sixteen or thirty two RBs respectively, transmission can be in blocks of four RBs or in blocks of eight RBs that are distributed in frequency (over four respective frequency locations assuming a transmission bandwidth larger than thirty two RBs).

Then, a UE can filter a DMRS within respective blocks of RBs and improve a respective reliability of a channel estimate while an associated PDCCH transmission can obtain all frequency diversity gains from the channel medium. It is also possible for a frequency distributed PDCCH transmission to be in blocks of RBs starting from an aggregation level of one CCE. For example, when a CCE includes six RBs, a PDCCH transmission with an aggregation level of one CCE to a UE can be in blocks of two RBs over three frequency non-contiguous blocks of two RBs in a DL system bandwidth configured for PDCCH transmissions to the UE.

In general, for a CCE that includes $N_{CCE}^{RBs}$, a UE can be configured by higher layers a number of $N_{bundle}$ RBs forming a block of frequency-contiguous RBs and a distributed CCE-to-RB mapping can be in blocks of $N_{bundle}$ RBs for a total of $N_{CCE}^{RBs}/N_{bundle}$ frequency distributed blocks of $N_{bundle}$ RBs. For example, for a control resource set that includes one symbol, $N_{CCE}^{RBs}=6$, and $N_{bundle}=2$, there are NRBs $N_{CCE}^{RBs}/N_{bundle}=3$ frequency distributed blocks while for $N_{CCE}^{RBs}=6$ and $N_{bundle}=6$, $N_{CCE}^{RBs}/N_{bundle}=1$ there is only one block of $N_{bundle}=6$ frequency contiguous RBs. For a given DMRS antenna port is an RB, a UE can assume that a same precoder applies to all RBs in a bundle of RBs. It is also possible for the bundle of RBs to be larger than $N_{CCE}^{RBs}$.

This can be useful for transmissions of UE-common PDCCHs, for example in a common search space (CSS), where a DMRS can be UE-common. For example, for a PDCCH transmission in a control resource set spanning a BW of $N_{total}$ RBs, a UE can be configured to assume a same DMRS precoding over a number of RBs that can be equal to $N_{total}$, or $N_{total}/2$ or $N_{total}/4$. This can allow a UE to filter a DMRS over a larger number of RBs and improve a channel estimate.

For the CSS, $N_{bundle}$ can be predefined in a system operation or be signaled by broadcast system information such as a master information block (MIB) or a secondary system information block (SIB). For example, a PDCCH scheduling a transmission of a first SIB can have a bundle size that is predetermined in the system operation while a PDCCH scheduling a transmission of a second SIB or of a RAR can have a bundle size that is signaled in the first SIB.

A CCE can be transmitted over one OFDM symbol. Coverage enhancements can be obtained, when necessary, by using larger CCE aggregation levels for a PDCCH transmission and distributed respective CCEs over multiple OFDM symbols. For example, for a DL control resource set that includes $N_{control}^{set}$ OFDM symbols in a slot and a PDCCH candidate corresponding to an aggregation level of L CCEs, CCE i, i=0, . . . L−1, can be located in OFDM symbol with index determined as i mod ($N_{control}^{set}-1$) in case of frequency-first REG-to-CCE mapping.

For a DL control resource set that includes $M_{control}^{set}$ RBs, the first block of RBs can start at RB with index (m+O)mod ($M_{control}^{set}1$), the second block of RBs can start at RB with index (m+O+$\lfloor (M_{control}^{set}-1)/4 \rfloor$)mod($M_{control}^{set}-1$), the third block of RBs can start at RB with index (m+O+2·$\lfloor (M_{control}^{set}-1)/4 \rfloor$)mod($M_{set}^{control}-1$), and the fourth block of RBs can start at RB with index (m+O+3·$\lfloor (M_{control}^{set}-1)/4 \rfloor$) mod($M_{control}^{set}1$), where O is a UE-specific offset or a cell-specific offset that can be, for example, determined from a C-RNTI for the UE, or explicitly configured using higher layer signaling by a gNB, or determined by an identity of a cell where the PDCCH is transmitted.

Figure 11:
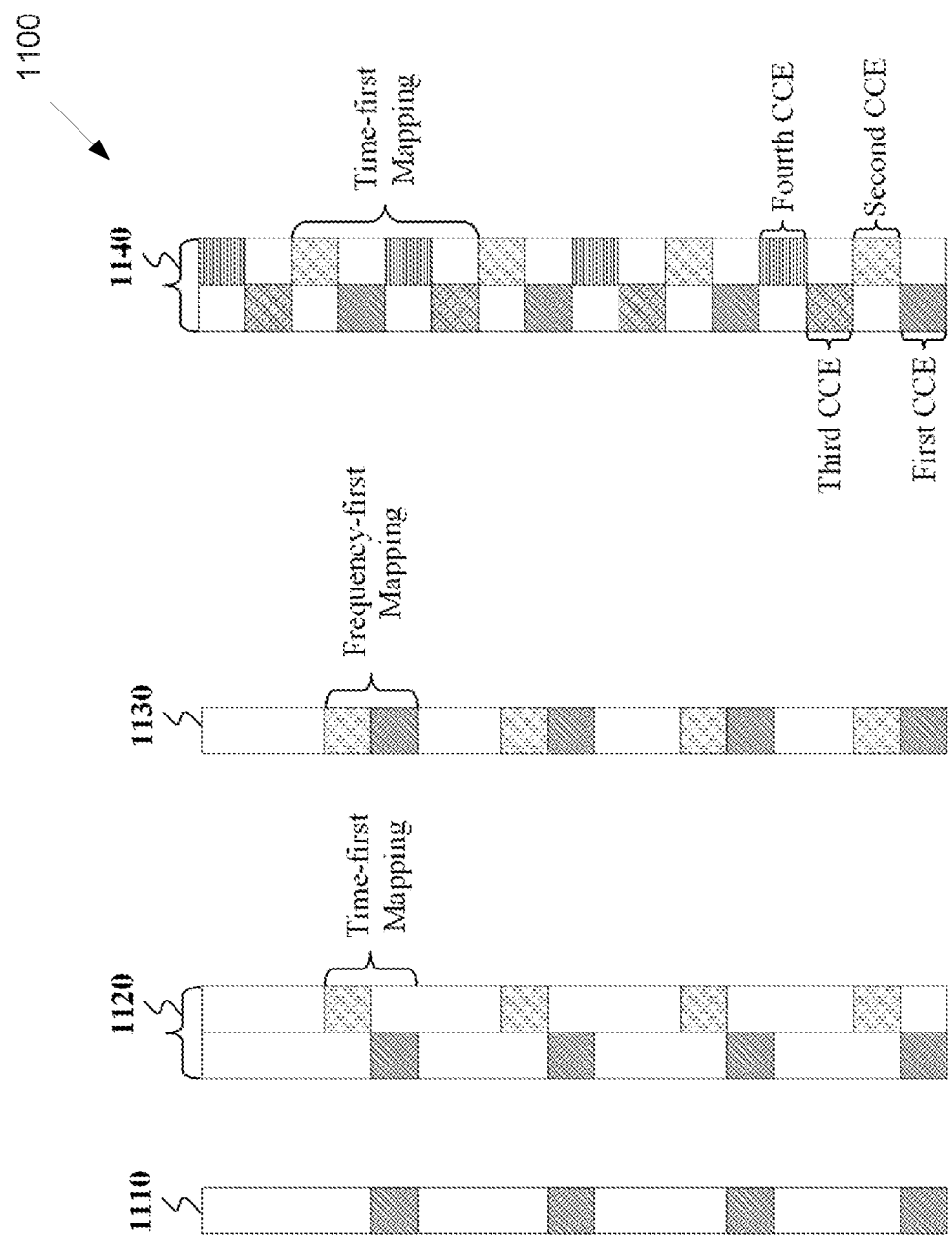
FIG. 11 illustrates an example distributed PDCCH transmission structure depending on a respective CCE aggregation level according to embodiments of the present disclosure.

FIG. 11 illustrates an example distributed PDCCH transmission structure 1100 depending on a respective CCE aggregation level according to embodiments of the present disclosure. An embodiment of the distributed PDCCH transmission structure 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

For a PDCCH transmission with aggregation level of one CCE that includes four RBs, the RBs are distributed in frequency per single RB 1110. For a PDCCH transmission with aggregation level of two CCEs and time-first mapping of CCEs, the respective eight RBs are distributed in frequency in blocks of two adjacent RBs where the first RB from a block of RBs in on a first OFDM symbol for the first CCE and the second RB from the block of RBs in on a second OFDM symbol for the second CCE 1120.

For a PDCCH transmission with aggregation level of two CCEs and frequency-first mapping of CCEs, the respective eight RBs are distributed in frequency in blocks of two adjacent RBs where each a block of RBs is on a same OFDM symbol 1130. Similar structures can apply for PDCCH transmissions with CCE aggregation levels larger than two CCEs. For time first mapping, when there are fewer OFDM symbols than CCEs for a CCE aggregation level, such as for example when there are two OFDM symbols for mapping an aggregation level of four CCEs, wrap around can apply for the mapping of CCEs 1140.

The mapping of CCEs to RBs in FIG. 11 considers interleaving of RBs per OFDM symbol to obtain distributed (non-consecutive) indexes of RBs in the physical domain from contiguous (consecutive) RB indexes in the logical domain that form a CCE. Otherwise, if interleaving was not per OFDM symbol but instead was over both OFDM symbols, it would not be possible to have RBs for a given CCE located in only one OFDM symbol.

A different mapping of CCEs to OFDM symbols can be configured for different PDCCH transmission types. For example, time-first mapping can apply for a beam-formed localized PDCCH transmission to a UE in order to maximize a localization of the beam-formed PDCCH transmission and maximize associated precoding gains while frequency-first mapping can apply for a frequency distributed PDCCH transmission using transmitter antenna diversity in order to maximize frequency diversity gains.

For a PDCCH transmission with aggregation level of one CCE that includes four RBs and time-first CCE-to-REG mapping, the RBs of an REG bundle are first distributed in time per OFDM symbol. When a DL control resource set has $N^{set}_{control}$ OFDM symbols that are fewer than a number of RBs $N_{RB}^{L}$ for an aggregation level of L CCEs, a wraparound is applied in the time domain for the $N_{bundle}$ RBs and a $N_{control}^{set}+1$ RB is contiguous to a first RB in a first OFDM symbol, a $N_{control}^{set}+2$ RB is contiguous to a first RB in a second OFDM symbol, a $2 \cdot N_{control}^{set}+1$ RB is contiguous to a second RB in a first OFDM symbol, a $p \cdot 2 \cdot N_{control}^{set}+2$ RB is contiguous to a first RB in a second OFDM symbol, and so on. In general, a $p \cdot N_{control}^{set}+q$ RB is contiguous to the p−1 RB in the q OFDM symbol.

Figure 12:
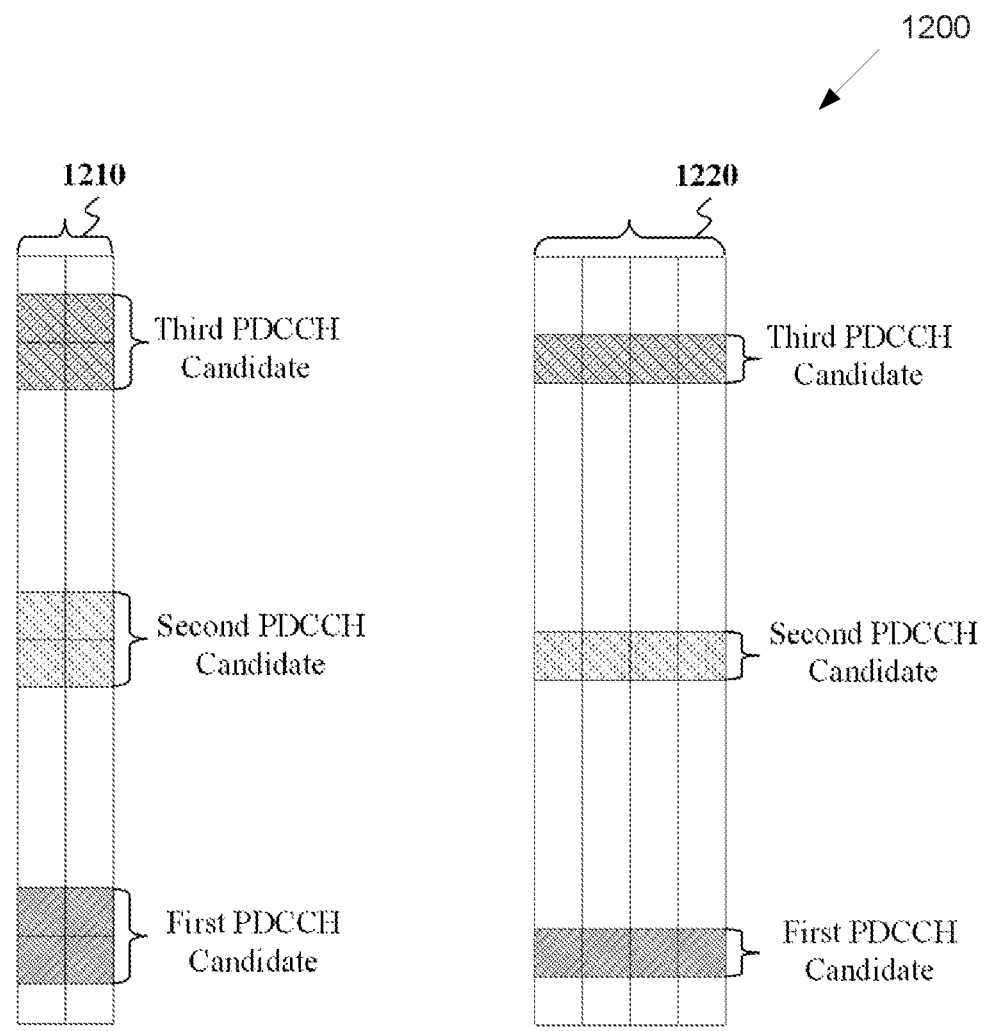
FIG. 12 illustrates an example localized PDCCH transmission structure depending on a respective CCE aggregation level according to embodiments of the present disclosure.

FIG. 12 illustrates an example localized PDCCH transmission structure 1200 depending on a respective CCE aggregation level according to embodiments of the present disclosure. An embodiment of the localized PDCCH transmission structure 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As shown in FIG. 12, for a DL control resource set includes $N_{control}^{set}=2$ symbols 1210 and a PDCCH transmission with an aggregation level of one CCE that includes four RBs, a first and a third RB are mapped consecutively in frequency on a first OFDM symbol and a second and a fourth RB are mapped consecutively in frequency on a second OFDM symbol for each PDCCH candidate. For a DL control resource set includes $N_{control}^{set}=4$ symbols 1220 and a PDCCH transmission with an aggregation level of one CCE that includes four RBs, a first, second, third, and fourth RB is mapped respectively on a same RB index on a first, second, third, and fourth OFDM symbol. PDCCH candidates are distributed in frequency.

A CCE mapping as in FIG. 11 or as in FIG. 12 can allow coexistence in a same bandwidth of UEs with different bandwidth reception capabilities and coexistence of a common search space and of a UE-specific search space in a same DL control resource set.

A UE can be configured to monitor different DL control resource sets, associated with different search spaces, in different symbols of a slot or in different slots. The configuration can be by UE-group common higher layer signaling or by UE-specific higher layer signaling. For example, a UE can be configured to monitor a first DL control resource set associated with a common search space in a first one or more symbols of a slot and be configured to monitor a second DL control resource set associated with a UE-specific search space in second one or more symbols of a slot, for example immediately after the first one or more symbols of a slot.

For example, a UE can be configured to monitor a first DL control resource set associated with a first common search space in a first one or more symbols of a slot and be separately configured to monitor a second DL control resource set associated with a second common search space in second one or more symbols of a slot, for example immediately after the first one or more symbols of a slot. For example, a UE can be configured to monitor a first DL control resource set associated with a first UE-specific search space, for example for transmissions from a first beam, in a first one or more symbols of a slot and be configured to monitor a second DL control resource set associated with a second UE-specific search space for transmissions from a second beam in second one or more symbols of a slot, for example immediately after the first one or more symbols of a slot.

For example, a UE can be configured to monitor a first DL control resource set according to parameters, such as PDCCH candidates or transmission scheme, such as distributed or localized PDCCH transmission, associated with a common search space in a first number of slots in a period of slots and monitor the first DL control resource set according to parameters associated with a UE-specific search space in a second number of slots in the period of slots. The period of slots can be determined in a system operation, such as 10 slots or 20 slots, or be configured to a UE by UE-group common or UE-specific higher layer signaling. Monitoring of a search space by a UE means that the UE performs decoding operations for PDCCH candidates using respective CCEs in the search space.

A UE can monitor UE-specific DCI formats both in a common search space and in a UE-specific search space. To enable this functionality, a UE can adjust parameters for a reception of a UE-specific DCI format in a control resource set according to an associated search space type (common or UE-specific). For example, a sequence scrambling a transmission of a DMRS associated with a UE-specific DCI format transmission in a PDCCH can be a first scrambling sequence when the transmission is in a common search space, and a second scrambling sequence when the transmission is in a UE-specific search space. For example, a number of sub-carriers used for DMRS transmission in an RB can have a first value in a common search space and a second value in a UE-specific search space. For example, a first transmission scheme, such as transmit antenna diversity for distributed PDCCH transmission, can be associated with DCI format reception in a common search space and a second transmission scheme, such as precoding/beamforming for a localized PDCCH transmission, can be associated with DCI format reception in a UE-specific search space.

A UE can also be configured to monitor a first search space with a first periodicity and a second search space with a second periodicity. For example, the first search space can be a common search space and a periodicity can be five slots and the second search space can be a UE-specific search space and the periodicity can be one slot. For example, the first search space can be a first UE-specific search space and a periodicity can be one slot and the second search space can be a second UE-specific search space and the periodicity can be one-fifth or one-half of a slot. A number of decoding operations that a UE can perform during a time period can therefore depend on a number of search spaces the UE monitors during that period.

For example, in time periods when the UE does not monitor a common search space, associated PDCCH decoding operations can be used for monitoring a UE-specific search space. A number of PDCCH candidates, at least for some CCE aggregation levels for a UE-specific search space, can be larger in time periods where the UE does not monitor a common search space. For example, in time period when a UE does not monitor a UE-specific search space associated with a longer periodicity, corresponding PDCCH decoding operations can be allocated to monitoring a UE-specific search space associated with a shorter periodicity. A number of PDCCH candidates at least for some CCE aggregation levels for a UE-specific search space with a shorter monitoring periodicity can be larger in time periods where the UE does not monitor a UE-specific search space with a longer monitoring periodicity.

For each serving cell, higher layer signaling configures a UE with P control resource sets. For control resource set p, $0 \leq p < P$, the configuration can include: a subcarrier spacing and a CP length; a first symbol index provided by higher layer parameter CORESET-start-symb; a number of consecutive symbols provided by higher layer parameter [CORESET-time-duration]; a set of resource blocks provided by higher layer parameter CORESET-freq-dom; CCE-to-REG mapping provided by higher layer parameter CORESET-trans-type; and/or an REG bundle size, in case of interleaved CCE-to-REG mapping, provided by higher layer parameter CORESET-REG-bundle-size; whether the PDCCH transmission is distributed or localized provided by a higher layer parameter CORESET-CCE-REG-mapping-type, or an antenna port quasi-collocation provided by higher layer parameter [CORESET-QCL-ConfigId].

For each serving cell and for each DCI format that a UE is configured to monitor PDCCH, the UE is configured the following associations to control resource sets: a set of control resource sets by higher layer parameter DCI-to-CORESET-map; a number of PDCCH candidates per CCE aggregation level L per control resource set in the set of control resource sets by higher layer parameter CORESET-candidates-DCI; and/or a monitoring periodicity of $k_p$ symbols per control resource set in the set of control resource sets, in non-DRX mode operation, by higher layer parameter CORESET-monitor-period-DCI.

Each control resource set includes a set of CCEs numbered from 0 to $N_{CEE,p,k_p}-1$ where $N_{CCE,p,k_p}$ is the number of CCEs in control resource set p in monitoring period $k_p$. The monitoring periods can be indexed within (modulo) a predetermined time period, such as a number of system frame numbers, a system frame number cycle, or a predetermined duration such as 40 milliseconds.

The sets of PDCCH candidates that a UE monitors are defined in terms of PDCCH UE-specific search spaces. A PDCCH UE-specific search space $S_{k_p}^{(L)}$ at CCE aggregation level L, such as $L \in \{1, 2, 4, 8, 16\}$, is defined by a set of PDCCH candidates for CCE aggregation level L.

If a UE is configured with higher layer parameter cif-InSchedulingCell the carrier indicator field value corresponds to cif-InSchedulingCell.

For a serving cell on which a UE monitors PDCCH candidates in a UE-specific search space, if the UE is not configured with a carrier indicator field, the UE monitors the PDCCH candidates without carrier indicator field. For a serving cell on which a UE monitors PDCCH candidates in a UE-specific search space, if a UE is configured with a carrier indicator field, the UE monitors the PDCCH candidates with carrier indicator field.

For a control resource set p and for a DCI format A, for example for P=2 control resource sets, the CCEs corresponding to PDCCH candidate $m_{n_{CI}}$ of the search space for a serving cell corresponding to carrier indicator field value $n_{CI}$ are given by:

$$L \cdot \left\{ \left( Y_{p,k} + \left\lfloor \frac{m_{n_{CI}} \cdot N_{CCE,p,k_p}}{L \cdot M_{p,max}^{(L)}} \right\rfloor + n_{CI} \right) \bmod \lfloor N_{CCE,p,k_p}/L \rfloor \right\} + i \quad \text{equation 1}$$

where $Y_{p,k}=(A_p \cdot Y_{p,k_p-1}) \bmod D$, $Y_{p,-1}=N_{RNTI} \neq 0$, $A_1=39827$, $A1=39829$, and $D=65537$; $i=0, \ldots, L-1$; $n_{CI}$ is the carrier indicator field value if the UE is configured with a carrier indicator field for the serving cell on which PDCCH is monitored; otherwise $n_{CI}=0$; $M_{p,max}^{(L)}$ is the maximum number of PDCCH candidates that can be either among all configured DCI formats or only for the DCI format A, over all configured $n_{CI}$ values for a CCE aggregation level L in control resource set p; $m_{n_{ci}}=0, \ldots, M_{p,n_{CI}}^{(L)}-1$, where $M_{p,n_{CI}}^{(L)}$ is the number of PDCCH candidates the UE is configured to monitor for aggregation level L for a serving cell corresponding to $n_{CI}$; $n_{RNTI}$ is the RNTI value used for the respective DCI format.

As $M_{p,max}^{(L)}$ can be different at different PDCCH monitoring periods $k_p$, the value of $M_{p,max}^{(L)}$ can depend on the PDCCH monitoring period and therefore, $M_{p,max}^{(L)}$ can be replaced by $M_{p,k_p,max}^{(L)}$. Therefore, $M_{p,max}^{(L)}$ can be the maximum number of PDCCH candidates, either among all configured DCI formats or only for the DCI format A, over all configured $n_{CI}$ values for a CCE aggregation level L in control resource set p and at PDCCH monitoring period $k_p$. Otherwise, $M_{p,max}^{(L)}$ can be the maximum number of PDCCH candidates among all configured DCI formats over all configured $n_{CI}$ values and over all overlapping PDCCH monitoring periods for a CCE aggregation level L in control resource set p.

A UE configured to monitor PDCCH candidates in a given serving cell with a given DCI format size with carrier indicator field, and CRC scrambled by C-RNTI, where the PDCCH candidates can have one or more possible values of carrier indicator field for the given DCI format size, can assume that an PDCCH candidate with the given DCI format size can be transmitted in the given serving cell in any PDCCH UE specific search space corresponding to any of the possible values of carrier indicator field for the given DCI format size.

Using a same DMRS for PDCCH and PDSCH demodulation is generally not possible as a PDCCH transmission scheme can be different from a PDSCH transmission scheme and a PDCCH transmission bandwidth can be different from a PDSCH transmission bandwidth. For example, a PDCCH transmission to a UE can be without spatial multiplexing of layers and in a first bandwidth while a PDSCH transmission to a UE can be with spatial multiplexing of layers and in a second bandwidth.

To reduce overhead associated with a first DMRS transmission for PDCCH demodulation and with a second DMRS transmission for PDSCH demodulation, particularly for transmission of small data transport block sizes that typically do not benefit from spatial multiplexing of layers, a UE can assume a same transmission scheme for PDCCH transmission and for PDSCH transmission. Further, a PDCCH transmission bandwidth can be included in a PDSCH transmission bandwidth.

Figure 13:
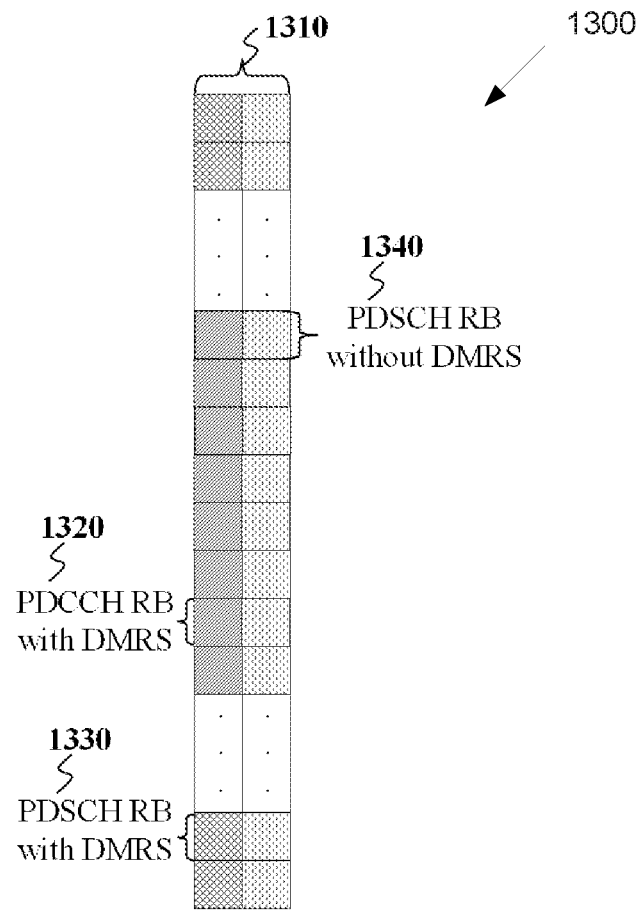
FIG. 13 illustrates an example PDCCH transmission and PDSCH transmission using a same DMRS for demodulation according to embodiments of the present disclosure.

FIG. 13 illustrates an example PDCCH transmission and PDSCH transmission 1300 using a same DMRS for demodulation according to embodiments of the present disclosure. An embodiment of the PDCCH transmission and PDSCH transmission 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

As shown in FIG. 13, a PDCCH transmission is over a first OFDM symbol and a PDSCH transmission in over a first and second OFDM symbols 1310. The PDCCH transmission is over a number of RBs that is a subset of a number of RBs for the PDSCH transmission. For example, the RBs for the PDCCH transmission can be the center C RBs of the D≥C RBs for the PDSCH transmission. The PDCCH RBs 1320 and the PDSCH RBs in the first OFDM symbol include sub-carriers used for DMRS transmission in addition to sub-carriers used for transmission of control information and data information, respectively. For example, one sub-carrier every three sub-carriers can be used for DMRS transmission. The PDSCH RBs 1340 in the second OFDM symbol do not include any sub-carriers used for DMRS transmission. For demodulation of a PDCCH transmission or of a PDSCH transmission, a UE can filter the DMRS sub-carriers in both the RBs used for PDSCH transmission and the RBs used for PDCCH transmission in the first symbol.

This also reduces UE computational complexity and power consumption as the UE needs to obtain only one channel estimate to demodulate a PDCCH transmission and a PDSCH transmission. In order for the DMRS filtering across the RBs in the first OFDM symbol to result to a valid channel estimate, the DMRS needs to use a same precoding across all RBs in the first OFDM symbol and the same precoding also needs to be used for the PDCCH transmission and for the PDSCH transmission. For example, both the PDCCH transmission and the PDSCH transmission can be based on a same transmitter diversity scheme. For example, both the PDCCH transmission and the PDSCH transmission can be based on the use of a same precoding for beam-formed transmissions.

As a DMRS can be power boosted to improve channel estimation, it can be beneficial to avoid placing DMRS transmission in neighboring cells on same sub-carriers of a same slot symbol as, otherwise, usefulness from an increase in DMRS transmission power may be largely nullified due to mutual interference of among power boosted DMRS. Therefore, a location (sub-carriers) used for a DMRS transmission in an RB can be pseudo-random or indicated by a gNB for example through an association with a synchronization signal sequence used by the gNB. A pseudo-random determination can be based on an identity of a cell where a DMRS is transmitted.

For example, for a DMRS transmission from an antenna port over 4 equally spaced sub-carriers in an RB of 12 sub-carriers, the sub-carriers with DMRS transmission in the RB can be determined as $k_{DMRS}=3k+\delta_{shift}$ mod 3 where k=0, 1, 2, 3 and $\delta_{shift}=N_{ID}^{cell}$ mod 3 where $N_{ID}^{cell}$ is the cell ID that a UE obtains from the initial synchronization process with the cell. For example, for a DMRS transmission from an antenna port over 2 equally spaced sub-carriers in an RB of 12 sub-carriers, the sub-carriers with DMRS transmission in the RB can be determined as $k_{DMRS}=6k+\delta_{shift}$ mod 6 where k=0,1 and $\delta_{shift}=N_{ID}^{cell}$ mod 6. An indication by a gNB can be based on a sequence used to transmit a synchronization signal such as a primary synchronization signal or a secondary synchronization signal.

When distributed PDCCH transmissions and localized PDCCH transmissions can be multiplexed in a same DL control resource set, the distributed PDCCH transmission can be based on transmission diversity scheme using precoder cycling where, in some RBs, the precoder can also be associated with a localized PDCCH transmission. In such case, a UE cannot assume that a DMRS in a PRB uses a same precoder in different slots or in frequency contiguous RBs and cannot utilize the DMRS for time tracking or frequency tracking.

To circumvent the above limitation for a UE to use a DMRS associated with demodulation of PDCCH transmissions for time tracking and for frequency tracking, the UE can be informed in advance that the DMRS uses a same precoding in predetermined slots or in predetermined RBs (with DMRS transmission). The predetermined slots or the predetermined RBs can be defined in a system operation, such as for example every slot every 5 msec or all RBs of a DL control resource set, or can be signaled by system information. For example, the predetermined slots or the predetermined RBs can be determined to be the ones where a gNB transmits a PDCCH scheduling a first system information block. Based on the assumption that the DMRS transmission in the predetermined RBs of a DL control resource set and in the predetermined slots uses a same precoding, a UE can use the DMRS to perform time tracking or frequency tracking in addition to channel estimation.

For a PDCCH transmission diversity scheme using precoder cycling, the precoder weights can be specified per bundle of $N_{bundle}$ contiguous RBs. For example, for $N_{total}=4 \cdot N_{bundle}$ and two transmitter antennas, a precoder in the first $N_{bundle}$ of RBs can be {1;1}, a precoder in the second $N_{bundle}$ of RBs can be {1; −1}, a precoder in the third $N_{bundle}$ of RBs can be {1; j}, and a precoder in the fourth $N_{bundle}$ of RBs can be {1; −j}. By knowing the precoder applied in each bundle of RBs, a UE can remove the precoding and obtain a non-precoded DMRS reception over the $N_{total}$ RBs. The non-precoded DMRS can be used for other purposes such as wideband channel estimation or time tracking when received at different time instances.

Figure 14:
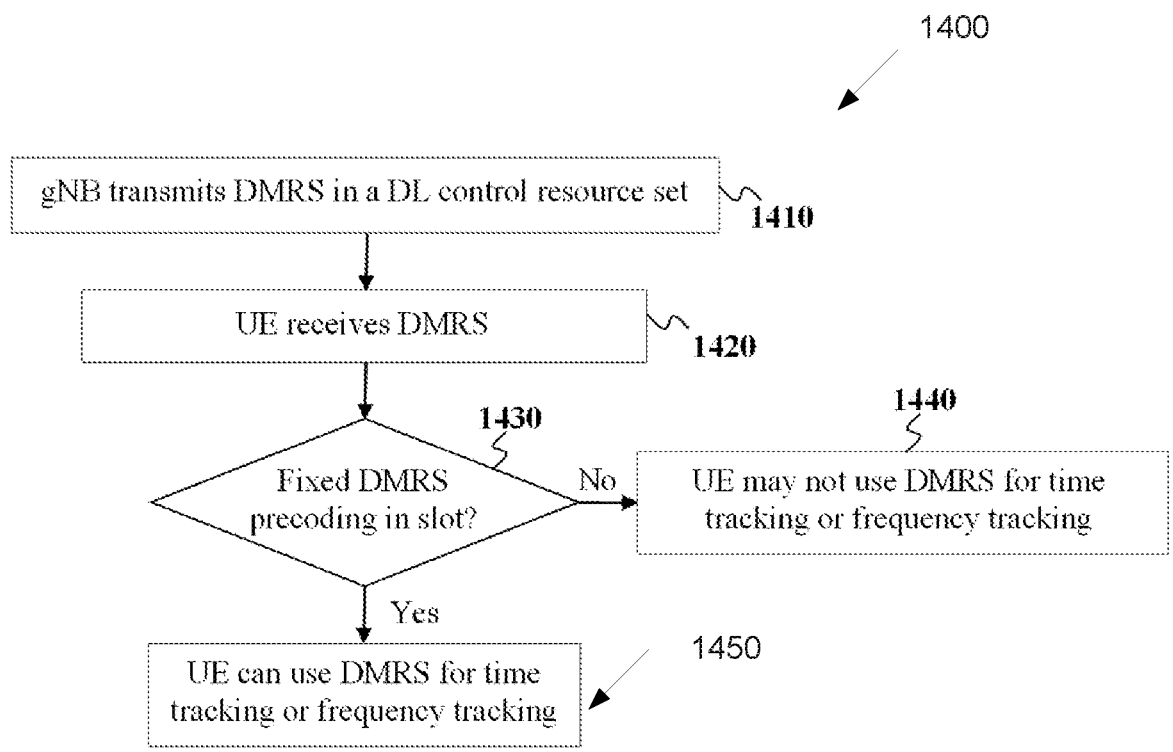
FIG. 14 illustrates an example operation for a UE to assume a same DMRS precoding in predetermined slots and in predetermined RBs of a DL control resource set according to embodiments of the present disclosure.

FIG. 14 illustrates an example operation 1400 for a UE to assume a same DMRS precoding in predetermined slots and in predetermined RBs of a DL control resource set according to embodiments of the present disclosure. An embodiment of the operation 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

As shown in FIG. 14, a gNB transmits DMRS in a DL control resource set 1410. The UE receives the DMRS 1420 and determines whether or not it can assume a fixed DMRS precoding in the slot 1430. The determination can be based on a predetermined slot periodicity or in a pattern of slots signaled by system information from the gNB, for example using a bit-map that is periodically repeating in time. The RBs can include all RBs with DMRS transmission in the DL control resource set or can be signaled by the gNB using higher layer signaling.

For example the RBs can be the ones used for PDCCH transmissions in a common search space when the RBs associated with a common search space are not all RBs in a DL control resource set. Also, when a UE is configured multiple DL control resource sets, the RBs can be the ones in a first DL control resource set that can also include transmission of UE-group common DL control signaling in a slot. When the UE cannot assume a fixed DMRS precoding in the slot, the UE may not use the DMRS received in the slot for time tracking or for frequency tracking 1440. When the UE can assume a fixed DMRS precoding in the slot, the UE can use the DMRS received in the slot for time tracking or for frequency tracking 1450.

Several transmission schemes can exist for a PDSCH transmission of for a PUSCH transmission. When a transmission scheme is configured by higher layer signaling, a UE can monitor a DCI format that includes only necessary fields for the transmission scheme and different DCI formats can be associated with different transmission schemes.

Although offering operational simplicity, a semi-static configuration of a transmission scheme for a PDSCH or a PUSCH is disadvantageous as it does not enable a gNB to quickly adapt a transmission scheme for a UE, for example based on variations of a channel medium experienced by the UE, and instead needs to rely on a reconfiguration by higher layer signaling. When dynamic adaptation among a set of multiple transmission schemes is based on a use of a set of respective multiple DCI formats having respective multiple sizes, a UE needs to decode each of the multiple DCI formats in each slot to determine a transmission scheme used for a respective PDSCH transmission or PUSCH transmission and this increases a number of decoding operations the UE needs to perform per slot, for example by a factor equal to the number of multiple DCI formats with different sizes. Instead, a single DCI format that includes a flag indicating a respective transmission scheme can be used in order for a UE to decode a single DCI format per slot.

The tradeoff for the reduced number of decoding operation is an occasional unnecessary overhead when scheduling of a PDSCH transmission or PUSCH transmission with a transmission scheme does not require all fields in the DCI format or requires fields with reduced number of bits. Transmission schemes that can be associated with a single DCI format can be ones requiring a similar number of bits, such as at most 20% fewer bits than the transmission scheme that requires the largest number of bits and is the one that determines the size of the DCI format.

To reduce an overhead associated with an introduction of a flag in a DCI format that can indicate multiple transmission schemes, such as more than two transmission schemes, the flag can have a nested structure and include only one additional bit relative to the number of bits required for scheduling a PDSCH transmission or a PUSCH transmission with a transmission scheme, referred to as first transmission scheme, requiring the largest number of bits in the DCI format.

The flag is located at the beginning of the DCI format. A UE can first examine the value of the binary flag. When the flag value is a first value, the UE can determine that the transmission scheme of an associated PDSCH or PUSCH transmission is the first transmission scheme. When the flag value is a second value, the UE can determine a number of additional bits in the DCI format that are not use for scheduling associated with the first transmission scheme and can serve as an extended flag. For example, a location of the additional bits when the flag value is the second value can be after the flag or can be at the end of the DCI format (last bits of the DCI format). For example, when there are two less bits required for the second transmission scheme with the second largest number of required bits in the DCI format, relative to the first transmission scheme, the value of the two bits can be used to indicate whether the DCI format schedules a respective PDSCH or PUSCH transmission with a second, third, fourth, or fifth, when any, transmission scheme.

Figure 15:
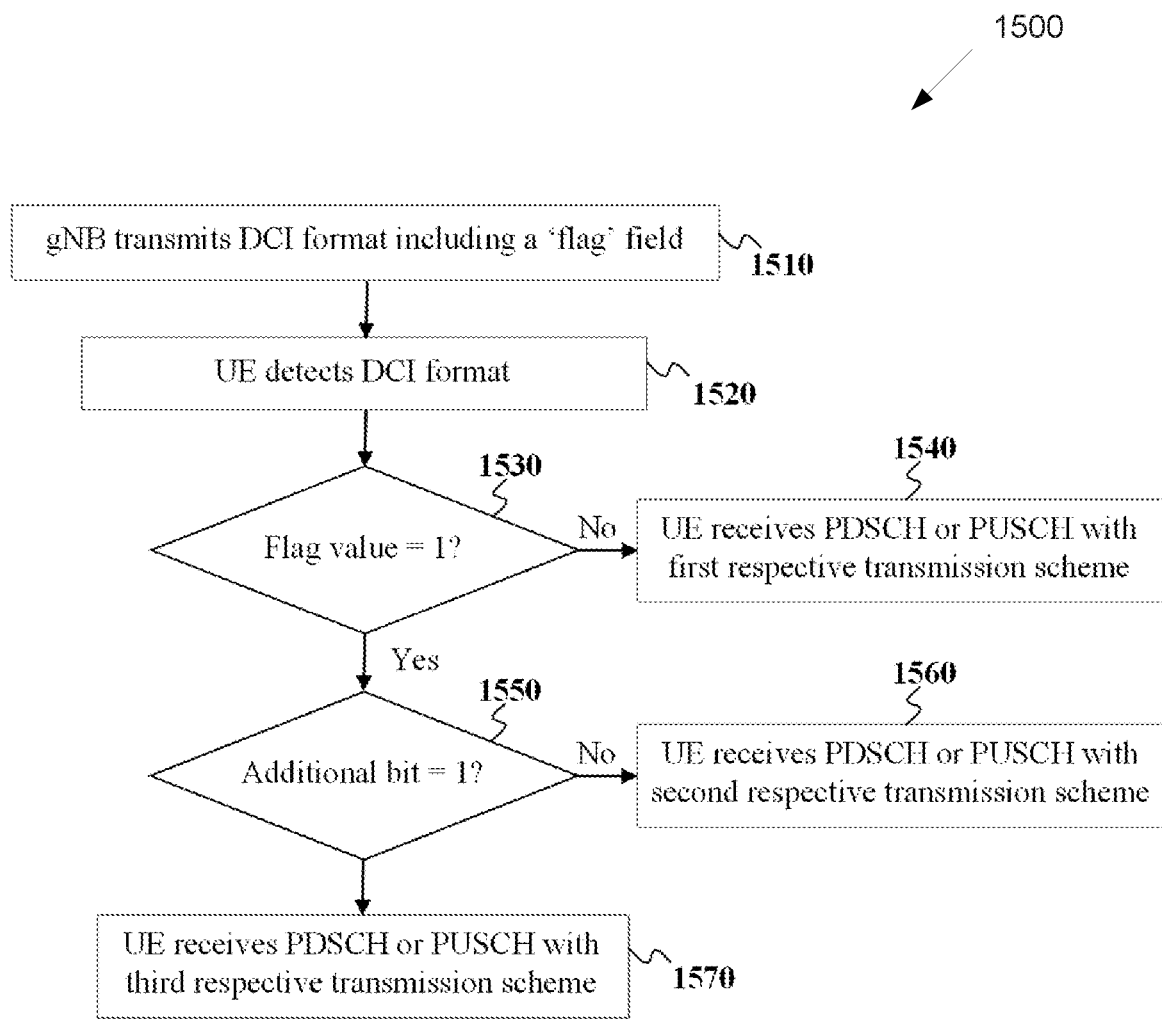
FIG. 15 illustrates an example operation for a DCI format that include a binary flag to indicate a transmission scheme, among multiple transmission schemes, for a PDSCH transmission or a PUSCH transmission according to embodiments of the present disclosure.

FIG. 15 illustrates an example operation 1500 for a DCI format that include a binary flag to indicate a transmission scheme, among multiple transmission schemes, for a PDSCH transmission or a PUSCH transmission according to embodiments of the present disclosure. An embodiment of the operation 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

As shown in FIG. 15, a gNB transmits to a UE a DCI format that includes a "flag" field through a PDCCH 1510. The UE detects the DCI format 1520 and determines whether or not a value for the "flag" field is equal to "1" 1530. When it is not, the UE receives an associated PDSCH transmission or a PUSCH transmission with first respective transmission scheme 1540. When it is, the UE determines whether or not a value for an additional bit, that is included in the DCI format for scheduling with the first transmission scheme but is not used for scheduling with any other transmission scheme, is equal to "1" 1550. When it is not, the UE receives an associated PDSCH transmission or a PUSCH transmission with second respective transmission scheme 1560; otherwise, the UE receives an associated PDSCH transmission or a PUSCH transmission with third respective transmission scheme 1570.

A predetermined DCI format transmitted in a UE-specific search space, such as a first DCI format (fallback DCI format) monitored by a UE that has a smaller size than a second DCI format (non-fallback DCI format) monitored by the UE, can be used to provide fallback operation during time periods where parameters for transmissions to or from the UE are reconfigured by a gNB. For example, a DCI format scheduling a PDSCH transmission to a UE can include a field indicating a slot offset, including symbols within the slot, or a field indicating a resource for a PUCCH transmission by the UE in response to a reception of data conveyed by the PDCCH.

A UE can be configured by higher layers a set of slot offsets or a set of PUCCH resources and respective fields can indicate a value from a respective set. During a time period associated with a reconfiguration of values in one or more such sets of values or prior to a configuration by UE-specific higher layer signaling of values in such sets of values, a UE can use values indicated by UE-group common system information. A UE can determine whether to either use values signaled by UE-group common higher layer signaling (system information) or use values signaled by UE-specific higher layer signaling based on an associated DCI format and the UE can use the former values when the UE detects a first DCI format, such as a fallback DCI format, and use the latter values when the UE detects a second DCI format, such as a non-fallback DCI format.

The DCI formats can also be same and be differentiated by a flag value as described in FIG. 15. For example, a flag value can correspond to use of parameter values, such as a HARQ-ACK transmission timing offset or a PUCCH resource for a HARQ-ACK transmission, or a slot timing offset for a PDSCH or PUSCH transmission relative to a slot of a transmission for an associated DCI format, that are signaled to a UE by UE-common higher layer signaling. Therefore a flag field in a DCI format, in addition to providing a differentiation of transmission schemes for an associated PDSCH transmission or PUSCH transmission, can also provide differentiation for an interpretation of values for other fields in the DCI format according to values configured by either UE-common higher layer signaling or by UE-specific higher layer signaling.

To improve flexibility in a system operation and reliability for PDCCH transmissions, a number of CCE aggregation levels and a number of candidates per CCE aggregation level for a UE to monitor in a common search space can be configured by system information from a gNB. For example, a first system information block can indicate a number of CCE aggregation levels and a number of candidates per CCE aggregation level for PDCCH transmissions, for example scheduling a random access response, paging, or used for transmission of UE-group common information such as transmit power control commands, in the CSS. The first system information block can be scheduled with a CCE aggregation level from a predetermined set of one or more CCE aggregation levels or the aggregation level for scheduling a transmission for the first information block can be implicitly or explicitly indicated in a master information block.

An important objective in the design of a PDCCH search space is a reduction in a number of channel estimations a UE needs to perform in order to decode PDCCH candidates as this can directly reduce a required power consumption of a UE modem for decoding PDCCH candidates in each slot. This power consumption can correspond to a significant percentage, such as about 50%, of the total UE modem power consumption as a UE needs to decode PDCCH in every DL slot, even when the UE is not scheduled DL receptions or UL transmissions, when the UE is not in a discontinuous reception (DRX) state. A nested structure for a PDCCH search space is one approach for reducing a number of channel estimations where a channel estimate obtained for decoding a PDCCH candidate with a first CCE aggregation level can be used for decoding a PDCCH candidate with a second CCE aggregation level that is smaller than the first CCE aggregation level that can typically correspond to the largest CCE aggregation level.

Figure 16:
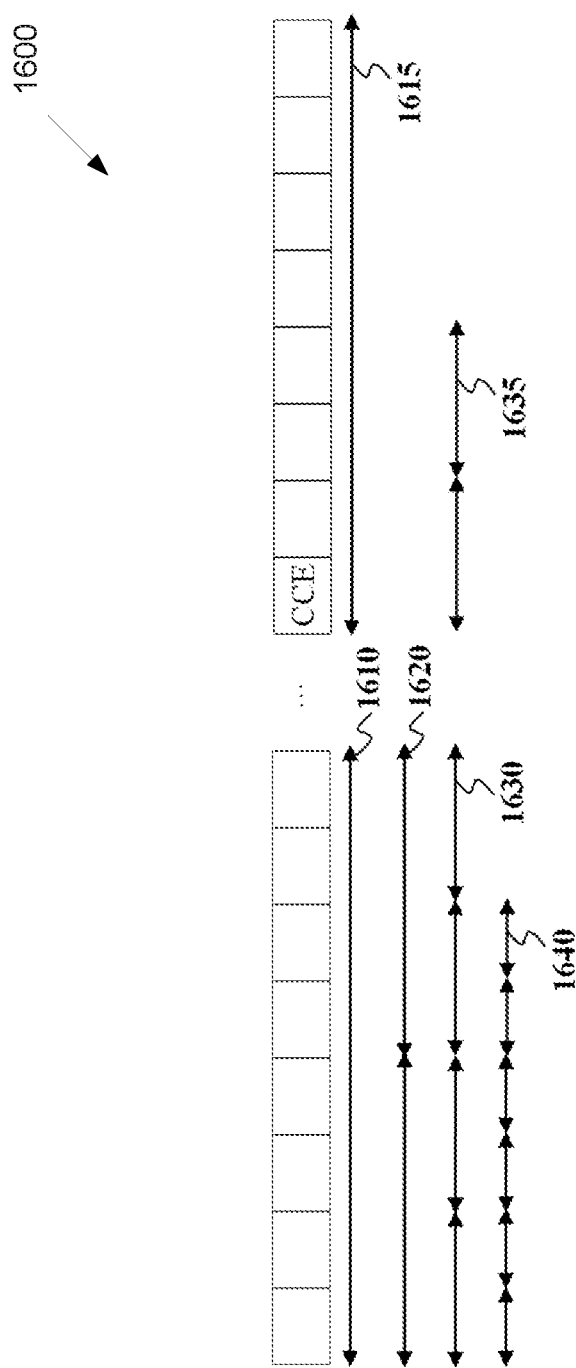
FIG. 16 illustrates an example nested structure of PDCCH candidates according to embodiments of the present disclosure.

FIG. 16 illustrates an example nested structure of PDCCH candidates 1600 according to embodiments of the present disclosure. An embodiment of the nested structure of PDCCH candidates 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

As shown in FIG. 16, in a PRB set, or over an entire system BW, a UE is configured with $M^{(8)}=2$ candidates 1610, 1615 for an aggregation level of L=8 CCEs, $M^{(4)}=2$ candidates 1620 for an aggregation level of L=4 CCEs, $M^{(2)}=6$ candidates 1630, 1635 for an aggregation level of L=2 CCEs, and $M^{(1)}=6$ candidates 1640 for an aggregation level of L=1 CCE. CCE indexes for the $M^{(8)}=2$ candidates with L=8 CCEs can be consecutive as in equation 1 or non-consecutive with a defined offset as in equation 2. CCE indexes for lower CCE aggregation levels are a subset of CCE indexes for the $M^{(8)}=2$ candidates with L=8 CCEs. CCE indexes for lower CCE aggregation levels can have consecutive indexes starting from the index of the first CCE of the first candidate of the $M^{(8)}=2$ candidates with L=8 CCEs, as shown in FIG. 16, or can be equally divided to occupy CCEs indexes of each of the $M^{(8)}=2$ candidates with L=8 CCEs, and so on.

A drawback of using a nested structure for CCE indexes, as for example in FIG. 16, is an increase in a probability that a PDCCH to a UE cannot be transmitted because associated CCEs have at least partially overlapping indexes with CCEs used for a PDCCH transmission to another UE. For example, when CCEs for PDCCH transmission to a first UE and CCEs for PDCCH transmission to a second UE overlap for candidates using the largest CCE aggregation level, it is likely that such overlapping exists for PDCCH candidates using smaller CCE aggregation levels and when a PDCCH transmission to the first UE is with the largest CCE aggregation level, there may be few candidates and only with small CCE aggregation levels available for PDCCH transmission to the second UE.

For example, with reference to FIG. 16, when a first PDCCH transmission to a first UE needs to use the CCEs of the first of the $M^{(4)}=2$ candidates with L=4 CCEs, and the CCEs for the first PDCCH candidate with L=8 CCEs fully overlap with those for a first PDCCH candidate with L=8 CCEs for a second UE, a PDCCH transmission to the second UE cannot use most remaining candidates for any CCE aggregation level. An increase in a blocking probability can substantially negate potential benefits of a nested search space structure for UE power consumption as the UE needs to remain active for a longer time period to complete transmissions or receptions of data.

CCEs for a PDCCH transmission can be formed by a number of REGs where one REG is same as one RB over one OFDM symbol. Assuming that a CCE is a minimum resource unit for a DCI format transmission with a given code rate and QPSK modulation, a number of REGs required for a CCE depends on a reference DCI format size and on a number of SCs in an RB that can be used for transmission of the DCI format (SCs used for DMRS transmission are excluded). For example, for a DCI format size of 60 bits (or 76 bits including a CRC of 16 bits) and for a code rate of ⅔, the DCI format transmission requires 57 SCs. For 2 DMRS SCs per RB used for PDCCH transmission and for 12 SCs per RB, a number of about 6 REGs (or 6 RBs) is needed for a CCE. For 4 DMRS SCs per RB used for PDCCH transmission and for 12 SCs per RB, a number of about 7 REGs (or 7 RBs) is needed for a CCE. A PDCCH transmission can be over variable number of OFDM symbols, such as 1, 2, or 3 OFDM symbols.

The number of symbols can be configured by signaling from the physical layer or from higher layers. To improve spectral efficiency and simplify a design for PDCCH transmissions, design targets in mapping CCEs to REGs or PDCCHs to CCEs can include enabling a multiplexing of distributed PDCCH transmissions and localized PDCCH transmissions in a same PRB set (or control resource set) or enabling all CCEs to be equivalent in terms of SCs available for a PDCCH transmission regardless of whether the PDCCH transmission spans one OFDM symbol or spans multiple OFDM symbols.

Therefore, there is a need to design nested PDCCH search space structures for distributed PDCCH transmissions and for localized PDCCH transmissions.

There is another need to design nested PDCCH search space structures with reduced PDCCH blocking probability.

There is another need to define mapping for CCEs to REGs and for PDCCHs to CCEs for a nested PDCCH search space over multiple slot symbols.

In one embodiment, designs for a nested PDCCH search space and designs that enable reductions in a blocking probability for PDCCH candidates of various CCE aggregation levels in a nested PDCCH search space are considered.

For a PDCCH transmission, an associated blocking probability benefits from PDCCH candidates for different CCE aggregation levels typically using different CCE indexes. For example, for a PDCCH search space defined as in equation 1, CCE indexes for a PDCCH candidate not only depend on a respective CCE aggregation level L but also on a number of candidates $M_p^{(L)}$ per CCE aggregation level L.

For a nested search space, flexibility in CCE indexes for a PDCCH candidate according to equation 1 is materially diminished as CCE indexes need to be common among multiple PDCCH candidates with different CCE aggregation levels. Additionally, based on equation 1, CCE indexes for different PDCCH candidates with a same CCE aggregation level are deterministic. For example, for a PDCCH search space according to equation 1, CCE indexes for PDCCH candidates with a same CCE aggregation level are offset by a deterministic factor $$\left\lfloor \frac{N_{CCE,p,k}}{L \cdot M_p^{(L)}} \right\rfloor$$

(modulo $\lfloor N_{CCE,p,k}/L \rfloor$).

Therefore, when CCE indexes for PDCCH candidates overlap for different UEs and a nested search space structure is used, a probability that a large number of PDCCH candidates for any CCE aggregation level overlap is materially increased and a blocking probability for PDCCH transmissions to such UEs is consequently increased. In the following, it is generally assumed that CCE aggregation levels can also depend on a PRB set, also referred to as control resource set, that a UE is configured for PDCCH receptions and a notation $L_p$ (instead of L) is used. Further, it is assumed that a CCE aggregation level $L_p$ is a power of 2 such as $L_p=2^n$, n=0, 1, 2, ...

A first realization considers that CCE indexes for PDCCH candidates with CCE aggregation levels that are smaller than a maximum one in a control resource set are determined relative to CCE indexes for PDCCH candidates with the largest CCE aggregation level in the control resource set.

A first mechanism for reducing a blocking probability of PDCCH transmissions to different UEs is to randomize CCE indexes for PDCCH candidates with a largest CCE aggregation level by having a determination for the parameter $Y_{p,k}$ in equation 1 depend on an index of a PDCCH candidate in addition to a UE RNTI. Then, for example, when CCE indexes for a PDCCH candidate with a largest CCE aggregation level overlap for two UEs, a probability of such overlapping for additional PDCCH candidates with the largest CCE aggregation level is reduced due to the randomization of respective CCE indexes according to UE RNTI.

For example, for CCE indexes determined according to equation 1 and for $M_p^{(L_{p,max})}$ PDCCH candidates with the largest CCE aggregation level, CCE indexes for candidate $0 \leq m \leq M_p^{(L_{p,max})}$ can be determined as in equation 2:

$$L_{p,max} \left\{ \left( Y_{p,k,m} + \left\lfloor \frac{m \cdot N_{CCE,p,k}}{L_{p,max} \cdot M_p^{(L_{p,max})}} \right\rfloor \right) \mod \lfloor N_{CCE,p,k}/L_{p,max} \rfloor \right\} + \quad \text{equation 2}$$

$$i, i = 0, \ldots L_{p,max}$$

where a same notation as in equation 1 applies and $Y_{p,k,m}=(A_{p,m} \cdot Y_{p,k-1,m})$ mod D provides randomization for different candidates with the largest CCE aggregation level. For example, $Y_{p,-1,m}=n_{RNTI} \neq 0$ and, for $M_p^{(L_{max})}$, $A_{p,0}=39827$ and $A_{p,1}=39831$.

A second mechanism for reducing a blocking probability of PDCCH transmissions to different UEs is to randomize CCE indexes for PDCCH candidates by having a random offset between last (or first) CCE indexes of successive PDCCH candidates. The random offset can be a function of the UE RNTI or of both the UE RNTI and of a PDCCH candidate index.

For example, for CCE indexes determined according to equation 1 and $M_p^{(L_{p,max})}$ PDCCH candidates with the largest CCE aggregation level, CCE indexes for candidate $0 \leq m \leq M_p^{(L_{p,max})}$ can be determined as in equation 3A or equation 3B:

$$L_{p,max} \left\{ \left( Y_{p,k,m} + \left\lfloor \frac{m \cdot N_{CCE,p,k}}{L_{p,max} \cdot M_p^{(L_{max})}} \right\rfloor + f(m) \right) \mod \lfloor N_{CCE,p,k}/L_{p,max} \rfloor \right\} + \quad \text{equation 3A}$$

$$i, i = 0, \ldots L_{p,max}; \text{ and}$$

$$L_{p,max} \left\{ \left( Y_{p,k,m} + \left\lfloor \frac{f(m) \cdot N_{CCE,p,k}}{L_{p,max} \cdot M_p^{(L_{p,max})}} \right\rfloor \right) \mod \lfloor N_{CCE,p,k}/L_{p,max} \rfloor \right\} + \quad \text{equation 3B}$$

$$i, i = 0, \ldots L_{p,max} - 1$$

where a same notation as in equation 1 applies and $f(m)$ is a pseudo-random function having as arguments the PDCCH candidate m and the UE RNTI $n_{RNTI} \neq 0$, for example $f(m)= m \cdot n_{RNTI}$.

The first mechanism (different hashing function for different PDCCH candidates) and the second mechanism (UE-specific offset between successive PDCCH candidates) can also be combined.

In equation 2 or in equations 3A/3B, as CCE indexes for different PDCCH candidates with a same CCE aggregation level are random, and are not separated by a predetermined offset as in equation 1, overlapping can occur. When CCE indexes for different PDCCH candidates with a same CCE aggregation level at least partially overlap for values of $Y_{p,k,m}$ in slot k, when for example they are determined based on equation 2, adjustments can apply to avoid such overlapping.

For example, when CCE indexes for different PDCCH candidates overlap, a UE can re-use CCE indexes determined in a last slot when CCE indexes for different PDCCH candidates did not overlap. For example, when CCE indexes for different PDCCH candidates overlap, CCE indexes for each applicable PDCCH candidate after the first one can be shifted by a respective minimum value to avoid overlapping with previous PDCCH candidates for a same CCE aggregation level. It is also possible for overlapping of CCE indexes to be allowed to occur.

After determining CCE indexes in a control resource set p for PDCCH candidates with a largest CCE aggregation level, a next step is to determine CCE indexes for PDCCH candidates with CCE aggregation levels that are smaller than the largest CCE aggregation level in the control resource set p.

In some embodiments of case 1 for $M_p^{(L_p)} \cdot L_p \leq M_p^{(L_{p,max})} \cdot L_{p,max}$, when a condition $M_p^{(L_p)} \cdot L_p \leq M_p^{(L_{p,max})} \cdot L_{p,max}$ holds for any CCE aggregation level $L_p < L_{p,max}$, CCE indexes for all PDCCH candidates with CCE aggregation level $L_p$ can be a subset of CCE indexes for all PDCCH candidates with CCE aggregation level $L_{p,max}$.

A first approach for determining CCE indexes for PDCCH candidates with CCE aggregation level $L_p < L_{p,max}$ considers a substantially equal distribution for a total of $M_p^{(L_p)}$ PDCCH candidates with CCE aggregation level $L_p < L_{p,max}$ among the CCE indexes of each of the $M_p^{(L_{p,max})}$ PDCCH candidates with CCE aggregation level $L_{p,max}$. CCE indexes for first $M_{p,0}^{(L_p)} = \lceil M_p^{(L_p)} / M_p^{(L_{p,max})} \rceil$ candidates with CCE aggregation level $L_p$ are a subset of CCE indexes for a first PDCCH candidate with CCE aggregation level $L_{p,max}$. When $M_p^{(L_{p,max})} - 1 > 0$, CCE indexes for second $M_{p,1}^{(L_p)} = \lceil (M_p^{(L_p)} - \lceil M_p^{(L_p)} / M_p^{(L_{p,max})} \rceil) / (M_p^{(L_{p,max})} - 1) \rceil$ PDCCH candidates with CCE aggregation level $L_p$ are a subset of CCE indexes for a second PDCCH candidate with CCE aggregation level $L_{p,max}$. When $M_p^{(L_{p,max})} - 2 > 0$, CCE indexes for third $M_{p,2}^{(L_p)} = \lceil (M_p^{(L_p)} - (M_p^{(L_p)} - \lceil M_p^{(L_p)} / M_p^{(L_{p,max})} \rceil) / (M_p^{(L_{p,max})} - 1)) / (M_p^{(L_{p,max})} - 2) \rceil$ PDCCH candidates with CCE aggregation level $L_p$ are a subset of CCE indexes for a third PDCCH candidate with CCE aggregation level $L_{p,max}$, and so on. In general, when $M_p^{(L_{p,max})} - m + 1 > 0$, CCE indexes for m-th $M_{p,m}^{(L_p)} = \lceil (M_p^{(L_p)} - ( \ldots - (M_p^{(L_p)} - \lceil M_p^{(L_p)} / M_p^{(L_{p,max})} \rceil) / (M_p^{(L_{p,max})} - 1)) / \ldots ) / (M_p^{(L_{p,max})} - m + 1) \rceil$ PDCCH candidates with CCE aggregation level $L_p$ are a subset of CCE indexes for a PDCCH candidate with CCE aggregation level $L_{p,max}$.

After determining $M_{p,m}^{(L_p)}$ PDCCH candidates for CCE aggregation level $L_p$, a determination of CCE indexes for respective PDCCH candidates can be as in equation 1 where $N_{ECCE,p,k}$ is replaced by $L_{p,max}$. Then, CCE indexes for $0 \leq \tilde{m} \leq M_{p,m}^{(L_p)}$ PDCCH candidates can be determined as in equation 4:

$$L_p \cdot \left\{ \left( Y_{p,k} + \left\lfloor \frac{\tilde{m} \cdot L_{p,max}}{L_p \cdot M_{p,m}^{(L_p)}} \right\rfloor \right) \bmod \lfloor L_{p,max}/L_p \rfloor \right\} + i, i = 0, \ldots L_p - 1. \quad \text{equation 4}$$

In equation 4, it is also possible to use $Y_{p,k,m}$ instead of $Y_{p,k}$.

A randomization of CCE indexes for PDCCH candidates with CCE aggregation level $L_{p,max}$ can also extend to CCE indexes for PDCCH candidates with CCE aggregation level $L_p < L_{p,max}$ as in equation 2 or in equations 3A/3B where instead of considering all CCE indexes $N_{ECCE,p,k}$ of a PDCCH resource set, only CCE indexes for a respective PDCCH candidate with CCE aggregation level $L_{p,max}$ are considered.

Figure 17:
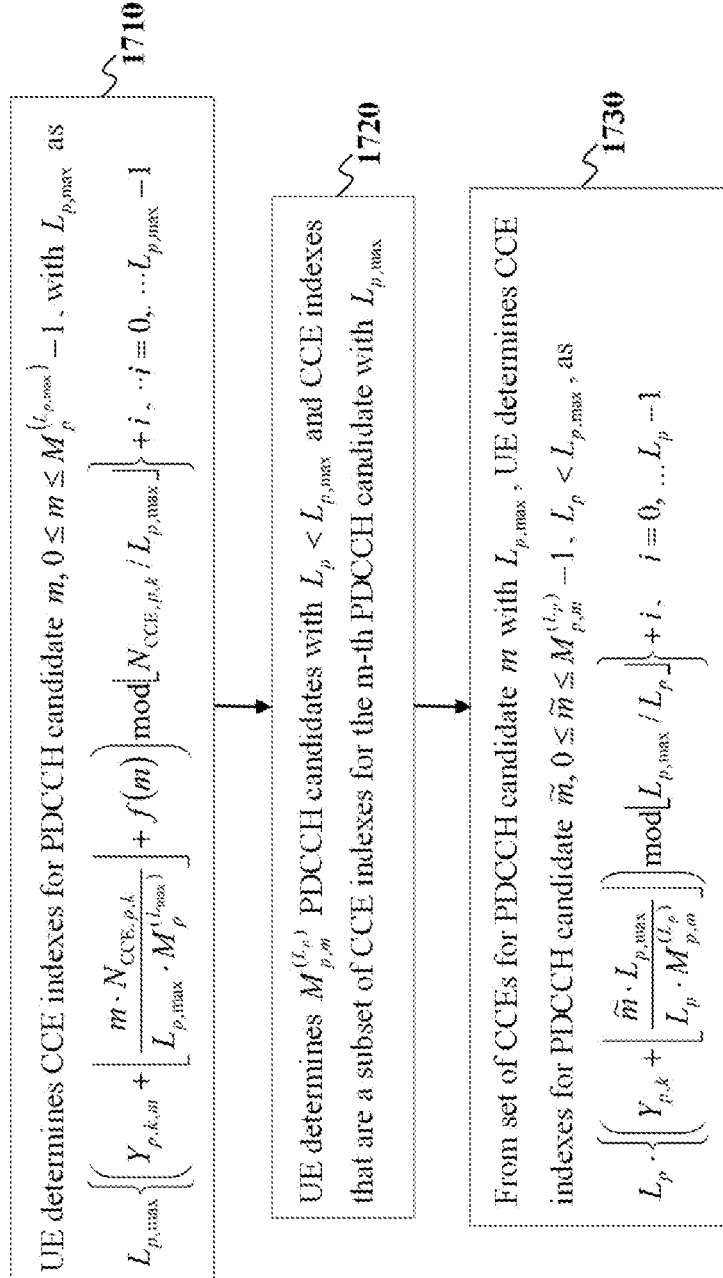
FIG. 17 illustrates an example process for determining CCEs for PDCCH candidates based on a first realization for a nested PDCCH search space structure according to embodiments of the present disclosure.

FIG. 17 illustrates an example process for determining CCEs 1700 for PDCCH candidates based on a first realization for a nested PDCCH search space structure according to embodiments of the present disclosure. An embodiment of the process for determining CCEs 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

As shown in FIG. 17, a UE is configured by a gNB a control resource set p having a number of $N_{CCE,p,k}$ CCEs, and a number of $M_p^{(L_p)}$ PDCCH candidates with CCE aggregation level $L_p$ in the control resource set p. It is also possible that values of $M_p^{(L_p)}$ and $L_p$ for possible values of $N_{CCE,p,k}$ are determined in the specifications of a system operation or are derived by the UE according to some specified formula. The UE determines CCE indexes for PDCCH candidate m, $0 \leq m \leq M_p^{(L_{p,max})} - 1$, with CCE aggregation level $L_{p,max}$ as $$L_{p,max} \left\{ \left( Y_{p,k,m} + \left\lfloor \frac{m \cdot N_{CCE,p,k}}{L_{p,max} \cdot M_p^{(L_{max})}} \right\rfloor \right) + f(m) \right\} \bmod \lfloor N_{CCE,p,k}/L_{p,max} \rfloor \right\} + i,$$

$$i = 0, \ldots L_{p,max} - 1,$$

where $f(m)$ is a function of PDCCH candidate m and can also be set to 0 1710. The UE determines $M_p^{(L_p)}$ PDCCH candidates with CCE indexes that are a subset of CCE indexes for PDCCH candidate m, $0 \leq m \leq M_p^{(L_{p,max})} - 1$ 1720. From the set of CCEs for PDCCH candidate m with $L_{p,max}$, the UE determines CCE indexes for PDCCH candidate $\tilde{m}$, $0 \leq \tilde{m} \leq M_{p,m}^{(L_p)} - 1$, with $L_p < L_{p,max}$, as $$L_p \cdot \left\{ \left( Y_{p,k} + \left\lfloor \frac{\tilde{m} \cdot L_{p,max}}{L_p \cdot M_{p,m}^{(L_p)}} \right\rfloor \right) \bmod \lfloor L_{p,max}/L_p \rfloor \right\} + i,$$

$$i = 0, \ldots L_p - 1 \; 1730.$$

Figure 18:
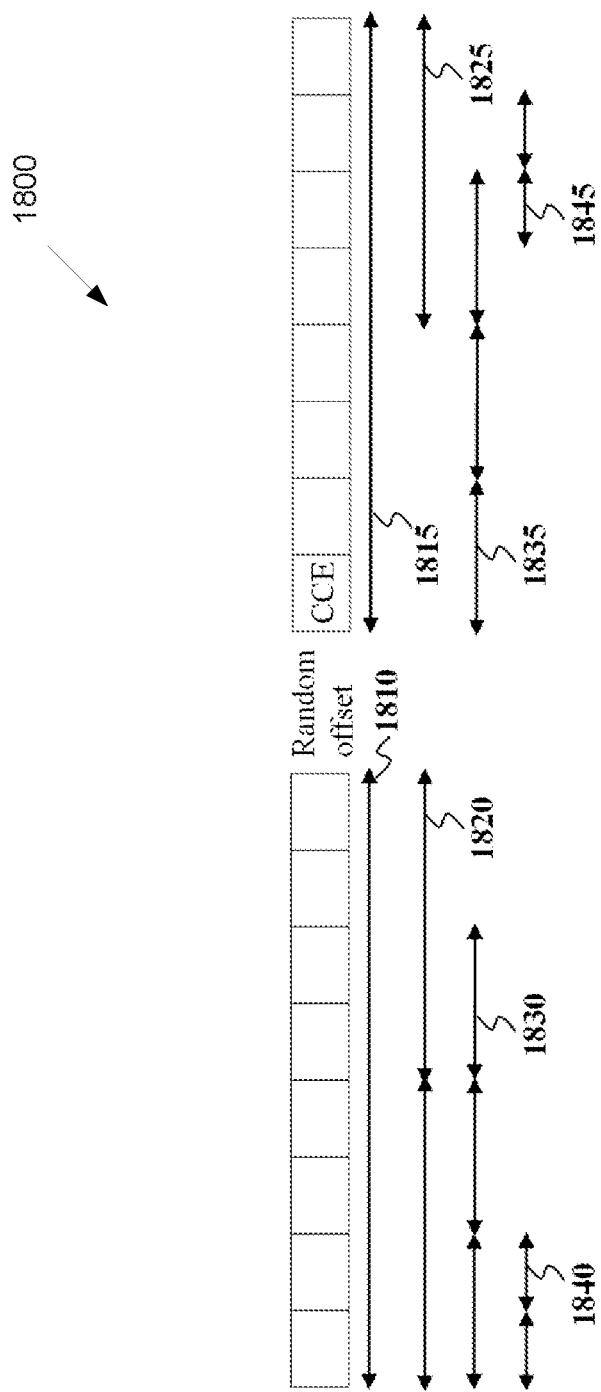
FIG. 18 illustrates an example determination of CCEs for PDCCH candidates based on a first approach of a first realization for a nested PDCCH search space structure according to embodiments of the present disclosure.

FIG. 18 illustrates an example determination of CCEs 1800 for PDCCH candidates based on a first approach of a first realization for a nested PDCCH search space structure according to embodiments of the present disclosure. An embodiment of the determination of CCEs 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

As shown in FIG. 18, a UE is configured to decode PDCCH candidates for four CCE aggregation levels corresponding to 1, 2, 4, and 8 CCEs. It is $M_p^{(8)} = M_p^{(L_{p,max})}$, $M_p^{(4)} = 3$, $M_p^{(2)} = 6$, and $M_p^{(1)} = 4$. The UE determines a first set and a second set of CCE indexes for a first PDCCH candidate 1810 and a second PDCCH candidate 1815 of the $M_p^{(8)} = 2$ candidates, respectively (e.g., equations 2 through 4 can apply as exemplary reference). PDCCH candidates $M_p^{(L_p)}$, $L_p < L_{p,max}$, are equally distributed (when $M_p^{(L_p)}$ is an even number) to use CCE indexes from the CCE indexes of either the first PDCCH candidate with CCE aggregation level $L_{p,max}$ 1820, 1830, and 1840, or the second PDCCH candidate with CCE aggregation level $L_{p,max}$ 1825, 1835, and 1845.

A second approach for determining CCE indexes for PDCCH candidates with CCE aggregation level $L_p < L_{p,max}$ considers configuration for a distribution for a total of $M_p^{(L_p)}$ PDCCH candidates with CCE aggregation level $L_p < L_{p,max}$ among CCE indexes for each of the $M_p^{(L_{p,max})}$ PDCCH candidates with CCE aggregation level $L_{p,max}$. The configuration can be provided by a gNB through higher layer signaling. For example, for $M_p^{(L_{p,max})}=2$ and $2 \cdot M_p^{(L_p)} \cdot L_p \le 3 \cdot L_{p,max}$, a configuration can indicate that CCE indexes for ⅔ of the $M_p^{(L_p)}$ PDCCH candidates with CCE aggregation level $L_p$ are a subset of CCE indexes for a first PDCCH candidate with CCE aggregation level $L_{p,max}$ and that CCE indexes for ⅓ of the $M_p^{(L_p)}$ PDCCH candidates with CCE aggregation level $L_p$ are a subset of the CCE indexes for a second PDCCH candidate with CCE aggregation level $L_{p,max}$.

The second approach enables a gNB to have additional control over a blocking probability for UEs with an RNTI that can otherwise lead to increased blocking probability particularly when a total number of CCEs $N_{ECCE,p,k}$ in control resource set p is not large enough and can lead to overlapping of CCEs for different PDCCH candidates with CCE aggregation level $L_{p,max}$.

The aforementioned determinations, according to the first realization, of CCE indexes for PDCCH candidates with different CCE aggregation levels consider that $M_p^{(L_p)} \cdot L_p \le M_p^{(L_{p,max})} \cdot L_{p,max}$ for all $L_p < L_{p,max}$. To simplify a determination of CCE indexes for a nested structure of PDCCH candidates, $M_p^{(L_p)} \cdot L_p \le M_p^{(L_{p,max})} \cdot L_{p,max}$ can be assumed when a nested PDCCH structure is used according to the first realization and a UE can either disregard configurations for numbers of PDCCH candidates for respective CCE aggregation levels that do not satisfy that condition or assume a minimum number of additional virtual candidates for $L_{p,max}$ so that $M_p^{(L_p)} \cdot L_p \le M_p^{(L_{p,max})} \cdot L_{p,max}$. A UE can also be separately configured by higher layers whether to assume a nested structure for CCEs of PDCCH candidates for different aggregation levels and accordingly determine search space equations for CCE indexes of PDCCH candidates. A CCE structure for a UE-common search space can be defined to have a conventional structure (search space) or a nested structure in the specifications of the system operation.

In some embodiments of case 2 for $M_p^{(L_p)} \cdot L_p > M_p^{(L_{p,max})} \cdot L_{p,max}$ for at least one $L_p < L_{p,max}$, when a system operation allows for $M_p^{(L_p)} \cdot L_p > M_p^{(L_{p,max})} \cdot L_{p,max}$ for at least one CCE aggregation level $L_{p,max\,1} < L_{p,max}$, such as $L_{p,max}$ and $L_{p,max\,1}=4$, CCE indexes for a number of PDCCH candidates $M_{p,rem}^{(L_{p,max})}=M_p^{(L_{p,max1})}-M_p^{(L_{p,max})} \cdot L_{p,max}/L_{p,max\,1}$ with CCE aggregation level $L_{p,max\,1}$ can be determined independently of CCE indexes for PDCCH candidates with CCE aggregation level $L_{p,max}$ and are not a subset of the latter CCE indexes while CCE indexes for $M_p^{(L_{p,max})} \cdot L_{p,max}/L_{p,max\,1}$ PDCCH candidates with CCE aggregation level $L_{p,max\,1}$ can be determined as when it is $M_{p,max\,1}^{(L_{p,max\,1})} \cdot L_{p,max\,1} \le M_p^{(L_{p,max})} \cdot L_{p,max}$.

In one example, a determination of CCE indexes for the $M_{p,rem}^{(L_{p,max\,1})}$ PDCCH candidates can be as in one of equations 2, 3A, or 3B for the determination of CCE indexes for the $M_p^{(L_{p,max})}$ PDCCH candidates by replacing $L_{p,max}$ by $L_{p,max\,1}$ and by replacing $M_p^{(L_{p,max})}$ by $M_{p,rem}^{(L_{p,max\,1})}$.

In one example, to avoid potential overlap for CCE indexes among the $M_p^{(L_{p,max\,1})}$ PDCCH candidates, because CCE indexes for the the $M_p^{(L_{p,max\,1})}-M_{p,rem}^{(L_{p,max\,1})}$ PDCCH candidates are determined differently than CCE indexes for the $M_{p,rem}^{(L_{p,max\,1})}$ PDCCH candidates, a determination of CCE indexes for the $M_{p,rem}^{(L_{p,max\,1})}$ PDCCH candidates can be, for example, as in one of equation 1 by considering all $M_p^{(L_{p,max\,1})}$ PDCCH candidates and selecting CCE indexes for the first $M_{p,rem}^{(L_{p,max\,1})}$ PDCCH candidates that do not overlap with CCE indexes for the $M_p^{(L_{p,max\,1})}-M_{p,rem}^{(L_{p,max\,1})}$ PDCCH candidates.

When $M_p^{(L_p)} \cdot L_p > M_p^{(L_{p,max\,2})} \cdot L_{p,max}$ also for at least one CCE aggregation level $L_{p,max2}$ with $L_{p,max2} < L_{p,max1}$ (and $M_p^{(L_{p,max\,1})} \cdot L_{p,max1} > M_p^{(L_{p,max})} \cdot L_{p,max}$), such as $L_{p,max1}=4$ and $L_{p,max2}=2$, two cases can be considered. A first case considers that $M_p^{(L_{p,max\,2})} \cdot L_{p,max2} \le M_p^{(L_{p,max\,1})} \cdot L_{p,max1}$. In one example, CCE indexes for a number of $M_{p,init}^{(L_{p,max\,2})}=M^{(L_{p,max\,1})} \cdot L_{p,max1}/L_{p,max2}$ PDCCH candidates can be determined, for example as in equation 4, while a number of $M_{p,rem}^{(L_{p,max\,2})}=M_p^{(L_{p,max\,2})}-M_{p,init}^{(L_{p,max\,2})}$ can again be determined as in equation 4 after replacing $L_{p,max}$ with $L_{p,max1}$ and considering a set of CCEs corresponding to the $M_{p,rem}^{(L_{p,max\,1})}$ PDCCH candidates. In one example, a determination of CCE indexes for PDCCH candidates with CCE aggregation level $L_{p,max2}$ considers that a largest CCE aggregation level is $L_{p,max1}$ (not $L_{max,p}$) and equation 4 can apply for all $M_p^{(L_{p,max\,2})}$ PDCCH candidates by replacing $L_{p,max}$ with $L_{p,max1}$.

This leads to a nested structure for a determination of CCE indexes where CCE indexes for PDCCH candidates with a largest CCE aggregation level in a control resource set p are first determined from a set of all CCE indexes in the control resource set p, CCE indexes for PDCCH candidates with a second largest CCE aggregation level in the control resource set p are determined either only from a set of CCE indexes for PDCCH candidates with the largest CCE aggregation level, when $M_p^{(L_{p,max})} \cdot L_{p,max1} \le M_p^{(L_{p,max})} \cdot L_{p,max}$ or, otherwise, from both a set of CCE indexes for PDCCH candidates with the largest CCE aggregation level for $M_{p,rem}^{(L_{p,max})} \cdot L_{p,max}/L_{p,max1}$ PDCCH candidates and a set of all CCE indexes in the control resource set p for $M_p^{(L_{p,max\,1})}-M_p^{(L_{p,max})} \cdot L_{p,max}/L_{p,max\,1}$ (with possible adjustment to avoid overlapping CCE indexes for PDCCH candidates with a same CCE aggregation level as it was previously described), CCE indexes for PDCCH candidates with a third largest CCE aggregation level in the control resource set p are determined either only from a set of CCE indexes for PDCCH candidates with the first largest CCE aggregation level, when $M_p^{(L_{p,max\,2})} \cdot L_{p,max2} \le M_{p,rem}^{(L_{p,max\,1})} \cdot L_{p,max1}$ or, otherwise, from both a set of CCE indexes for PDCCH candidates with the second largest CCE aggregation level for $M_p^{(L_{p,max1})} \cdot L_{p,max1}/L_{p,max2}$ PDCCH candidates and a set of all CCE indexes in the control resource set p for $M_p^{(L_{p,max\,2})}-M_p^{(L_{p,max\,1})} \cdot L_{p,max1}/L_{p,max2}$, and so on.

In a second case, when $M_p^{(L_{p,max\,2})} \cdot L_{p,max2} > M_p^{(L_{p,max\,1})} \cdot L_{p,max1}$ (and $M_p^{(L_{p,max\,1})} \cdot L_{p,max1} > M_p^{(L_{p,max})} \cdot L_{p,max}$), CCE indexes for a number of $M_{p,init}^{(L_{p,max\,2})}=M_p^{(L_{p,max\,1})} \cdot L_{p,max1}/L_{p,max2}$ PDCCH candidates with CCE aggregation level $L_{p,max2}$ can be determined, for example as in equation 4, by replacing $L_{p,max}$ with $L_{p,max1}$. CCE indexes for a number of remaining PDCCH candidates $M_{p,rem}^{(L_{p,max\,2})}=M_p^{(L_{p,max\,2})}-M_{p,init}^{(L_{p,max\,2})}$ can be determined as for the $M_{p,rem}^{(L_{p,max\,1})}$ PDCCH candidates by using $L_{p,max2}$ instead of $L_{p,max1}$.

A second realization considers that CCE indexes for PDCCH candidates are determined relative to CCE indexes for PDCCH candidates that require a largest number of CCEs.

A UE first determines a maximum for product values of $M_p^{(L_p)} \cdot L_p$ for configured number of PDCCH candidates $M_p^{(L_p)}$ with CCE aggregation level $L_p$ in control resource set p. Corresponding $M_p^{(L_p)}$ and $L_p$ values resulting to a maximum value for $M_p^{(L_p)} \cdot L_p$ are denoted as $M_p^{(L_{p,nest})}$ and $L_{p,nest}$, respectively. Values of $M_p^{(L_{p,nest})}$ and and $L_{p,nest}$ can be different for different control resource sets. When a same maximum value of $M_p^{(L_p)} \cdot L_p$ exists $L_p$ exists for multiple $L_p$ values, a selected $L_p$ value can be any of the multiple $L_p$ values such as the smallest or the largest.

A UE then determines CCE indexes for $M_p^{(L_{p,nest})}$ PDCCH candidates, for example according to equation 1 or according to equation 2. A resulting number of CCEs is $N_{CCE,p,k,nest} = M_p^{(L_{p,nest})} \cdot L_{p,nest}$. For example, with reference to equation 1, CCEs for PDCCH candidate m, $0 \leq m \leq M_p^{(L_{p,nest})} - 1$, can be determined as given in equation 5:

$$L_{p,nest} \cdot \left\{ \left( Y_{p,k} + \left\lfloor \frac{m \cdot N_{CCE,p,k}}{L_{p,nest} \cdot M_p^{(L_{p,nest})}} \right\rfloor \right) \mod \lfloor N_{CCE,p,k}/L_{p,nest} \rfloor \right\} + i, \quad \text{equation 5}$$

$$i = 0, \ldots L_{p,nest} - 1$$

A UE subsequently determines CCEs for of $M_p^{(L_p)}$ PDCCH candidates, of $M_p^{(L_p)}$, $L_p \neq L_{p,nest}$, by replacing $N_{CCE,p,k}$ with $N_{CCE,p,k,nest}$ and using, for example, equation 1, or using equation 2. For example, with reference to equation 1, CCEs for of $M_p^{(L_p)}$, $L_p \neq L_{p,nest}$, PDCCH candidates can be determined as given in equation 6:

$$L_p \cdot \left\{ \left( Y_{p,k} + \left\lfloor \frac{m \cdot N_{CCE,p,k,nest}}{L_p \cdot M_p^{(L_p)}} \right\rfloor \right) \mod \lfloor N_{CCE,p,k,nest}/L_p \rfloor \right\} + i, \quad \text{equation 6}$$

$$i = 0, \ldots L_p - 1$$

Figure 19:
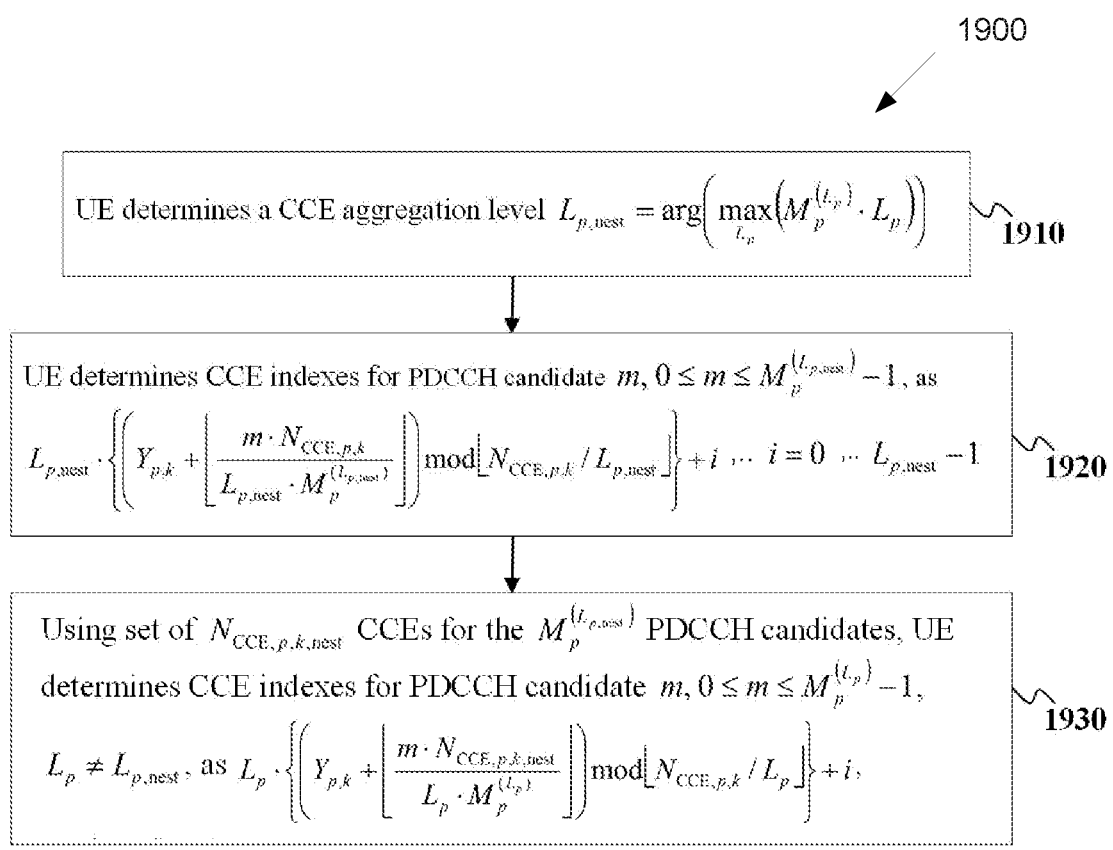
FIG. 19 illustrates an example determination of CCEs for PDCCH candidates based on a second realization according to embodiments of the present disclosure.

FIG. 19 illustrates an example determination of CCEs 1900 for PDCCH candidates based on a second realization according to embodiments of the present disclosure. An embodiment of the determination of CCEs 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

As shown in FIG. 19, a UE is configured by a gNB a control resource set p, having a number of $N_{CCE,p,k}$ CCEs and a number of $M_p^{(L_p)}$ PDCCH candidates with CCE aggregation level $L_p$ in the control resource set p. It is also possible that values of $M_p^{(L_p)}$ and $L_p$ for predetermined values of $N_{CCE,p,k}$ are determined in the specifications of a system operation or are derived by the UE according to some specified formula. Based on the values of $M_p^{(L_p)}$ and $L_p$, the UE determines a CCE aggregation level $$L_{p,nest} = \arg\left( \max_{L_p}\left( M_p^{(L_p)} \cdot L_p \right) \right)$$

1910. For each of the $M_p^{(L_{p,nest})}$ PDCCH candidates, the UE determines respective CCE indexes according to a formula, such as for example one of equation 1 or equation 2, considering the set of all $N_{CCE,p,k}$ CCEs in control resource set p 1920.

For each of the $M_p^{(L_p)}$, $L_p \neq L_{p,nest}$, PDCCH candidates, the UE determines respective CCE indexes according to a formula, such as for example one of equation 1 or equation 2, by considering the set of CCE indexes for the $M_p^{(L_{p,nest})}$ PDCCH candidates as a set of available CCE indexes, that is, by replacing $N_{CCE,p,k}$ with $N_{CCE,p,k,nest} = M_p^{(L_{p,nest})} \cdot L_{p,nest}$ 1930.

Figure 20:
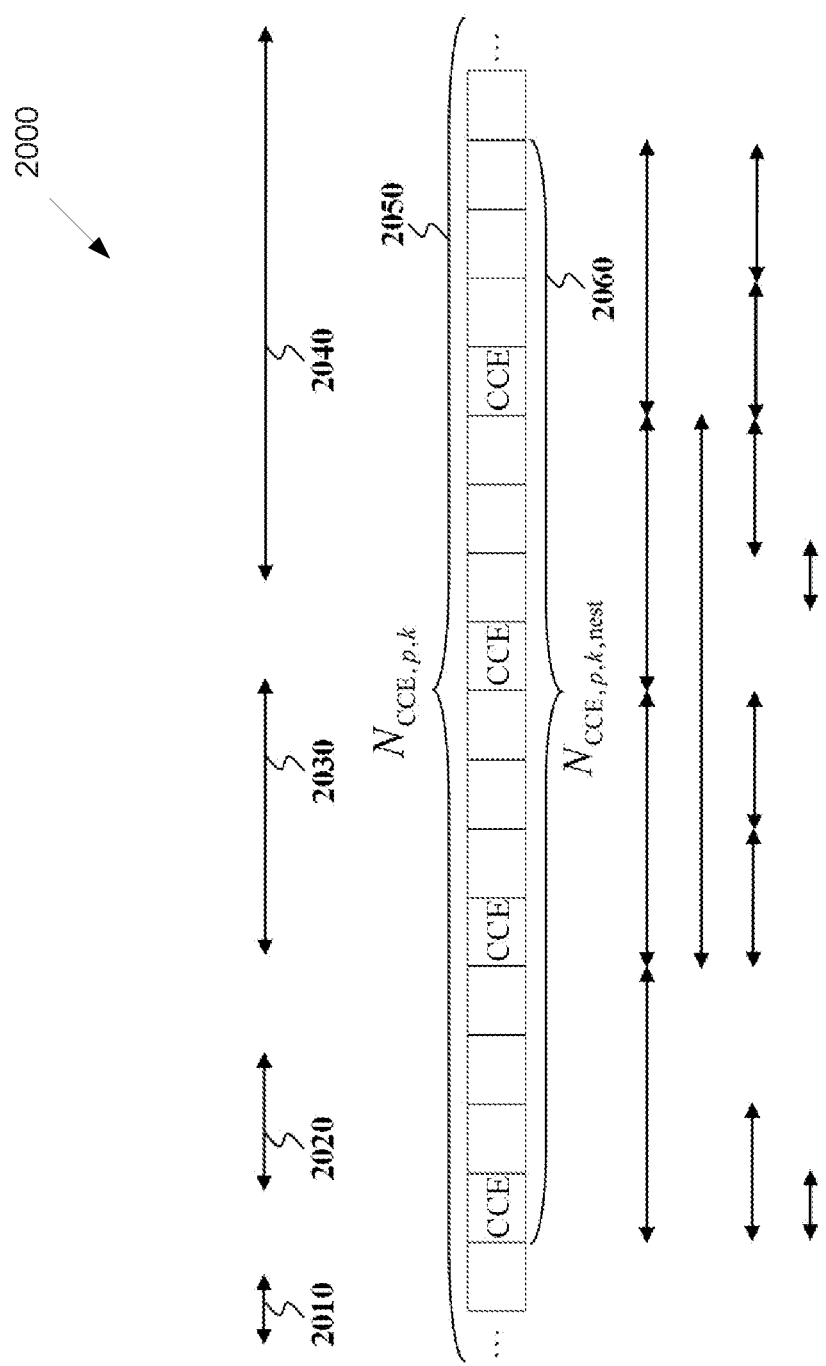
FIG. 20 illustrates example CCE indexes of PDCCH candidates based on the second realization according to embodiments of the present disclosure.

FIG. 20 illustrates example CCE indexes 2000 of PDCCH candidates based on the second realization according to embodiments of the present disclosure. An embodiment of the CCE indexes 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

As shown in FIG. 20, a UE has $M_p^{(1)}=2$ PDCCH candidates for CCE aggregation level $L_p=1$ 1910, $M_p^{(2)}=6$ PDCCH candidates for CCE aggregation level $L_p=2$ 1920, $M_p^{(4)}=4$ PDCCH candidates for CCE aggregation level $L_p=4$ 1930, and $M_p^{(8)}=1$ PDCCH candidates for CCE aggregation level $L_p=8$ 1940. It is $$L_{p,nest} = \arg\left( \max_{L_p}\left( M_p^{(L_p)} \cdot L_p \right) \right) = 4.$$

The UE determines CCE indexes for the $M_p^{(4)}=4$ PDCCH candidates for CCE aggregation level $L_p=4$ considering all $N_{CCE,p,k}$ CCEs 1950 in control resource set p in slot k. The CCE indexes form a set $N_{CCE,p,k,nest}$ CCEs 1960. The UE determines CCE indexes for the $M_p^{(1)}=2$, $M_p^{(2)}=6$, and $M_p^{(8)}=1$ PDCCH candidates for CCE aggregation levels $L_p=1$, $L_p=2$, and $L_p=8$, respectively, from CCE indexes in the set of $N_{CCE,p,k,nest}$ CCEs in control resource set p and slot k.

CCE indexes for PDCCH candidates can also be randomized, as described for the first realization, by having a determination for the parameter $Y_{p,k}$ in equation 1 depend on an index of a PDCCH candidate in addition to a UE RNTI. Then, for example, CCE indexes can be determined according to equation 2, or according to equation 3A/3B (by replacing $L_{p,max}$ with $L_{p,nest}$ or $L_p$ in general) and using $N_{CCE,p,k,nest}$, instead of $N_{CCE,p,k}$, for CCE indexes corresponding to $L_p \neq L_{p,nest}$.

Further, an additional condition that can apply to both the first realization and the second realization is for not only to use different CCE indexes for PDCCH candidates with a same CCE aggregation level but, when possible, also use different CCE indexes for PDCCH candidates with different CCE aggregation levels. This can be achieved by removing CCE indexes that have been allocated to a PDCCH candidate from a set of available CCE indexes and continuing in an iterative fashion. For example, starting from PDCCH candidates with a largest CCE aggregation level and a total set of available CCE indexes, $\{S_{CCE,p,k}\}$, a set of $\{S_{CCE,p,k,nest}\}$ for PDCCH candidates of a CCE aggregation level can be obtained. For example, the CCE aggregation level can be $L_{p,max}$ according to the first realization or $$L_{p,nest} = \arg\left(\max_{L_p}\left(M_p^{(L_p)} \cdot L_p\right)\right)$$

according to the second realization.

From the set of $\{S_{CCE,p,k,nest}\}$ CCE indexes, indexes of CCEs for PDCCH candidates with CCE aggregation level $L_{p,max}$, when different than $L_{p,nest}$, can be first determined and removed from $\{S_{CCE,p,k,nest}\}$ to determine a second set of CCE indexes $\{S_{CCE,p,k,nest,1}\}$. From the set of $\{S_{CCE,p,k,nest,1}\}$ CCEs, indexes of CCEs for PDCCH candidates with a second largest CCE aggregation level $L_{p,max\,1}$, when different than $L_{p,nest}$, can be next determined and removed from $\{S_{CCE,p,k,nest,1}\}$ to determine a second set of CCE indexes $\{S_{CCE,p,k,nest,2}\}$, and so on. The process can continue until CCE indexes for all PDCCH candidates of all CCE aggregation levels are allocated or until a set of available CCE indexes does not include enough CCE indexes to allocate to PDCCH candidates of a CCE aggregation level without overlapping. In the latter case, the process can be reinitialized using the first set $\{S_{CCE,p,k,nest}\}$ of CCE indexes.

A second embodiment of the present disclosure considers a mapping of a CCE to REGs and a mapping of PDCCH to CCEs considering a nested PDCCH search space.

When a UE is configured PDCCH candidates that map to a variable number of OFDM symbols, such as a first OFDM symbol or all OFDM symbols of a DL control resource set in a slot, or to different OFDM symbols, such as a first OFDM symbol or a second OFDM symbol, a number of CCEs that are available for mapping a PDCCH candidate can depend on a number of respective OFDM symbols used for the mapping. For example, a number of CCEs available for mapping a PDCCH candidate over two OFDM symbols can be two times larger than a number of CCEs available for mapping a PDCCH candidate over one OFDM symbol.

This effectively creates multiple control resource subsets within one control resource set where a control resource subset can be identified by a number or index of associated OFDM symbols and all control resource subsets span a same BW as the control resource set. When all PDCCH candidates map to all OFDM symbols of a control resource set (this is trivially the case when a control resource set includes only one OFDM symbol), a nested search space can be obtained as described in the aforementioned embodiment of this disclosure.

Figure 21:
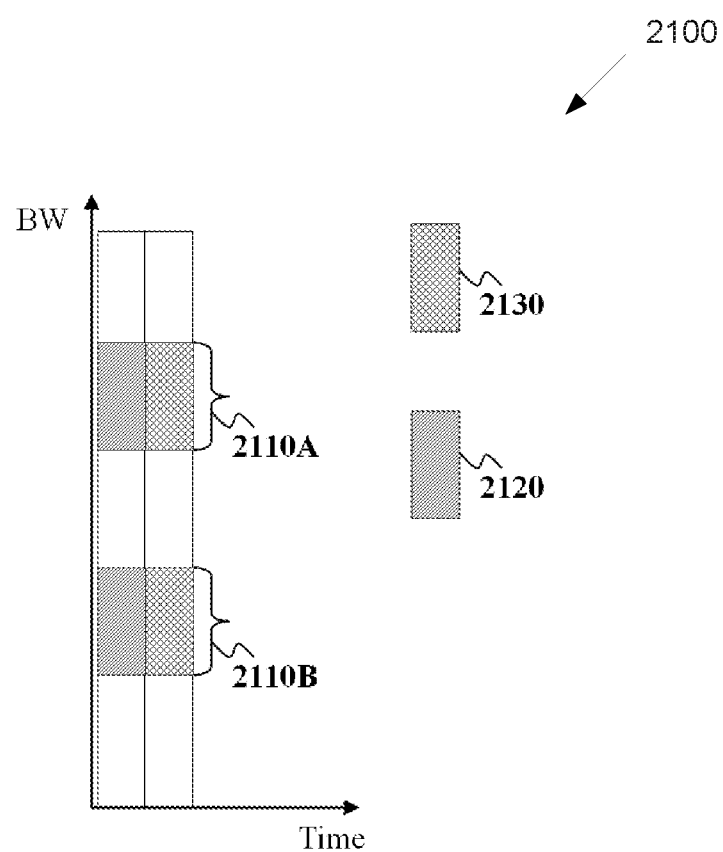
FIG. 21 illustrates example control resource subsets in a control resource set according to embodiments of the present disclosure.

FIG. 21 illustrates example control resource subsets 2100 in a control resource set according to embodiments of the present disclosure. An embodiment of the control resource subsets 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

As shown in FIG. 21, a UE is configured a set of PRBs 2110A and 2110B for a control resource set that spans two OFDM symbols. The set of PRBs can include PRBs that are either contiguous or non-contiguous in frequency. A first control resource subset includes all PRBs in the first OFDM symbol 2120, a second control resource subset includes all PRBs in the second OFDM symbol 2130, and a third control resource subset is same as the control resource set and includes all PRBs in both the first and second OFDM symbols.

For the exemplary realization of control resource subsets in FIG. 21, a number of CCEs in the first control resource subset is denoted as $N_{CCE,p,k,1}$, a number of CCEs in the second control resource subset is denoted as $N_{CCE,p,k,2}$, and a number of CCEs in the control resource set is denoted as $N_{CCE,p,k}$. For example, $N_{CCE,p,k,1}=N_{CCE,p,k,2}=N_{CCE,p,k}/2$.

A nested search space structure when different PDCCH candidates map to different OFDM symbol indexes, including different numbers of OFDM symbols, can be determined as follows. For a DL control resource set p that includes $N_p$ OFDM symbols, denote by $L_{p,j}$ a CCE aggregation level $L_p$ when CCEs are mapped over j OFDM symbols and by $M_{p,j}^{(L_p)}$ a number of PDCCH candidates for CCE aggregation level $L_p$ that map to j OFDM symbols, $1 \leq j \leq N_p$. For the purpose of defining a nested search space structure, an equal distribution of CCEs for a PDCCH candidate over j OFDM symbols and $L_{p,j+1}=\lceil j \cdot L_{p,j}/(j+1) \rceil$, $1 \leq j \leq N_p$, are assumed. For example, when $L_{p,1}=4$, $L_{p,2}=2$, $L_{p,3}=2$, and $L_{p,4}=1$. Alternatively, only integer values of $j \cdot L_{p,j}/(j+1)$, $1 \leq j \leq N_p$, can be considered and then $L_{p,3}$ is not defined when $L_p=2^l$, l is a non-negative integer.

A UE first determines a maximum for product values of $M_{p,j}^{(L_p)} \cdot L_{p,j}$ for $1 \leq j \leq N_p$ and sets $$(L_{p,jnest}, j_{nest}) = \arg\left(\max_{L_p,j}\left(M_{p,j}^{(L_p)} \cdot L_{p,j}\right)\right).$$

When multiple values for $(L_{p,j_{nest}}, j_{nest})$ can exist, a selected value can be the one with the smallest $L_{p,j_{nest}}$ or the smallest $j_{nest}$. Typically, it can be expected that in $j_{nest}$ is equal to the smallest value of $1 \leq j \leq N_p$ with $M_{p,j}^{(L_p)}>0$, that is $$j_{nest} = \arg\left(\min_{j}\left(M_{p,j}^{(L_p)} > 0\right)\right).$$

The UE then determines CCE indexes for $M_{p,j_{nest}}^{(L_{p,nest})}$ PDCCH candidates, for example according to equation 1 or equation 2. When there is a same number of CCEs per OFDM symbol, the CCE indexes for the $M_{p,j_{nest}}^{(L_{p,nest})}$ PDCCH candidates can be determined relative to CCE indexes in a first OFDM symbol of DL control resource set p in slot k, $N_{CCE,p,k,1}$, and CCEs in remaining of $j_{nest}$ OFDM symbols can have a same index as in the first OFDM symbol. Further, it is possible for CCE indexing to be per symbol instead of across all symbols.

A resulting set of CCE indexes includes a number of $$N_{CCE,p,k,jnest} = M_{p,jnest}^{(L_{p,nest})} \cdot L_{p,jnest}$$

CCEs. For example, with reference to equation 1, a set of CCE indexes for PDCCH candidate m, $$0 \leq m \leq M_p^{(L_{p,jnest})} - 1,$$

in a first OFDM symbol of DL control resource set p in slot k can be determined as in equation 7:

equation 7

$$L_{p,j_{nest}}:$$

$$\left\{\left(Y_{p,k} + \left\lfloor \frac{m \cdot N_{CCE,p,k,1}}{L_{p,j_{nest}} \cdot M_p^{(L_p,j_{nest})}} \right\rfloor \right) \bmod \lfloor N_{CCE,p,k,1}/L_{p,j_{nest}} \rfloor \right\} + i,$$

$$i = 0, \ldots L_{p,j_{nest}} - 1.$$

A UE subsequently determines CCE indexes for $M_{p,j}^{(L_p)}$ PDCCH candidates, by replacing the set of $N_{CCE,p,k,1}$ CCE indexes in a first OFDM symbol of DL control resource set p in slot k with the set of $N_{CCE,p,k,j_{nest}} = M_{p,j_{nest}}^{(L_{p,nest})} \cdot L_{p,j_{nest}}$ CCE indexes and using equation 1 or equation 2. For example, with reference to equation 1, CCE indexes for $M_{p,j}^{(L_p)}$ PDCCH candidates, $L_{p,j} \neq L_{p,j_{nest}}$, can be determined as in equation 8:

equation 8

$$L_{p,j}\left\{\left(Y_{p,k} + \left\lfloor \frac{m \cdot N_{CCE,p,k,j_{nest}}}{L_{p,j} \cdot M_p^{(L_{p,j})}} \right\rfloor \right) \bmod \lfloor N_{CCE,p,k,j_{nest}}/L_{p,j} \rfloor \right\} + i,$$

$$i = 0, \ldots L_{p,j} - 1.$$

Figure 22:
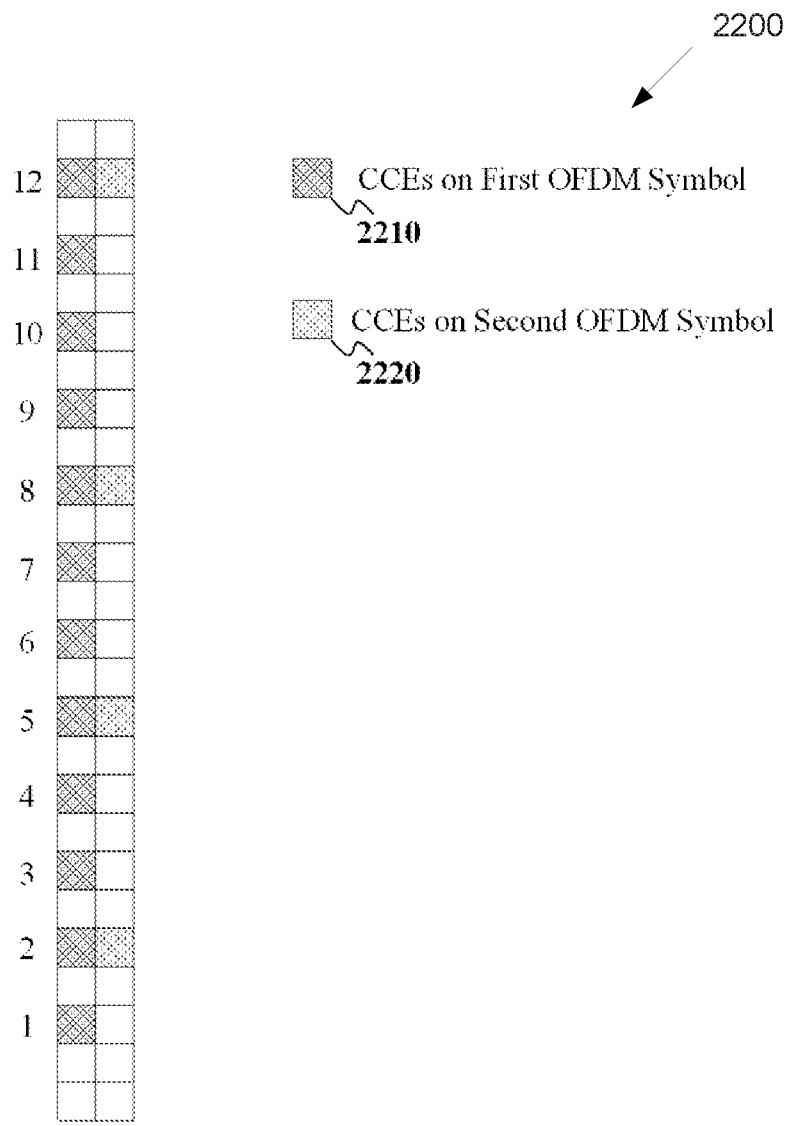
FIG. 22 illustrates example CCE indexes of PDCCH candidates spanning one or two OFDM symbols in a nested structure according to embodiments of the present disclosure.

FIG. 22 illustrates example CCE indexes 2200 of PDCCH candidates spanning one or two OFDM symbols in a nested structure according to embodiments of the present disclosure. An embodiment of the CCE indexes 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

As shown in FIG. 22, a UE is configured a DL control resource set p spanning two symbols. All PDCCH candidates for $L_p=1$ and $L_p=2$ span one OFDM symbol and PDCCH candidates for $L_p=4$ and $L_p=8$ span both OFDM symbols. The UE is configured the following PDCCH candidates: $M_{p,1}^{(1)}=4$ on the first OFDM symbol and $M_{p,1}^{(1)}=2$ on the second OFDM symbol, $M_{p,1}^{(2)}=6$ on the first OFDM symbol and $M_{p,1}^{(2)}=2$ on the second OFDM symbol, $M_{p,2}^{(4)}=2$, and $M_{p,2}^{(8)}=1$. Since $$(L_{p,j_{nest}}, j_{nest}) = \arg\left(\max_{L_{p,j}}\left(M_{p,j}^{(L_p)} \cdot L_{p,j}\right)\right) = (2,1),$$

the UE determines a set of $N_{CCE,p,k,1} = M_{p,1}^{(L_{p,1})} \cdot L_{p,1} = 12$ CCEs in the first OFDM symbol 2210, for example according to equation 7. For example, the first, second, third, fourth, fifth, and sixth PDCCH candidates with CCE aggregation level $L_p=2$ in the first OFDM symbol can use CCEs (1, 7), (2, 8), (3, 9), (4, 10), (5, 11) and (6, 12), respectively.

It is noted that actual indexes of CCEs 1 through 12 in FIG. 22 can be different in the DL control resource set but they are the indexes in the set of $N_{CCE,p,k,1}=12$ CCEs. For remaining PDCCH candidates, CCE indexes can be determined from the set of $N_{CCE,p,k,1}=12$ using, for example equation 8, and CCEs 1, 4, 7, and 10 can be used for respective $M_{p,1}^{(1)}=4$ PDCCH candidates on the first OFDM symbol, CCEs 2 and 8 can be used for respective $M_{p,1}^{(1)}=2$ PDCCH candidates on the second OFDM symbol, CCEs (2, 8) and (5, 11) can be used for respective $M_{p,1}^{(2)}=2$ PDCCH candidates on the second OFDM symbol, CCEs (3, 9) and (6, 12) on both OFDM symbols can be used for respective $M_{p,2}^{(4)}=2$ PDCCH candidates, and CCEs (1, 7), (3, 9), (4, 10) and (6, 12) on both OFDM symbols can be used for the $M_{p,2}^{(8)}=1$ PDCCH candidate.

A nested PDCCH search space structure can be primarily applicable to distributed PDCCH transmissions where blocks of one or more REGs for a CCE can be distributed in frequency and PDCCH candidates can share a set of CCE indexes. For localized PDCCH transmission, where REGs (and CCEs) for a PDCCH candidate are contiguous in frequency, a nested search space structure is more difficult to achieve when CCEs for PDCCH candidates are distributed in frequency in order to increase the likelihood for selecting CCEs where a UE experiences favorable channel conditions. For example, for a DL control resource set spanning one OFDM symbol and for $M_p^{(1)}=6$ PDCCH candidates with CCE aggregation level $L_p=1$ and for $M_p^{(2)}=4$ PDCCH candidates with CCE aggregation level $L_p=2$, even though all $M_p^{(L_p)} \cdot L_p = 6 \cdot 1 = 6$ CCE indexes for the $M_p^{(1)}$ PDCCH candidates can be a subset of the $M_p^{(L_p)} \cdot L_p = 4 \cdot 2 = 8$ CCE indexes for the $M_p^{(2)}$ PDCCH candidates, this would require that the CCEs for 2 PDCCH candidates with $L_p=1$ are contiguous to CCEs of 2 other PDCCH candidates with $L_p=1$ and this reduces the likelihood of selecting a CCE for PDCCH transmission where a UE experiences favorable channel conditions.

The limitation of a nested search space design for localized PDCCH transmissions can be addressed by limiting a use of a nested search space only to distributed PDCCH transmissions and using an unconstrained search space design, for example as in equation 1, for localized PDCCH transmissions. Nevertheless, in order for a UE to benefit also a reduced number of channel estimates the UE need to compute per slot, it can be possible to apply a nested search space design also for localized PDCCH transmissions.

In a first approach, for localized PDCCH transmissions, a nested search space design can be have a nested allocation of CCEs for PDCCH candidates where CCE indexes for CCE aggregation levels with the smallest number of candidates overlap with CCE indexes for CCE aggregation levels with the second smallest number of candidates, CCE indexes for CCE aggregation levels with the second smallest number of candidates overlap with CCE indexes for CCE aggregation levels with the third smallest number of candidates, and so on.

In a second approach, CCE indexes can determined as for a distributed transmission and it is possible that for some PDCCH candidates to have contiguous CCEs in the frequency domain.

When a DL control resource set includes multiple OFDM symbols, it can be possible to restrict PDCCH candidates for the larger CCE aggregation levels, such as 4 CCEs or 8 CCEs, to be over the multiple OFDM symbols in order to restrict a frequency span for the PDCCH candidates and reduce a number of RBs where a UE needs to obtain a channel estimate. PDCCH candidates for the smaller CCE aggregation levels, such as one CCE, can have respective REGs either only on one OFDM symbol or on multiple OFDM symbols.

Further, it can be possible to configure a transmission of a localized PDCCH candidate to span all OFDM symbols, regardless of the CCE aggregation level, while a transmission of a distributed PDCCH candidate can span either one OFDM (particularly for the smaller CCE aggregation levels)

or all OFDM symbols of a DL control resource set (particularly for the larger CCE aggregation levels).

Figure 23:
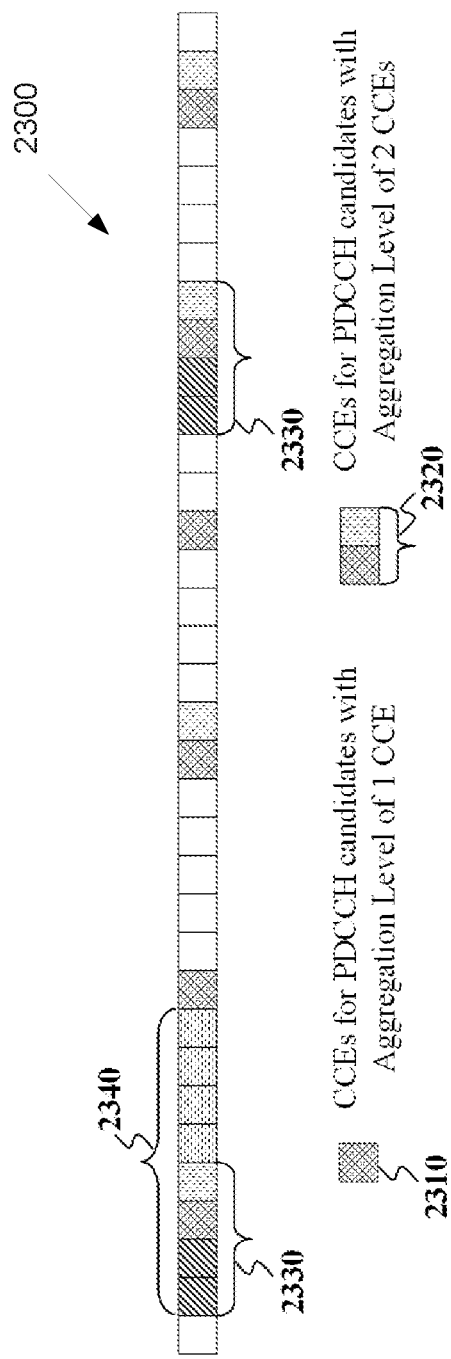
FIG. 23 illustrates an example nested allocation of CCE indexes to PDCCH candidates based on an ascending order of PDCCH candidates according to embodiments of the present disclosure.

FIG. 23 illustrates an example nested allocation of CCE indexes 2300 to PDCCH candidates based on an ascending order of PDCCH candidates according to embodiments of the present disclosure. An embodiment of the nested allocation of CCE indexes 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

As shown in FIG. 23, a UE is configured a DL control resource set p spanning one symbol. There are $M_{p,1}^{(1)}=6$ PDCCH candidates with CCE aggregation level $L_p=1$, $M_{p,1}^{(2)}=4$ PDCCH candidates with CCE aggregation level $L_p=2$, $M_{p,1}^{(4)}=2$ PDCCH candidates with CCE aggregation level $L_p=4$, and $M_{p,1}^{(8)}=1$ PDCCH candidates with CCE aggregation level $L_p=8$. A UE can first determine CCE indexes for a CCE aggregation level with a largest number of PDCCH candidates ($M_{p,1}^{(1)}=6$) according, for example, to equation 1 2310. The UE uses the set of CCEs for the $M_{p,1}^{(1)}=6$ PDCCH candidates to determine CCE indexes for the $M_{p,1}^{(2)}=4$ PDCCH candidates using, for example, equation 1 with $L_p=1$ to obtain one CCE index for each of $M_{p,1}^{(2)}=4$ PDCCH candidates and determining the other CCE index for each of the $M_{p,1}^{(2)}=4$ PDCCH candidates as a respective next (or previous) CCE index 2320.

The UE uses the set of CCEs for the $M_{p,1}^{(1)}=6$ PDCCH candidates to determine CCE indexes for the $M_{p,1}^{(4)}=2$ PDCCH candidates using, for example, equation 1 with $L_p=1$ to obtain one CCE index for the $M_{p,1}^{(4)}=2$ PDCCH candidates and determining the other three CCE indexes for each of the $M_{p,1}^{(4)}=2$ PDCCH candidates as a respective previous three (or next three) CCE indexes 2330 and 2335. The UE uses the set of CCEs for the $M_{p,1}^{(1)}=6$ PDCCH candidates to determine CCE indexes for the $M_{p,1}^{(8)}=1$ PDCCH candidate using, for example, equation 1 with $L_p=1$ to obtain one CCE index for $M_{p,1}^{(8)}=1$ PDCCH candidate and determine the other seven CCE indexes as a next seven (or previous seven) CCE indexes 2340. When there is not a sufficient number of next (or previous) CCE indexes, previous (or next, respectively) CCE indexes can be used.

Figure 24:
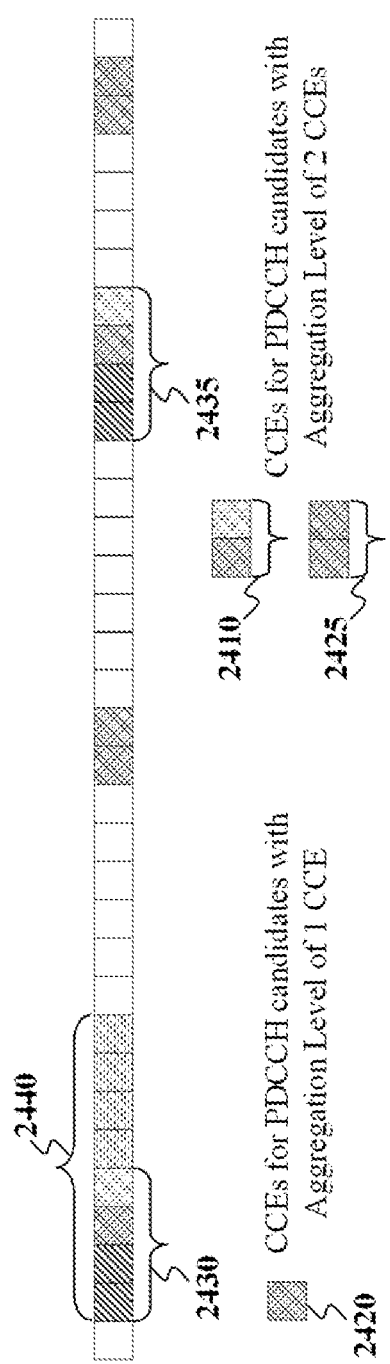
FIG. 24 illustrates an example nested allocation of CCE indexes to PDCCH candidates based on a restriction in CCE indexes for a number of PDCCH candidates according to embodiments of the present disclosure.

FIG. 24 illustrates an example nested allocation of CCE indexes 2400 to PDCCH candidates based on a restriction in CCE indexes for a number of PDCCH candidates according to embodiments of the present disclosure. An embodiment of the nested allocation of CCE indexes 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

As shown in FIG. 24, a UE is configured a DL control resource set p spanning one symbol. There $M_{p,1}^{(1)}6$ PDCCH candidates with CCE aggregation level $L_p=1$, $M_{p,1}^{(2)}=4$ PDCCH candidates with CCE aggregation level $L_p=2$, $M_{p,1}^{(4)}=2$ PDCCH candidates with CCE aggregation level $L_p=4$, and $M_{p,1}^{(8)}=1$ PDCCH candidate with CCE aggregation level $L_p=8$. A UE can first determine CCE indexes for a CCE aggregation level determined as $$\arg\left(\max_{L_p}\left(M_p^{(L_p)} \cdot L_p\right)\right) = 2$$

according, for example, to equation 1 2410, 2415. The UE uses the set of CCEs for the $M_{p,1}^{(2)}=4$ PDCCH candidates to determine CCE indexes for the $M_{p,1}^{(1)}=6$ PDCCH candidates using, for example, equation 1 with $L_p=1$ to obtain one CCE indexes for each of the $M_{p,1}^{(1)}=6$ PDCCH candidates 2420.

The UE uses the set of CCEs for the $M_{p,1}^{(2)}=4$ PDCCH candidates to determine CCE indexes for the $M_{p,1}^{(4)}=2$ PDCCH candidates using, for example, equation 1 with $L_p=2$ to obtain two CCE indexes for the $M_{p,1}^{(4)}=2$ PDCCH candidates and determining the other two CCE indexes for each of the $M_{p,1}^{(4)}=2$ PDCCH candidates as a respective previous two (or next two) CCE indexes 2430. The UE uses the set of CCEs for $M_{p,1}^{(2)}=4$ PDCCH candidates to determine CCE indexes for the $M_{p,1}^{(8)}=1$ PDCCH candidate using, for example, equation 1 with $L_p=2$ to obtain two CCE indexes for the $M_{p,1}^{(8)}=1$ PDCCH candidate and determine the other six CCE indexes as a next six (or previous six) CCE indexes 2440. When there is not a sufficient number of next (or previous) CCE indexes, previous (or next, respectively) CCE indexes can be used.

An UL DMRS or SRS transmission can be based on a transmission of a Zadoff-Chu (ZC) sequence, a CAZAC sequence, or a pseudo-noise (PN) sequence. For example, for a UL system BW of $N_{RB}^{max,UL}$ RBs, a ZC sequence $r_{u,v}^{(\alpha)}(n)$ can be defined by a cyclic shift (CS) $\alpha$ of a base sequence $\bar{r}_{u,v}(n)$ according to $r_{u,v}^{(\alpha)}(n)=e^{j\alpha n}\bar{r}_{u,v}(n)$, $0 \leq n < M_{sc}^{RS}$, where $M_{sc}^{RS}=mN_{sc}^{RB}$ is a sequence length, $1 \leq m \leq N_{RB}^{max,UL}$, and $\bar{r}_{u,v}(n)=x_q(n \bmod N_{ZC}^{RS})$ where the $q^{th}$ root ZC sequence is defined by $$x_q(m) = \exp\left(\frac{-j\pi qm(m+1)}{N_{ZC}^{RS}}\right), 0 \leq m \leq N_{ZC}^{RS}-1$$

with q given by $q=\lfloor \bar{q}+\frac{1}{2} \rfloor+v \cdot (-1)^{\lfloor 2\bar{q} \rfloor}$ and q given by $\bar{q}=N_{ZC}^{RS} \cdot (u+1)/31$. A length $N_{ZC}^{RS}$ of a ZC sequence is given by a largest prime number such that $N_{ZC}^{RS} < M_{sc}^{RS}$.

Multiple RS sequences can be defined from a single base sequence using different values of $\alpha$. UL DMRS or SRS transmissions can have a comb spectrum where non-consecutive SCs are used for transmission in a slot symbol. An SRS transmission is identified by a set of respective parameters such as a transmission comb, a cyclic shift, a BW, a starting position in a system BW, a number of transmitted antenna ports, a timing offset for a first transmission, or a number of transmission symbols.

CSI-RS can be transmitted on a number of antenna ports, such as one, two, four, eight, twelve, or sixteen antenna ports. For CSI-RS using more than eight antenna ports, $N_{res}^{CSI}>1$ CSI-RS configurations in a same slot are aggregated to obtain a total of $N_{res}^{CSI}N_{ports}^{CSI}$ ports antenna ports. Each CSI-RS configuration in such an aggregation corresponds to $N_{ports}^{CSI} \in \{4,8\}$ antenna ports. A mapping of a CSI-RS to REs in a slot is described in LTE specification.

Multiple CSI-RS configurations can be used in a cell. A UE can be configured with multiple sets of CSI-RS including up to three configurations for NZP CSI-RS the UE can use for CSI reporting and zero or more configurations for ZP CSI-RS. The NZP CSI-RS configurations are provided by higher layers. The ZP CSI-RS configurations in a slot can be given by a bitmap derived.

A UE can be configured with one or more CSI-RS resource configuration(s) that can include the following parameters. In one example, one or more CSI-RS resource configuration(s) include CSI-RS resource configuration identity. In another example, one or more CSI-RS resource configuration(s) include a number of CSI-RS ports. For example, allowable values and antenna port mapping can be as described in the LTE specifications. In yet another example, one or more CSI-RS resource configuration(s) include CSI-RS configuration as described in the LTE specifications. In yet another example, one or more CSI-RS resource configuration(s) include UE assumption on reference PDSCH transmitted power for CSI feedback $P_c$ for each CSI process. When CSI slot sets $C_{CSL0}$ and $C_{CSL1}$ are configured by higher layers for a CSI process, $P_c$ is configured for each CSI slot set of the CSI process. In yet another example, one or more CSI-RS resource configuration(s) include pseudo-random sequence generator parameter, $n_{ID}$. In yet another example, one or more CSI-RS resource configuration(s) include CDM type parameter, if UE is configured with higher layer parameter eMIMO-Type and eMIMO-Type is set to "CLASS A" for a CSI process as described in the LTE specifications.

A UE can be configured with one or more CSI resource configuration(s) for interference measurement (CSI-IM). A UE is typically not expected to receive a CSI-IM resource configuration that is not completely overlapping with one of the ZP CSI-RS resource configurations.

Based on a computation of a CQI, a UE can derive a CQI index between 1 and 15 corresponding to a modulation scheme and transport block size that the UE can receive with BLER not exceeding a predetermined value, such as 10%. If this is not possible, the UE reports a CQI index of 0. An interpretation of CQI indices is given in Table 1 and different mapping tables can also exist.

TABLE 1

4-bit CQI Table for Conventional UEs

| CQI Bits | CQI index | Modulation | code rate × 1024 | efficiency |
|---|---|---|---|---|
| 0000 | 0 | | out of range | |
| 0001 | 1 | QPSK | 78 | 0.1523 |
| 0010 | 2 | QPSK | 120 | 0.2344 |
| 0011 | 3 | QPSK | 193 | 0.3770 |
| 0100 | 4 | QPSK | 308 | 0.6016 |
| 0101 | 5 | QPSK | 449 | 0.8770 |
| 0110 | 6 | QPSK | 602 | 1.1758 |
| 0111 | 7 | 16QAM | 378 | 1.4766 |
| 1000 | 8 | 16QAM | 490 | 1.9141 |
| 1001 | 9 | 16QAM | 616 | 2.4063 |
| 1010 | 10 | 64QAM | 466 | 2.7305 |
| 1011 | 11 | 64QAM | 567 | 3.3223 |
| 1100 | 12 | 64QAM | 666 | 3.9023 |
| 1101 | 13 | 64QAM | 772 | 4.5234 |
| 1110 | 14 | 64QAM | 873 | 5.1152 |
| 1111 | 15 | 64QAM | 948 | 5.5547 |

A network can support UEs with different transmission or reception BW capabilities. For example, a network can have an available a system DL BW or UL BW of 200 MHz while a UE of a certain category can be able to or be configured to receive or transmit only in a smaller BW than the system DL BW or UL BW, such as in 20 MHz. Despite a transmission BW or reception BW of a UE being respectively smaller than a DL BW or an UL BW of a system, a gNB can schedule receptions or transmissions from the UE in any part of a respective system BW.

A gNB can configure a UE narrowbands (NBs) of a DL system BW or an UL system BW, where a BW of each NB does not exceed the UE capability for a reception BW or transmission BW, and schedule transmissions to the UE or transmissions from the UE in a respective NB. NBs can have a same size or different sizes. For example, all NBs can have a same size except for a last NB that can have same or smaller size than other NBs.

The term narrowband is used as reference and any other term, such as sub-band or BW part, can be used instead to denote a partitioning unit of a system BW into smaller BWs. Further, the NBs can be non-overlapping or can partially overlap.

DL DCI formats or UL DCI formats scheduling, respectively, transmissions to or from a UE can include a first field indicating an NB and a second field indicating resources within the NB. It is also possible that both an NB and an allocation of PRBs within the NB are indicated by a single field. In order for a gNB to select an NB among a set of NBs for scheduling receptions or transmissions from a UE while improving a system spectral efficiency, the gNB needs to be provided with CSI from the UE for NBs from the set of NBs. A UE can provide a CSI report to a gNB for an NB from a set of NBs either by transmitting a CSI report for the NB or by transmitting SRS in the NB to the gNB. A UE can transmit CSI reports in a PUCCH or a PUSCH in resources configured by a gNB by higher layer signaling or by physical layer (L1) signaling.

A UE can obtain a CSI report for an NB by measuring a CSI-RS transmitted in the NB. This requires that a UE retunes the UE's radio frequency (RF) receiver to an NB in order to receive a CSI-RS. As an NB for CSI-RS reception can be different than an NB a UE is configured to receive PDCCHs, this requires two retuning operations; one from an NB configured for PDCCH receptions to an NB of a CSI-RS transmission and another from the NB of CSI-RS transmission to the NB of PDCCH transmissions. As an RF retuning operation for a UE receiver requires a time period where the UE cannot receive signaling, it can limit scheduling opportunities of a UE and limit achievable data rates for the UE. It is therefore beneficial to reduce a time where a UE cannot receive DL control channels due to a retuning operation.

For an SRS transmission from a UE over a BW that is larger than a maximum SRS transmission BW the UE can support, the UE can transmit SRS in different NBs of the BW during respective different time instances. Further, a UE capability for simultaneously receiving from a number of antennas can be larger than a UE capability for simultaneously transmitting from a number of antennas. For a TDD system, due to a reciprocal DL BW and UL BW, SRS transmissions from a UE can provide CSI for DL transmissions to the UE and it is therefore beneficial to enable SRS transmission from all UEs antennas.

Therefore, there is a need for a gNB to trigger CSI-RS transmissions at different time instances in different narrowbands.

There is another need for a UE to measure a CSI-RS at different time instances in different narrowbands.

There is another need to for a UE to provide CSI reports for different narrowbands.

There is another need to configure a UE with resources for transmission of CSI reports.

There is another need to reduce an impact of RF retuning on a UE scheduling.

Finally, there is another need to enable a UE to transmit SRS in different narrowbands.

In one embodiment, designs for triggering CSI-RS transmissions on multiple NBs are considered. CSI-RS transmissions in NBs can be precoded or non-precoded. In the former case, a precoding can also be configured to a UE and can be same for all NBs (single configuration for all NBs) or can be different for different NBs (separate configuration per NB). CSI-RS transmissions can include zero-power CSI-RS and non-zero-power CSI-RS.

In order for a UE to receive CSI-RS in NBs from a configured set of NBs, the UE needs to retune the UE's RF receiver components to each NB from the set of NBs. Depending on whether the NBs in the set of NBs are in a same frequency band or in different frequency bands and depending on a slot duration and on a UE retuning capability, an associated RF retuning delay can vary from one or few symbols of a slot to one or more slots. While the UE is retuning the UE's receiver RF, the UE cannot receive other signaling from a gNB. Therefore, a CSI-RS transmission in a slot needs to account for a retuning delay while enabling a UE to be scheduled DL or UL transmissions through PDCCH receptions in an NB where the UE is configured to receive PDCCH.

When a retuning delay is smaller than a time interval between a last slot symbol where a UE is configured to receive PDCCHs in a first NB and a first slot symbol of a CSI-RS transmission in a second NB, the UE can receive CSI-RS in the second NB after receiving PDCCHs in the first NB when the UE does not receive other signaling, such as a PDSCH in the first NB and in the first slot or the second slot.

When a retuning delay is smaller than a time interval between a last slot symbol for receiving CSI-RS in the second NB and a first slot symbol for receiving PDCCHs in the first NB, the UE can retune to the first NB to receive PDCCHs after receiving CSI-RS in the second NB. When the UE detects a PDCCH that schedules the UE to receive a PDSCH in a first NB and the UE is also configured to receive CSI-RS in a second NB and a time between the end of the PDSCH reception and the start of the CSI-RS reception is smaller than a retuning delay from the first NB to the second NB, the UE can drop reception of the CSI-RS.

For a TDD system and a UE with a single duplexer, when the UE is configured to transmit a random access channel, or a PUSCH, or a PUCCH such as one conveying HARQ-ACK in a first NB and the UE is also configured to receive CSI-RS in a second NB and the retuning delay is larger than a time between an end of UL signaling and the start of CSI-RS reception, the UE can drop reception of the CSI-RS. For a TDD system and a UE with a single duplexer, when the UE is configured to transmit SRS in an NB and the UE is also configured to receive CSI-RS in a different NB and the retuning delay is such that the UE cannot transmit the SRS or receive the CSI-RS, the UE can prioritize reception of the CSI-RS and drop transmission of SRS. The UE can report a last valid CSI measurement for an NB that the UE dropped a CSI-RS reception.

In one example, CSI-RS transmission in a set of one or more NBs can be semi-persistent or periodic. A UE is configured by higher layers a set of NBs and parameters for CSI-RS transmission in each NB from the set NBs. Each NB in the set of NBs has a respective index that is determined, for example, according to an ascending order in a system BW. CSI-RS transmissions can also occur according to an ascending order of NB indexes except possibly for a CSI-RS transmission in an NB where a UE is configured to receive PDCCHs, as is further subsequently discussed, where a CSI-RS transmission can occur first. The CSI-RS transmission parameters can be same for all NBs and can be jointly configured for all NBs, except possibly for a location of slot symbols for CSI-RS transmissions as it is further discussed in the following, or can be separately configured for each NB.

CSI-RS transmission parameters can include one or more of a CSI-RS resource configuration identity, a number of CSI-RS ports, a CSI-RS configuration, a reference $P_c$ power for each CSI process, a pseudo-random sequence generator parameter, $n_{ID}$, and a CDM type parameter as they were previously described. CSI-RS transmission parameters can also include a reference slot and a periodicity for CSI-RS transmission in each NB, a number of symbols for CSI-RS transmission in a slot, or a CSI process identity.

Figure 25:
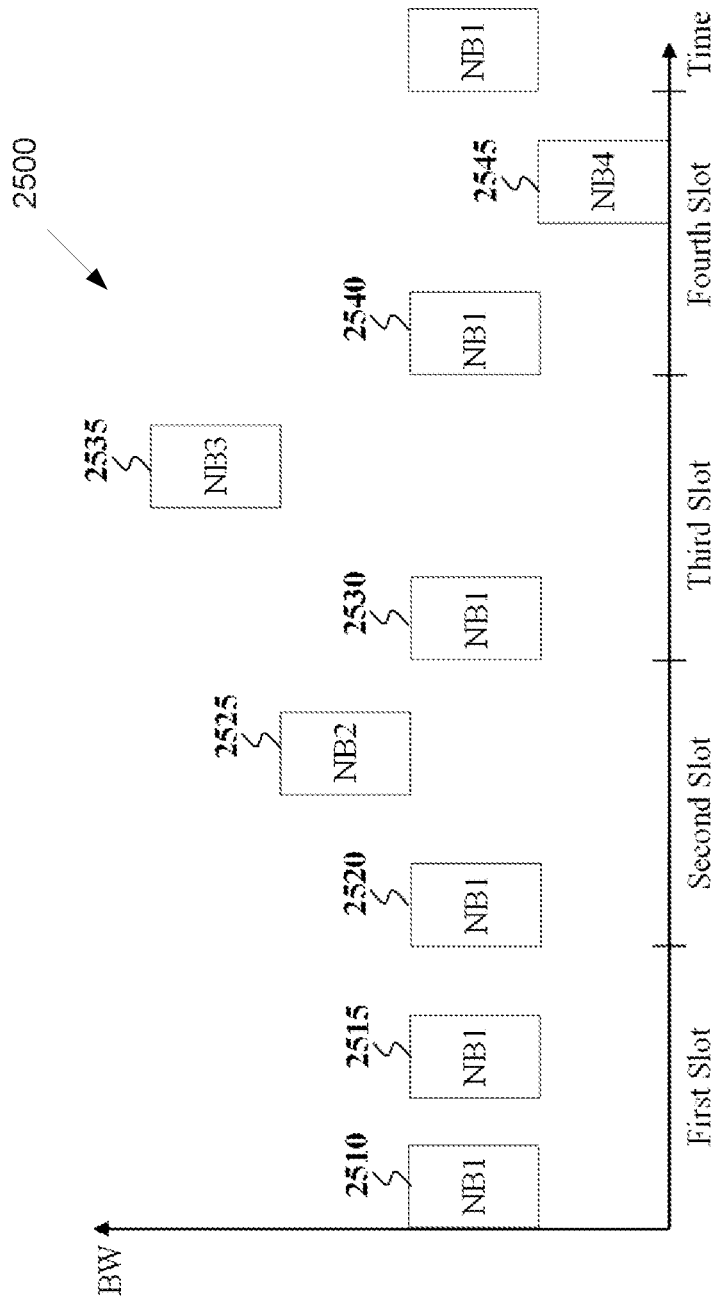
FIG. 25 illustrates example CSI-RS transmissions in a number of NBs where a UE retunes to an NB that the UE is configured for PDCCH receptions after receiving a CSI-RS transmission according to embodiments of the present disclosure.

FIG. 25 illustrates example CSI-RS transmissions 2500 in a number of NBs where a UE retunes to an NB that the UE is configured for PDCCH receptions after receiving a CSI-RS transmission according to embodiments of the present disclosure. An embodiment of the CSI-RS transmissions 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

As shown in FIG. 25, a UE is configured a set of NBs that includes four NBs and resources in a first NB from the four NBs for PDCCH receptions. In a first slot, the UE receives PDCCHs in the first NB 2510 and CSI-RS transmissions in the first NB 2515. In a second slot, the UE receives PDCCHs in the first NB 2520, retunes to a second NB to receive CSI-RS transmissions 2525, and retunes back to the first NB to receive PDCCHs in a third slot. In the third slot, the UE receives PDCCHs in the first NB 2530, retunes to a third NB to receive CSI-RS transmissions 2535, and retunes back to the first NB to receive PDCCHs in a fourth slot.

In the fourth slot, the UE receives PDCCHs in the first NB 2540, retunes to a fourth NB to receive CSI-RS transmissions 2545, and retunes back to the first NB to receive PDCCHs in a fifth slot. The retuning in a slot to a NB other than the current active NB where the UE receives PDCCHs can be conditioned on the UE not having a scheduled reception in the current active NB in the slot. Although FIG. 25 considers that a CSI-RS transmission for the UE occurs with a same periodicity in each NB, a different periodicity is also possible where, for example, a periodicity of CSI-RS transmission in the first NR is smaller than in other NBs from the set of NBs.

Instead of a UE retuning to an NB the UE is configured for PDCCH receptions, the UE can be configured to retune to an NB of a next CSI-RS transmission. For example, when a slot includes fourteen symbols, a retuning delay is one symbol and a last symbol for PDCCH receptions in a slot is a third symbol, the UE can receive CSI-RS in all NBs prior to retuning to the NB where the UE in configured to receive PDCCHs.

Whether or not the UE retunes to a new NB to receive CSI-RS transmissions or to a configured NB to receive PDCCHs can depend on a time the UE requires to retune between NBs (retuning delay), on a number of NBs in a set of NBs with CSI-RS transmissions, or on a slot duration, or on a maximum duration for PDCCH transmissions.

Figure 26:
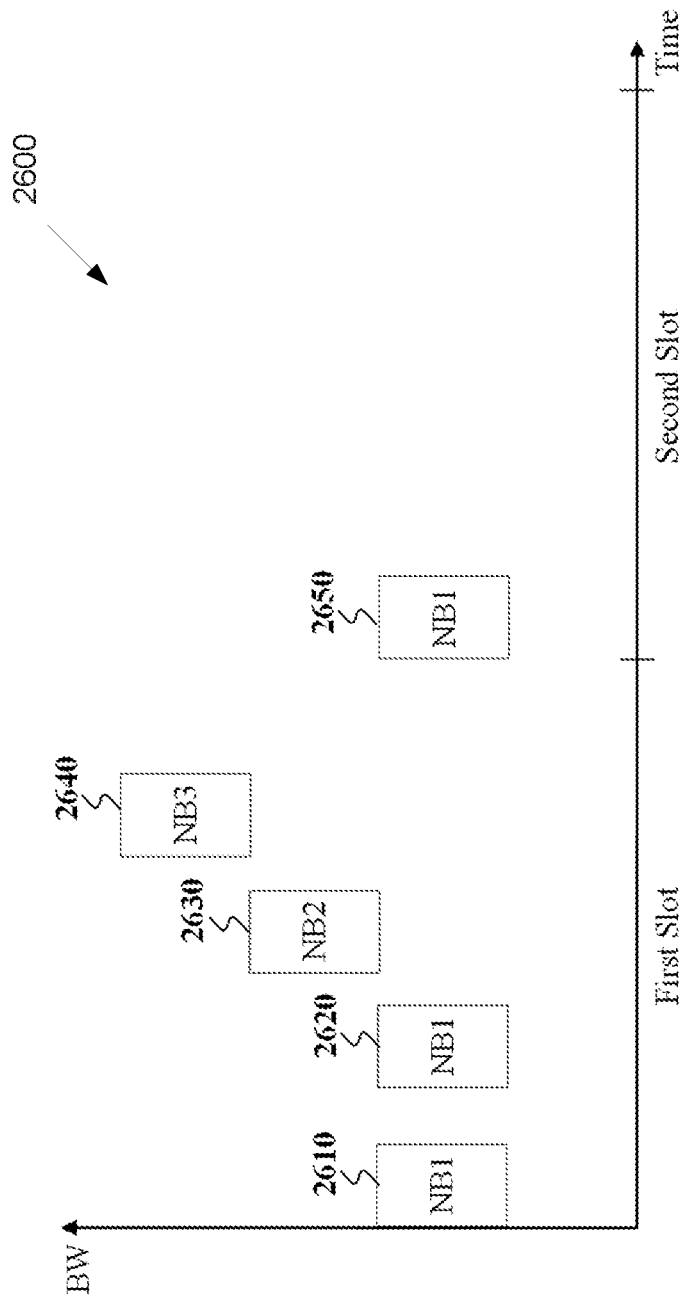
FIG. 26 illustrates example CSI-RS transmissions in a number of NBs where a UE retunes to each NB configured for reception of a CSI-RS transmission prior to retuning to an NB configured for PDCCH receptions according to embodiments of the present disclosure.

An intermediate behavior relative to the ones in FIG. 25 and FIG. 26 is also possible when a UE retuning time, a slot duration, and a maximum duration for transmission of DL control channels are such that the UE can receive CSI-RS transmissions in a sub-set of the set of NBs prior to retuning to an NB configured for PDCCH receptions and then retune to a different sub-set of the set of NBs for respective receptions of CSI-RS transmissions.

FIG. 26 illustrates example CSI-RS transmissions 2600 in a number of NBs where a UE retunes to each NB configured for reception of a CSI-RS transmission prior to retuning to an NB configured for PDCCH receptions according to embodiments of the present disclosure. An embodiment of the CSI-RS transmissions 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

As shown in FIG. 26, a UE is configured a set of NBs that includes three NBs and resources in a first NB from the three NBs for PDCCH receptions. In a first slot, the UE receives PDCCHs 2610 and first CSI-RS transmissions 2620 in the first NB. The UE subsequently retunes to a second NB to receive CSI-RS transmissions 2630 and then to a third NB to receive third CSI-RS transmissions 2640. After receiving the CSI-RS transmissions in the three NBs, the UE retunes to the first NB to receive PDCCHs in a second slot 2650.

In another example, CSI-RS transmission in NBs from a set of NBs can be aperiodic and triggered by a DCI format conveyed by a PDCCH. The DCI format can be a DL DCI format scheduling a PDSCH transmission to a UE or can be a separate DCI format with contents for one or more UEs.

When a DCI format triggering CSI-RS transmissions in one or more NBs from a set of NBs is a DL DCI format scheduling a PDSCH transmission to a UE in one or more slots, the DL DCI format can include a field indicating one or more NBs from the set of NBs for CSI-RS transmission. As the DL DCI format schedules a PDSCH transmission to the UE, when an NB of the PDSCH transmission is also an NB with triggered CSI-RS transmission then, in order to be able to receive the PDSCH, a first CSI-RS transmission can occur in the NB where the UE is configured to receive PDCCHs and subsequent CSI-RS transmissions are in remaining NBs according to an ascending (or descending) order of an NB index.

When an NB where a UE is configured to receive PDCCHs is not an NB with triggered CSI-RS transmission, the UE can receive the PDSCH in the one or more slots and subsequently, after the one or more slots, retune to NBs with triggered CSI-RS transmission. It is also possible that CSI-RS transmissions in NBs are according to an ascending NB index including, when a CSI-RS transmission is triggered, an NB of a scheduled DL data channel transmission. Depending on a retuning delay, the UE can also receive PDCCHs in an NB in a next slot prior to retuning and, when the UE detects another DL DCI format in the next slot scheduling PDSCH transmission to the UE in a first NB in one or more next slots, the UE can ignore triggered CSI-RS transmissions in NBs other than the first NB in the one or more next slots.

A field in a DL DCI format triggering CSI-RS transmission in one or more NBs from a set of NBs that a UE is configured can include an indication of the NBs. For example, a field with two binary elements (bits) can indicate no CSI-RS transmissions using a "00" value, and indicate CSI-RS transmissions in a first, second, or third configured sub-sets of NBs from the set of NBs using a "01," a "10" and a "11" value, respectively. Parameters for CSI-RS transmission in each NB can be same or different. As it was previously described, it is also possible to use a separate field for indicating a NB for a CSI-RS reception and use the field triggering the CSI-RS reception to indicate a CSI-RS configuration.

For example, a CSI-RS resource configuration identity, a number of CSI-RS ports, a CSI-RS configuration, a reference $P_c$ power for each CSI process, a pseudo-random sequence generator parameter, niD, a CDM type parameter, a number of symbols in a slot, or a CSI process identity can be same for all NBs. A location of slot symbols for CSI-RS transmission in each NB can be same or different. For example, when CSI-RS transmission is in different slots in respective different NBs, respective slot symbols can be same. For example, when CSI-RS transmission in at least some NBs are in a same slot, respective slot symbols are different and a respective offset in number of symbols for successive CSI-RS transmissions can be determined from a retuning delay for UEs with associated triggered CSI-RS transmissions or can be signaled by a gNB either by UE-common higher layer signaling, such as system information, or by UE-specific higher layer signaling.

A DL DCI format scheduling a DL data channel transmission to a UE and triggering receptions by the UE of respective CSI-RS transmissions in one or more NBs from a set of NBs can also trigger a PUCCH transmission from the UE conveying a CSI report for the one or more NBs. A resource for the PUCCH transmission can be explicitly indicated in the DL DCI format or can be configured to the UE by higher layer signaling.

In a first example, the DL DCI format can include a PUCCH resource allocation field for CSI reporting. A UE can be configured by higher layers four PUCCH resources and a PUCCH resource allocation field for CSI reporting can include two bits to indicate one of the four configured resources.

In a second example, the DL DCI format can include a PUCCH resource allocation field for HARQ-ACK reporting associated with a reception outcome by the UE for the DL data channel. For example, a UE can be configured by higher layers four PUCCH resources and a PUCCH resource allocation field for HARQ-ACK reporting can include two bits to indicate one of the four configured resources. Then, a PUCCH resource for CSI reporting can be derived from the PUCCH resource for HARQ-ACK reporting. The UE can also be configured by higher layers four PUCCH resources for CSI reporting and when, for example, a third PUCCH resource is indicated for HARQ-ACK reporting, the UE also uses a third PUCCH resource for CSI reporting. Therefore, PUCCH resources for HARQ-ACK reporting and for CSI reporting are different but are jointly indicated.

A same approach can apply for transmission timing of a HARQ-ACK report and of a CSI report. For example, to avoid simultaneous transmissions from a UE of a first PUCCH conveying a HARQ-ACK report and of a second PUCCH conveying a CSI report, the UE can transmit the CSI report in a next slot, or in a predetermined slot, after the slot where the UE transmits the CSI report. A UE can also be configured to transmit successive PUCCHs in respective different symbols of a same slot. The DL DCI format can also include a TPC command for the UE to adjust a PUCCH transmission power for HARQ-ACK reporting, and assuming a same closed-loop power control process for PUCCH transmissions, the UE applies the TPC command also for adjusting a PUCCH transmission power for CSI reporting.

When a DCI format triggering CSI-RS transmissions in NBs from a set of NBs for a UE is not a DL DCI format, the DCI format can have a same size as a DL DCI format that the UE decodes, or as a size of a DCI format that the UE decodes for other purposes such as for obtaining TPC commands. A CRC of the DCI format can be scrambled with an RNTI specific to triggering of CSI-RS transmissions such as a CSI-RS-RNTI. A DCI format with a CSI-RS-RNTI is referred to for brevity as DCI format T. Using a DCI format T, a gNB can trigger CSI-RS transmissions in different NBs from a configured set of NBs, and possibly also in different cells, for each UE from a group of UEs configured with a same CSI-RS-RNTI.

A UE can be configured a location in DCI format T where the UE can obtain a CSI-RS trigger field indicating CSI-RS transmissions in a subset of NBs from the configured set of NBs through a parameter Index-CSI-RS. For example, as described for a DL DCI format, a CSI-RS trigger field can have two bits or can have a larger number of bits than in a DL DCI format for increased granularity where a value of "00" can indicate no CSI-RS transmissions and remaining values can indicate CSI-RS transmissions in respective configured subsets of NBs (including all NBs in the set of NBs).

For example, an increased granularity can be useful when there is a large number of NBs in the set of NBs or when a UE can be triggered CSI-RS transmissions both in multiple NBs and in multiple cells or in multiple sets of slots. Alternatively, DCI format T can include separate CSI-RS trigger fields for sets of NBs on respective different cells for a same UE. It is also possible that, when a CSI-RS trigger field triggers CSI-RS transmissions, it does so for all NBs in the set of NBs. Then, the CSI-RS trigger field can include a single bit for each UE per cell where a value of "0" indicates no CSI-RS triggering and a value of "1" indicates CSI-RS triggering in all NBs in the set of NBs.

A DCI format T can also include a field indicating a PUCCH resource for a transmission of a PUCCH conveying a CSI report from a UE in response to measurements associated with triggered CSI-RS transmissions in NBs from a configured set of NBs and a field conveying a TPC command for the PUCCH transmission. The PUCCH resource field can be an index to a PUCCH resource from a configured set of PUCCH resources.

For example, when a PUCCH resource field includes two bits, the PUCCH resource field can indicate one out of four configured PUCCH resources. A location of the PUCCH resource field or a location of a TPC command field can be linked to a configured location of a CSI-RS trigger field, for example, the PUCCH resource field can be in a next location and the TPC command field can be in a location after the next location (or the reverse or in a previous location).

DCI format T can also indicate a single PUCCH resource for a transmission of a PUCCH that conveys a CSI report associated with a first location where a CSI-RS trigger field in DCI format T does not have a "00" value and PUCCH resources for PUCCH transmissions conveying other CSI reports can be determined relative to the indicated PUCCH resource.

For example, a UE with a first location in DCI format T for a CSI-RS transmission trigger field with value different than "00" can use the indicated, first, PUCCH resource to transmit a PUCCH that conveys a CSI report, a UE with a second location in DCI format T for a CSI-RS transmission trigger field with value different than "00" can use a second PUCCH resource after the first PUCCH resource, a UE with a third location in DCI format T for a CSI-RS transmission trigger field with value different than "00" can use a third PUCCH resource after the second PUCCH resource, and so on.

Therefore, when PUCCH resource $n_{PUCCH}$ is indicated in DCI format T, a UE with $n_{CSI-RS}$-th CSI-RS transmission trigger value that is different than "00" can use PUCCH resource $n_{PUCCH}+n_{CSI-RS}-1$ to transmit a CSI-RS report or, by assigning an index "0" (instead of an index "1") to the first CSI-RS transmission trigger value that is different than "00," a UE with $n_{CSI-RS}$-th CSI-RS transmission trigger value that is different than "00" can use PUCCH resource $n_{PUCCH}$+NCSI RS to transmit a CSI-RS report. A CSI report from a UE can a combined CSI report for each NB with triggered CSI-RS transmission or the UE can select a predetermined number of NBs, from the NB with triggered CSI-RS transmissions, to provide respective CSI reports.

A DL DCI format or a DCI format T can also include a TPC command field for a UE to adjust a power for a transmission of a PUCCH conveying a CSI report. A TPC command field can be next to a CSI-RS transmission trigger field (either before or after) or can be at a different configured location for each UE. A UE can be configured with more than one CSI-RS-RNTI where the contents of DCI format T are interpreted according to the CSI-RS-RNTI. For example, a first CSI-RS-RNTI can correspond to a first set of NBs or a first group of cells while a second CSI-RS-RNTI can correspond to a second set of NBs or a second group of cells.

Figure 27:
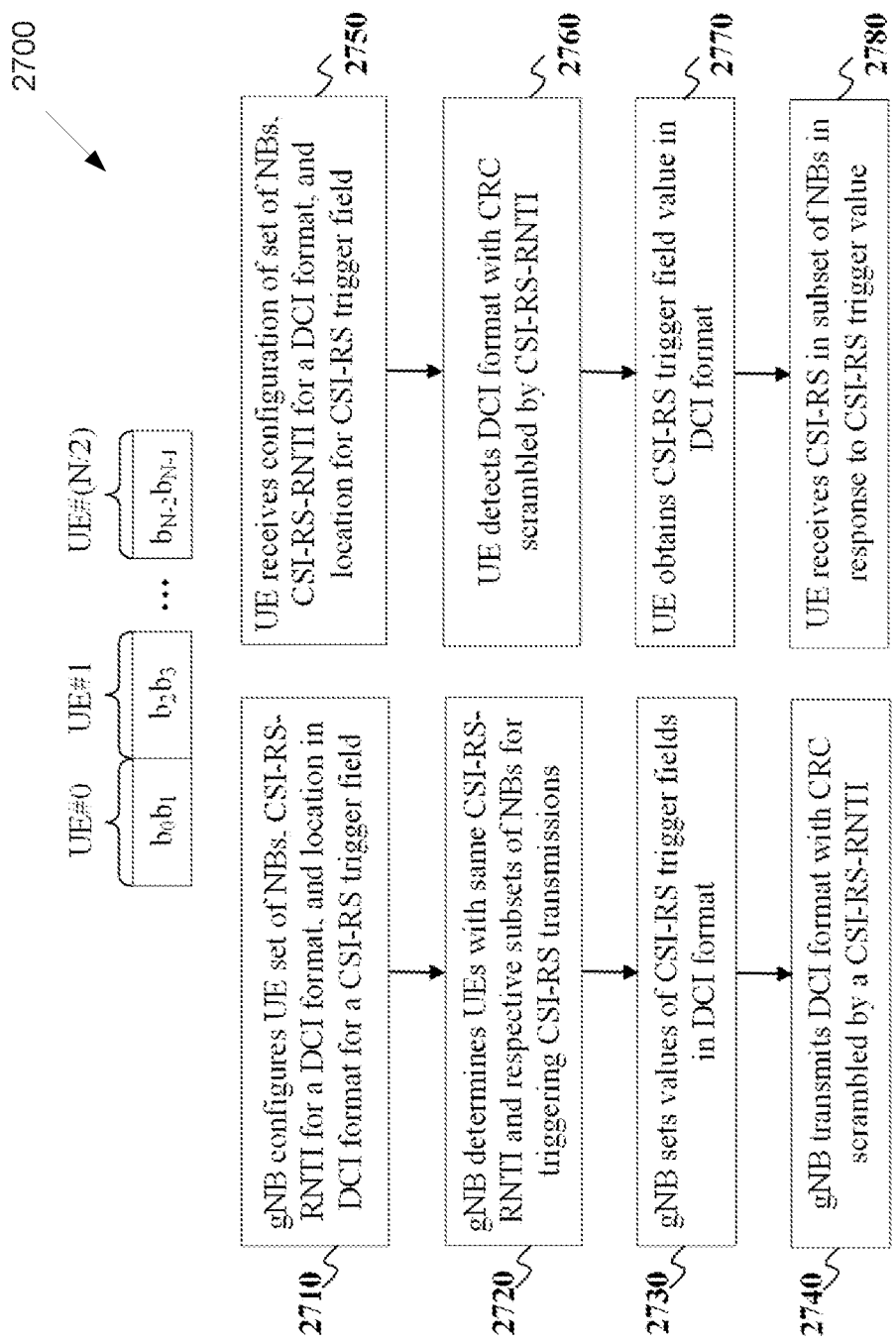
FIG. 27 illustrates example contents of a DCI format with CRC scrambled by a CSI-RS-RNTI that triggers CSI-RS transmissions in a subset of NBs from a set of NBs for one or more UEs according to embodiments of the present disclosure.

FIG. 27 illustrates example contents of a DCI format 2700 with CRC scrambled by a CSI-RS-RNTI that triggers CSI-RS transmissions in a subset of NBs from a set of NBs for one or more UEs according to embodiments of the present disclosure. An embodiment of the contents of a DCI format 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

As shown in FIG. 27, a gNB configures to a UE a set of NBs, a CSI-RS-RNTI that scrambles a CRC of a DCI format and a location in the DCI format for a CSI-RS trigger field that triggers CSI-RS transmissions in a subset of NBs from the set of NBs 2710. The set of NBs can be separately configured per UE for different UEs with a same configured CSI-RS-RNTI. The gNB determines UEs from a group of one or more UEs configured with a same CSI-RS-RNTI and respective subsets of NBs for triggering CSI-RS transmissions 2720. The gNB sets values of a CSI-RS trigger field according to whether or not the gNB triggers CSI-RS transmissions for a UE 2730 and when CSI-RS transmissions are triggered, according to a subset of NBs with triggered CSI-RS transmissions.

A CSI-RS trigger field can include two bits where a value of "00" does not trigger any CSI-RS transmission for a UE and a value of "01," "10" or "11" respectively triggers CSI-RS transmissions in a first, second, and third subsets of NBs that can include all NBs in the set of NBs or triggers CSI-RS transmissions with a first, second, or third configuration in a NB indicated by a respective field in the DCI format. The gNB transmits the DCI format with CRC scrambled by the CSI-RS-RNTI 2740. A UE receives from the gNB a configuration for a set of NBs, for a CSI-RS-RNTI that scrambles a CRC of a DCI format, and for a location in the DCI format of a CSI-RS trigger field that can trigger CSI-RS transmissions in a subset of NBs 2750.

The UE detects the DCI format with CRC scrambled by the CSI-RS-RNTI 2760. The UE obtains a value for the CSI-RS trigger field 2770. When the value of CSI-RS trigger field is "00," the UE does not receive CSI-RS and when the value of the CSI-RS trigger field is "01," "10" or "11," the UE receives CSI-RS transmissions in a first, second, and third subsets of NBs, respectively or receives CSI-RS according to a first, second, or third configuration 2780.

Figure 28:
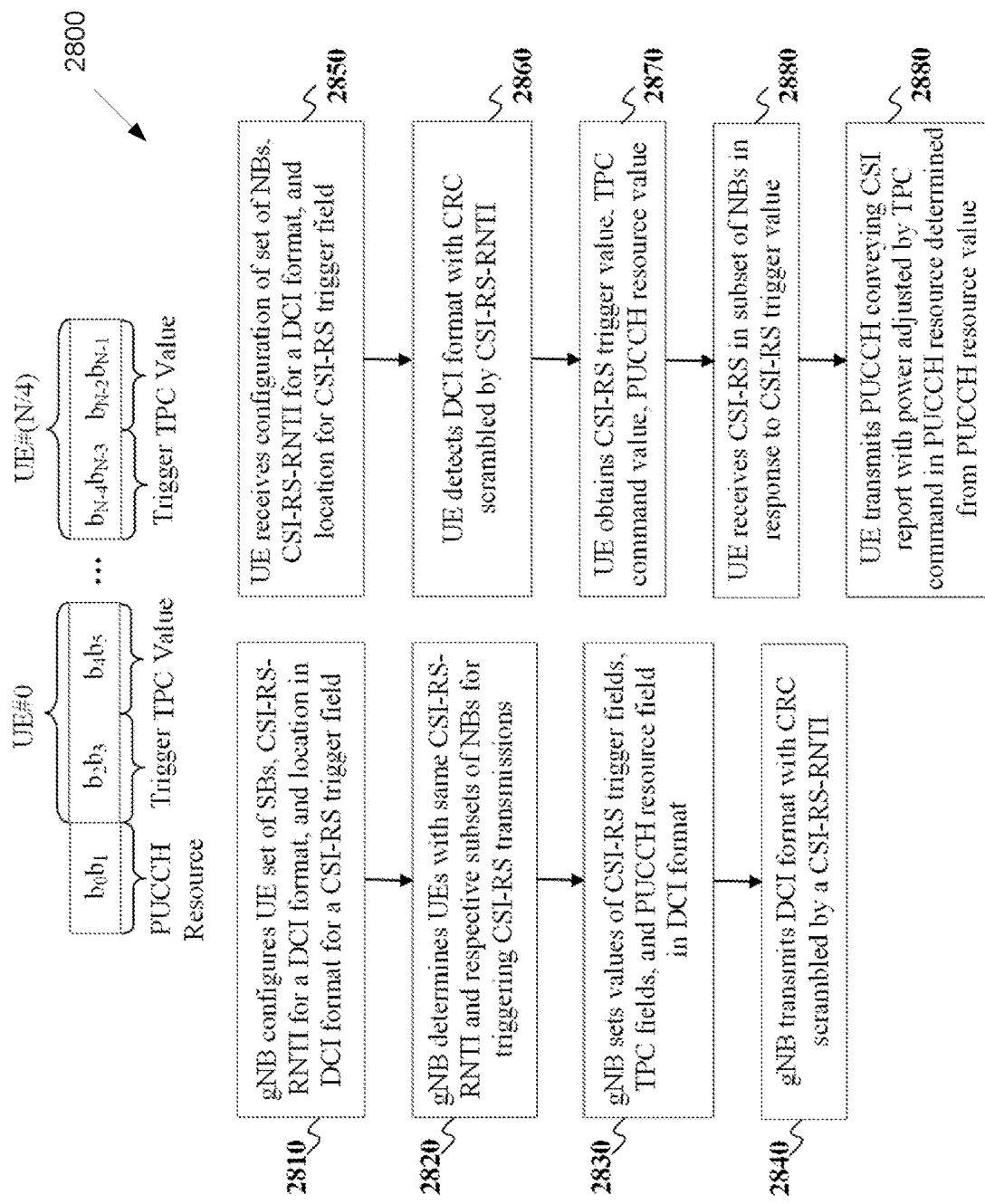
FIG. 28 illustrates example contents of a DCI format with CRC scrambled by a CSI-RS-RNTI that triggers CSI-RS transmissions in a subset of NBs from a set of NBs for one or more UEs and provides a PUCCH resource and TPC commands for transmissions of CSI reports according to embodiments of the present disclosure.

FIG. 28 illustrates example contents of a DCI format 2800 with CRC scrambled by a CSI-RS-RNTI that triggers CSI-RS transmissions in a subset of NBs from a set of NBs for one or more UEs and provides a PUCCH resource and TPC commands for transmissions of CSI reports according to embodiments of the present disclosure. An embodiment of the contents of a DCI format 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

As shown in FIG. 28, a gNB configures to a UE a set of NBs, a CSI-RS-RNTI that scrambles a CRC of a DCI format and a location in the DCI format for a CSI-RS trigger field that triggers CSI-RS transmissions in a subset of NBs from a set of NBs and a TPC command for adjusting a power of a PUCCH transmission that includes a CSI report 2810. The set of NBs can be different for different UEs. The gNB determines UEs from a group of one or more UEs configured with a same CSI-RS-RNTI and respective subsets of NBs for triggering CSI-RS transmissions 2820.

The gNB sets values of a CSI-RS trigger field according to whether or not the gNB triggers CSI-RS transmissions for a UE and when CSI-RS transmissions are triggered, according to a subset of NBs with triggered CSI-RS transmissions and a UE can process a TPC command in the DCI format even when the UE is not triggered CSI-RS transmissions and does not transmit a PUCCH conveying a CSI report 2830.

A CSI-RS trigger field can include two bits where a value of "00" does not trigger any CSI-RS transmission for a UE and a value of "01," "10" or "11" respectively triggers CSI-RS transmissions in a first, second, and third subsets of NBs that can include all NBs in the set of NBs. Additionally or alternatively, CSI-RS trigger field can indicate a CSI-RS configuration. The TPC command can also include two bits with values of "00," "01," "10" or "11" mapping, for example, to power adjustments of −3 dB, −1 dB, 1 dB, and 3 dB, respectively. The gNB transmits the DCI format with CRC scrambled by the CSI-RS-RNTI 2840.

A UE receives from the gNB a configuration for a set of NBs, for a CSI-RS-RNTI that scrambles a CRC of a DCI format, and for a location in the DCI format of a CSI-RS trigger field that can trigger CSI-RS transmissions in a subset of NBs and the TPC field for adjusting a power of a PUCCH that conveys a CSI report 2850. The UE detects the DCI format with CRC scrambled by the CSI-RS-RNTI 2860. The UE obtains a value for the CSI-RS trigger field and for the TPC command field 2870.

When the value of CSI-RS trigger field is "00," the UE does not receive CSI-RS and when the value of the CSI-RS trigger field is "01," "10" or "11," the UE receives CSI-RS transmissions in a first, second, and third subsets of NBs, or according to a first, second, or third CSI-RS configuration, respectively 2880. The DCI format also includes a PUCCH resource field that indicates a PUCCH resource $n_{PUCCH}$ that is used by a UE having the first CSI-RS trigger in the DCI format with value different than "00" to transmit a PUCCH that conveys a CSI report, and a UE having the $n_{CSI-RS}+1$ CSI-RS trigger in the DCI format with value different than "00" used PUCCH resource $n_{PUCCH}+n_{CSI-RS}$ to transmit a PUCCH that conveys a CSI report with a power adjusted based on the TPC command field value 2890.

Figure 29:
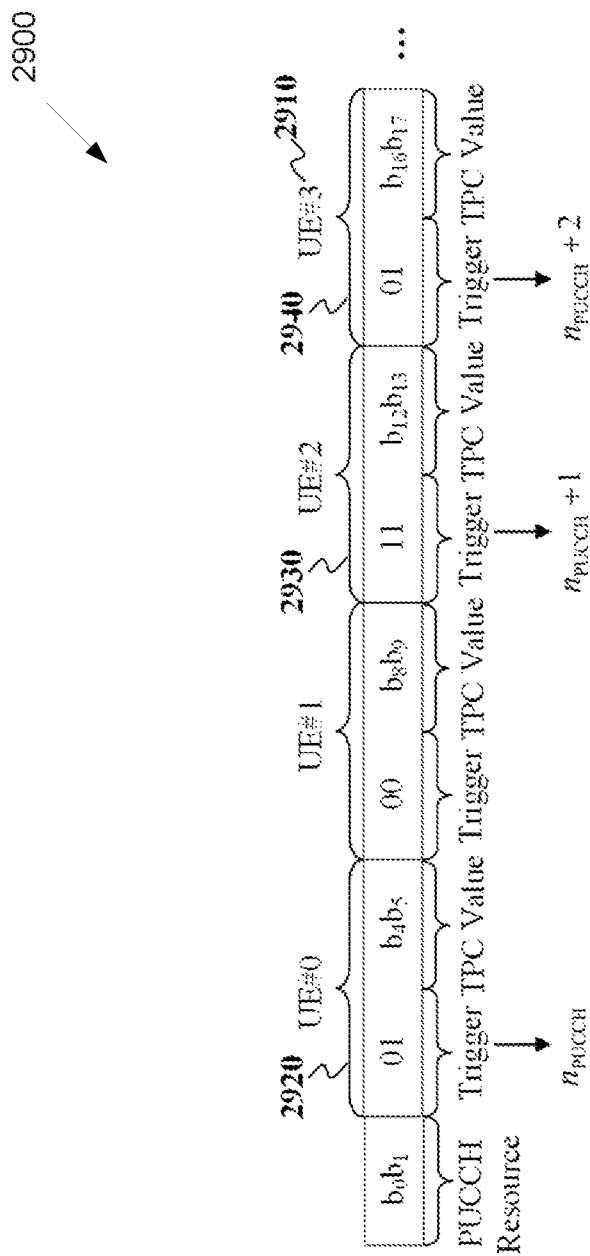
FIG. 29 illustrates an example PUCCH resource determination for a UE to transmit a PUCCH conveying a CSI report based on a PUCCH resource indicated in a DCI format triggering CSI-RS transmissions according to embodiments of the present disclosure.

FIG. 29 illustrates an example PUCCH resource determination 2900 for a UE to transmit a PUCCH conveying a CSI report based on a PUCCH resource indicated in a DCI format triggering CSI-RS transmissions according to embodiments of the present disclosure. An embodiment of the PUCCH resource determination 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

Using FIG. 29 as reference, a fourth UE, UE #3 2910, having a PUCCH transmission that conveys a CSI report in response to a detection of a DCI format that has a CRC scrambled with a CSI-RS-RNTI and includes a CSI-RS trigger field for the UE with value other than "00" and a reference PUCCH resource $n_{PUCCH}$, determines that there are two CSI-RS trigger fields, 2920 and 2930, with values other than "00" in locations prior to a location of the CSI-RS trigger field for the UE 2940. Based on the determination of CSI-RS trigger fields with value other than "00" in locations prior to the location of the CSI-RS trigger field for UE #3 in the DCI format, UE #3 determines PUCCH resource $n_{PUCCH}+2$ for a PUCCH transmission that conveys a CSI report in response to measurements from CSI-RS transmissions associated with CSI RS trigger value for UE #3.

A gNB can configure a UE to report CSI for $M_{NB}$ NBs from a set of configured $N_{NB} \geq M_{NB}$ NBs or a value of $M_{NB}$ can be defined in a system operation. The UE can select the $M_{NB}$ NBs from the set of $N_{NB}$ NBs. For example, from the $N_{NB}$ measured CQI values in respective $N_{NB}$ NBs, the UE can select the $M_{NB} \leq N_{NB}$ largest CQI values and indicate the respective $M_{NB}$ NBs in a CSI report.

The UE can also be configured by a gNB to include a CSI report for an NB where the UE is configured to receive PDCCHs or inclusion of that CSI report can be specified in the system operation. It is also possible that a configured set of NBs excludes an NB where a UE is configured to receive PDCCHs and the UE can provide separate CSI reports for that NB. For example, the UE can provide CSI reports with larger periodicity for the NB where the UE is configured to receive PDCCHs than for other NBs.

When a UE reports CSI for $M_{NB}>1$ NBs, the UE can report a largest CQI value $CQI_{max}(j_0)$ and a respective NB index $j_0$ and report a differential CQI offset value DCQI(j), with $0 \leq j \leq M_{NB}-1$ and $j \neq j_0$, where $DOQI(j)=CQI_{max}(j_0)-CQI(j)$. For example, for a DCQI(j) value represented by 2 bits, a mapping from the 2-bit differential CQI value to the offset value can be as in Table 2. For $N_{NB}$ configured NBs and $M_{NB}$ NBs with CSI reports, indexes for the $M_{NB}$ NBs can be obtained using for example a combinatorial index as in LTE specification.

A number of bits to denote a position of the $M_{NB}$ NBs is $$\left\lceil \log_2 \binom{N_{NB}}{M_{NB}} \right\rceil.$$

Indexes of NBs can be arranged first in a CSI report followed by respective CSI values or pairs of NB indexes and CSI reports can be arranged, for example starting from the NB with the largest CQI value and continuing with other NBs in an ascending index order.

TABLE 2

Mapping differential CQI value to offset value

| Differential CQI value | Offset value |
|---|---|
| 0 | ≤1 |
| 1 | 2 |
| 2 | 3 |
| 3 | ≥4 |

An NB where a UE is configured to receive PDCCHs can hop across slots within a set of configured NBs. For example, an NB where a UE is configured to receive PDCCHs can cycle through NBs in a configured set of NBs across slots according to an ascending order of an NB index or can have a hopping pattern maximizing frequency diversity such as an SRS transmission BW hopping pattern as described in the LTE specifications.

Then, a UE can receive PDCCHs and CSI-RS transmissions in a same NB while reducing an impact of a delay associated with retuning from a first NB where the UE is configured to receive PDCCHs to a second NB to receive CSI-RS transmissions, and then back to the first NB to receive PDCCHs. This can be particularly useful when a retuning time between different NBs is relatively large and a UE cannot receive CSI-RS transmissions for all respective NBs in a single slot.

When a UE is not configured reception of a PDSCH or of other DL signaling in a slot, the UE can use a remaining duration in the slot, after the symbols where the UE decodes PDSCHs and a few one or more additional symbols associated with a processing delay to determine potential scheduling of PDSCHs, for retuning to a different NB for reception of PDCCHs and possibly of CSI-RS.

When a UE is configured reception of a PDSCH or of other DL signaling in a slot and the UE does not have sufficient time to retune to a next NB, according to the NB hopping pattern, prior to the beginning of a next slot then, as is subsequently discussed, the UE can either skip retuning to a next NB and reestablish the NB hopping pattern at a later slot or the UE can retune to the next NB but miss reception of PDCCHs due to retuning. To mitigate the impact of an inability to receive PDCCHs in a slot, a gNB can schedule a multi-slot transmission of a PDSCH to a UE where the PDSCH is transmitted within different NBs in different slots according to an NB hopping pattern. Then, when a UE can retune within a time period that is not larger than a configured duration for transmissions of PDCCHs in a slot, the UE can receive the PDSCH after returning to different NBs in different slots.

Figure 30:
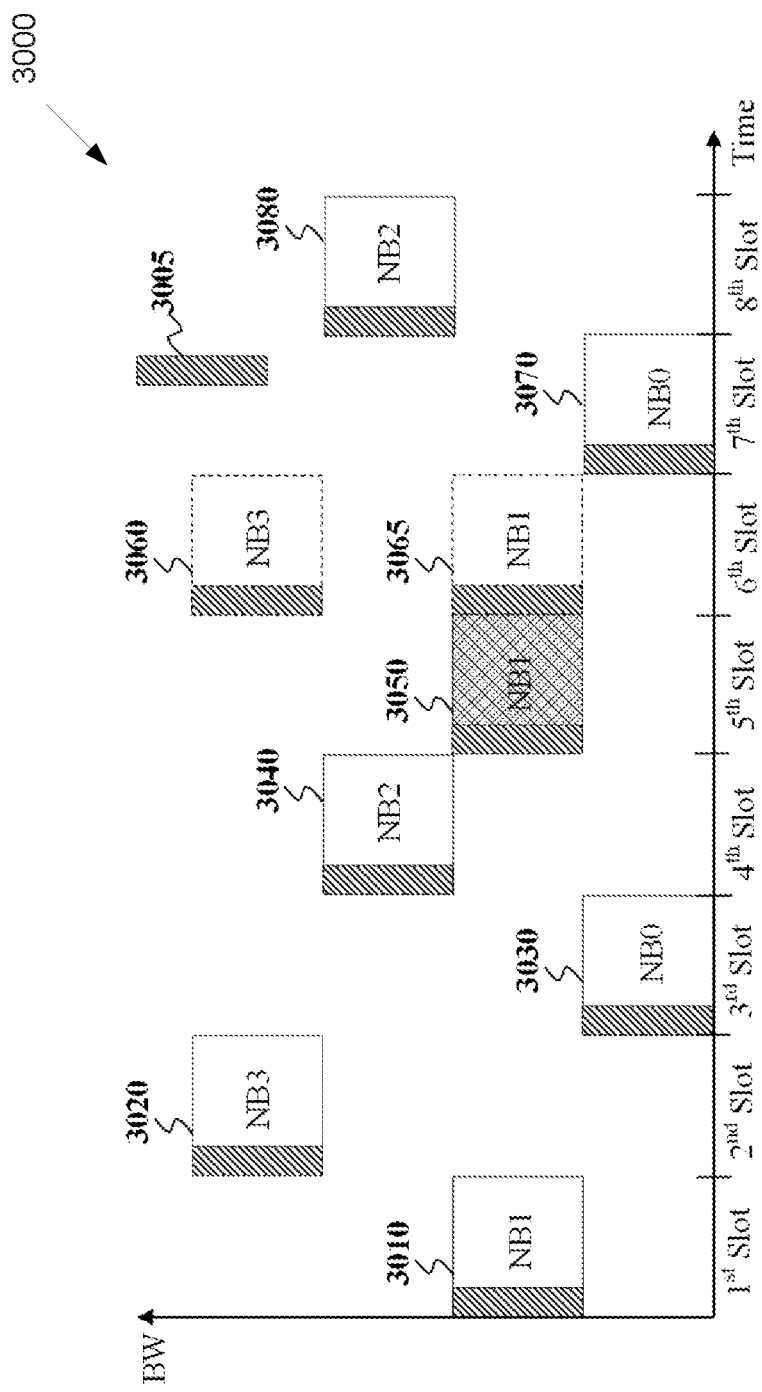
FIG. 30 illustrates a hopping pattern of an NB that a UE is configured to receive PDCCHs according to embodiments of the present disclosure.

FIG. 30 illustrates a hopping pattern 3000 of an NB that a UE is configured to receive PDCCHs according to embodiments of the present disclosure. An embodiment of the hopping pattern 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

As shown in FIG. 30, a UE is configured a set of NBs that includes four NBs, NB0, NB1, NB2, and NB3, and resources in first symbol of an NB for reception of PDCCHs 3005. In a first slot, the UE receives PDCCHs in NB1 3010 and can also receive CSI-RS transmissions in slot symbols with first time distance to the end of the first slot that is larger than a UE retuning period. The UE is not configured to receive any DL signaling during a time period equal to the retuning period relative to the end of the first slot.

During the first time distance, the UE can retune to NB3 for reception of PDCCHs in a second slot. In the second slot, the UE receives PDCCHs in NB3 3020 and can also receive CSI-RS transmissions in slot symbols with second time distance to the end of the second slot that is larger than a UE retuning period. The UE is not configured to receive other DL signaling during a time period equal to the retuning period relative to the end of the second slot. During the second time distance, the UE can retune to NB0 for reception of PDCCHs in a third slot. In the third slot, the UE receives PDCCHs in NB0 3030 and can also receive CSI-RS transmissions in slot symbols with third time distance to the end of the third slot that is larger than a UE retuning period.

The UE is not configured to receive any DL signaling during a time period equal to the retuning period relative to the end of the third slot. During the third time distance, the UE can retune to NB2 for reception of PDCCHs in a fourth slot. In the fourth slot, the UE receives PDCCHs in NB2 3040 and can also receive CSI-RS transmissions in slot symbols with fourth time distance to the end of the fourth slot that is larger than a UE retuning period.

The UE is not configured to receive any DL signaling during a time period equal to the retuning period relative to the end of the fourth slot. During the fourth time distance, the UE can retune to NB1 for reception of PDCCHs in a fifth slot. In the fifth slot, the UE receives PDCCHs in NB1 3050, can also receive CSI-RS transmissions in slot symbols, and is configured to receive DL signaling, such as a PDSCH, with fifth time distance to the end of the fifth slot that is not larger than a UE retuning period. The UE does not have enough time to retune to NB3 for reception of PDCCHs in a sixth slot while receiving the DL signaling in the fifth slot and there are two approaches for the UE behavior.

A first approach is for the UE to retune to NB3 in the sixth slot for possible reception of CSI-RS transmission but without the UE being able to receive PDCCHs 3060. A second approach is for the UE to remain tuned to NB1 in the sixth slot to receive PDCCHs in the sixth slot 3065. The first approach avoids error cases that can occur for example when the UE fails to detect a DL DCI format in the fifth slot scheduling a DL data channel reception in the fifth slot and retunes to NB3 in the sixth slot.

The second approach relies on the gNB to account for potential error cases. Both approaches can enable continuous scheduling for a UE; the first approach by applying multi-slot scheduling and relying on the UE to retune within a time period for transmission of DL control channels in a slot, the second approach by applying either single-slot or multi-slot scheduling for the UE. The UE resumes the NB hopping pattern in a seventh slot 3070. The UE behavior can be specified in a system operation or configured to the UE by the gNB according to one of the two approaches.

An SRS transmission over multiple NBs can follow similar principles as CSI-RS transmission over multiple NBs and the following descriptions are summarized for completeness. SRS transmissions in NBs can be precoded or non-precoded. In the former case, a precoding can also be configured to a UE and can be same for all NBs (single configuration) or different for different NBs (separate configuration). SRS transmissions can include zero-power SRS and non-zero-power SRS.

In order for a UE to transmit SRS in NBs from a set of NBs, the UE needs to retune the UE's RF transmitter components to each of the NBs from the set of NBs. When the UE is configured to transmit UL signaling such as a random access channel, or a PUSCH, or a PUCCH such as one conveying HARQ-ACK in an NB and the UE is also configured to transmit SRS in a different NB and an RF retuning delay is such that the UE cannot transmit the UL signaling and the SRS, the UE can drop the SRS transmission.

For a TDD system and a UE with a single duplexer, when a retuning delay is smaller than a time interval between a last slot symbol where the UE is configured to receive PDCCHs in a first NB and a first slot symbol of an SRS transmission in a second NB, the UE can transmit SRS in the second NB after receiving PDCCHs in the first NB. When a retuning delay is smaller than a time interval between a last slot symbol for transmitting SRS in the second NB and a first slot symbol for receiving PDCCHs in the first NB, the UE can retune to the first NB to receive PDCCHs after transmitting SRS in the second NB.

When the UE detects a DCI format in a PDCCH that schedules the UE to receive a PDSCH or PUSCH in an NB and the UE is also configured to transmit SRS in a different NB, the UE can drop transmission of the SRS. For a TDD system and a UE with a single duplexer, when a retuning delay is larger than a time between a last symbol of a PDSCH reception or a PUSCH transmission and a first symbol of an SRS transmission (or the reverse), the UE can drop the SRS transmission.

In one example, SRS transmission in a set of one or more NBs can be semi-persistent or periodic. A UE is configured by higher layers the set of NBs and parameters for SRS transmission in each NB from the set NBs. SRS transmission parameters can be same for all NBs, except possibly a location of slot symbols for SRS transmissions as it is further discussed in the following, and can be jointly configured for all NBs or some can be different per NB and be separately configured for each NB. SRS transmission parameters can include one or more of a number of combs, a number of slot symbols (duration) for SRS transmission in each NB, a transmission comb, a starting PRB, a periodicity, a BW, a cyclic shift, a precoding, or a number of antenna ports.

In another example, SRS transmission in a set of NBs can be aperiodic and triggered by a DCI format conveyed by a PDCCH. The DCI format can be a DL DCI format scheduling a PDSCH transmission to a UE, or an UL DCI format scheduling a PUSCH transmission from a UE, or a separate DCI format with contents triggering SRS transmissions from one or more UEs.

When a DCI format triggering SRS transmissions in one or more NBs from a set of NBs is an UL DCI format or a DL DCI format, the DCI format can include a field indicating NBs from the configured set of NBs for respective SRS transmissions from a UE, or can include a field indicating a SRS transmission configuration, in a similar manner as described for triggering of CSI-RS transmissions. For an UL DCI format that schedules a transmission of a PUSCH from a UE and triggers SRS transmissions in NBs from a set of NBs from the UE, when an NB of the PUSCH transmission is also an NB with triggered SRS transmission then, in order to be able to transmit the PUSCH, the UE can expect that a first SRS transmission occurs in the NB of the PUSCH transmission and subsequent SRS transmissions are in remaining NBs according to an ascending (or descending) order of an NB index.

When an NB of a PUSCH transmission is not an NB with a triggered SRS transmission, the UE can transmit the PUSCH in the one or more slots and subsequently, after the one or more slots, retune to NBs with triggered SRS transmission. It is also possible that SRS transmissions in NBs are according to an ascending NB index including, when an SRS transmission is triggered, an NB of a PUSCH transmission.

A field in an UL DCI format triggering SRS transmission in one or more NBs from a set of NBs that a UE is configured can include an indication of the NBs. For example, a field with two bits can indicate no SRS transmissions using a "00" value, and indicate SRS transmission in a first, second, or third configured sub-sets of NBs from the set of NBs using a "01," a "10" and a "11" value, or indicate a first, second, or third configuration for a SRS transmission, respectively. Parameters for SRS transmission in each NB can be same or different.

A location of slot symbols for SRS transmission in each NB can be same or different. For example, when SRS transmission is in different slots in respective different NBs, respective slot symbols can be same. For example, when SRS transmission in at least some NBs are in a same slot, respective slot symbols are different and a respective offset in number of symbols for successive SRS transmissions can be determined from a retuning delay for UEs with associated triggered SRS transmissions or can be signaled by a gNB either by UE-common higher layer signaling, such as system information, or by UE-specific higher layer signaling.

An SRS transmission in an NB can also be over multiple slot symbols where, for example, SRS transmission is from different antenna ports in different symbols, such as from a first antenna port in a first symbol and a second antenna port in a second symbol, or from same antenna ports in order to enable a gNB to obtain a more accurate estimate of a channel medium from the SRS transmission.

When a DCI format triggering SRS transmissions in NBs from a set of NBs for a UE is not an UL DCI format or a DL DCI format, the DCI format can have a same size as an UL DCI format or a DL DCI format that the UE decodes, or as a size of a DCI format that the UE decodes for other purposes such as for obtaining TPC commands. A CRC of the DCI format can be scrambled with an RNTI specific to triggering of SRS transmissions such as an SRS-RNTI. A DCI format with an SRS-RNTI is referred to for brevity as DCI format X.

Using a DCI format X, a gNB can trigger SRS transmissions in different NBs from a configured set of NBs, and possibly also in different cells, for each UE from a group of UEs configured with a same SRS-RNTI. A UE can be configured a location in DCI format X through an index a parameter Index-SRS where the UE can obtain an SRS trigger field indicating SRS transmissions in a subset of NBs from the configured set of NBs or indicating a SRS transmission configuration. The SRS trigger field can operate as described for an UL DCI format or a DL DCI format or can have increased granularity similar to CSI-RS triggering.

It is also possible that, when an SRS trigger field triggers SRS transmissions, it does so for all NBs in the set of NBs. Then, the SRS trigger field can include a single bit for each UE per cell where a value of "0" indicates no SRS triggering and a value of "1" indicates SRS triggering in all NBs in the set of NBs. A DL DCI format or a DCI format X can also include a TPC field for a UE to adjust an SRS transmission power. A TPC command field can be next to an SRS transmission trigger field (either before or after) or can be at a different configured location for each UE. A UE can be configured with more than one SRS-RNTI where the contents of DCI format X are interpreted according to the SRS-RNTI. For example, a first SRS-RNTI can correspond to a first set of NBs or a first group of cells while a second SRS-RNTI can correspond to a second set of NBs or a second group of cells.

The functionalities of a DCI format T and a DCI format X can be combined using a DCI format Y that can have a same size as an UL DCI format or a DL DCI format that the UE decodes, or as a size of a DCI format that the UE decodes for other purposes such as for obtaining TPC commands. A UE can be configured with an RS-RNTI for triggering both CSI-RS transmissions and SRS transmissions and with one or more respective locations, for respective one or more cells, for a CSI-RS trigger field, followed by an SRS trigger field, and followed by a TPC command field (or in any other order for these three fields) where a cell for CSI-RS reception can be different than a cell for SRS transmission and a link between cell index and trigger location is separately configured. DCI format Y can also include a reference PUCCH resource for PUCCH transmissions in response to CSI-RS trigger values other than "00" as described in FIG. 29.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method performed by a terminal in a communication system, the method comprising:
receiving, from a base station, information on a control resource set (CORESET);
identifying a control resource element (CCE) based on a CCE-to-resource element group (REG) mapping for the CORESET, wherein;
the CCE-to-REG mapping is interleaved based on an REG bundle for interleaved CCE-to-REG mapping, and
the REG bundle includes a plurality of REGs; and
monitoring a physical downlink control channel (PDCCH) on a search space associated with the CORESET based on the CCE.

2. The method of claim 1, wherein:
the information on the CORESET includes information on a size of the REG bundle indicating a number of REGs,
the PDCCH is monitored based on assuming that a same precoding is applied to the REG bundle, and
the information on the size of the REG bundle is one of 2 or 6.

3. The method of claim 1, wherein the REGs within the REG bundle are contiguous REGs.

4. The method of claim 1, wherein the PDCCH is monitored based on a periodicity associated with the CORESET.

5. The method of claim 1, wherein a size of the REG bundle is a predetermined value in case that the search space is a common search space.

6. A method performed by a base station in a communication system, the method comprising:
transmitting, to a terminal, information on a control resource set (CORESET);
identifying a control resource element (CCE) based on a CCE-to-resource element group (REG) mapping for the CORESET, wherein;
the CCE-to-REG mapping is interleaved based on an REG bundle for interleaved CCE-to-REG mapping, and
the REG bundle includes a plurality of REGs; and
transmitting a physical downlink control channel (PDCCH) on a search space associated with the CORESET, based on the CCE.

7. The method of claim 6, wherein:
the information on the CORESET includes information on a size of the REG bundle indicating a number of REGs,
a same precoding is applied to the REG bundle, and
the information on the size of the REG bundle is one of 2 or 6.

8. The method of claim 6, wherein the REGs within the REG bundle are contiguous REGs.

9. The method of claim 6, wherein the PDCCH is monitored based on a periodicity associated with the CORESET.

10. The method of claim 6, wherein a size of the REG bundle is a predetermined value in case that the search space is a common search space.

11. A terminal in a communication system, the terminal comprising:
a transceiver configured to receive, from a base station, information on a control resource set (CORESET); and
a processor operably coupled with the transceiver and configured to:
identify a control resource element (CCE) based on a CCE-to-resource element group (REG) mapping for the CORESET, wherein;
the CCE-to-REG mapping is interleaved based on an REG bundle for interleaved CCE-to-REG mapping, and
the REG bundle includes a plurality of REGs, and
monitor a physical downlink control channel (PDCCH) on a search space associated with the CORESET based on the CCE.

12. The terminal of claim 11, wherein:
the information on the CORESET includes information on a size of the REG bundle indicating a number of REGs,
the PDCCH is monitored based on assuming that a same precoding is applied to the REG bundle, and
the information on the size of the REG bundle is one of 2 or 6.

13. The terminal of claim 11, wherein the REGs within the REG bundle are contiguous REGs.

14. The terminal of claim 11, wherein the PDCCH is monitored based on a periodicity associated with the CORESET.

15. The terminal of claim 11, wherein a size of the REG bundle is a predetermined value in case that the search space is a common search space.

16. A base station in a communication system, the base station comprising:
a transceiver configured to transmit, to a terminal, information on a control resource set (CORESET); and a processor operably coupled with the transceiver, the processor configured to identify a control resource element (CCE) based on a CCE-to-resource element group (REG) mapping for the CORESET, wherein the CCE-to-REG mapping is interleaved based on an REG bundle for interleaved CCE-to-REG mapping, wherein the REG bundle includes a plurality of REGs, and wherein the transceiver is further configured to transmit a physical downlink control channel (PDCCH) on a search space associated with the CORESET, based on the CCE.

17. The base station of claim 16, wherein:

the information on the CORESET includes information on a size of the REG bundle indicating a number of REGs, a same precoding is applied to the REG bundle, and the information on the size of the REG bundle is one of 2 or 6.

18. The base station of claim 16, wherein the REGs within the REG bundle are contiguous REGs.

19. The base station of claim 16, wherein the PDCCH is monitored based on a periodicity associated with the CORESET.

20. The base station of claim 16, wherein a size of the REG bundle is a predetermined value in case that the search space is a common search space.

* * * * *